(12) United States Patent
Crawford

(10) Patent No.: US 12,536,547 B2
(45) Date of Patent: Jan. 27, 2026

(54) DYNAMIC FINANCIAL MANAGEMENT SYSTEM, METHOD AND DEVICE

(71) Applicant: Paymation, Inc., Los Angeles, CA (US)

(72) Inventor: Khellar Sean Crawford, Los Angeles, CA (US)

(73) Assignee: Paymation, Inc., Los Angeles, CA (US)

( * ) Notice: Subject to any disclaimer, the term of this patent is extended or adjusted under 35 U.S.C. 154(b) by 1089 days.

(21) Appl. No.: 17/397,511

(22) Filed: Aug. 9, 2021

(65) Prior Publication Data

US 2021/0365944 A1  Nov. 25, 2021

Related U.S. Application Data

(63) Continuation-in-part of application No. 16/428,848, filed on May 31, 2019, now Pat. No. 11,100,513, which is a continuation-in-part of application No. 16/059,907, filed on Aug. 9, 2018, now Pat. No. 10,346,847, which is a continuation of application No. 14/878,857, filed on Oct. 8, 2015, now Pat. No. 10,074,091.

(Continued)

(51) Int. Cl.
*G06Q 20/00* (2012.01)
*G06Q 20/10* (2012.01)
*G06Q 20/22* (2012.01)
*G06Q 20/40* (2012.01)

(52) U.S. Cl.
CPC ......... *G06Q 20/405* (2013.01); *G06Q 20/102* (2013.01); *G06Q 20/227* (2013.01)

(58) Field of Classification Search
CPC .. G06Q 20/405; G06Q 20/102; G06Q 20/227; G06Q 20/10
USPC .......................................................... 705/34
See application file for complete search history.

(56) References Cited

U.S. PATENT DOCUMENTS 7,895,096 B1   2/2011  Vu
8,078,503 B1  12/2011  Mussman
(Continued)

FOREIGN PATENT DOCUMENTS

EP   2800306 B1   9/2018
EP   3454205 A1   3/2019
(Continued)

OTHER PUBLICATIONS

International Search Report for the International Application No. PCT/US2015/054754 dated Jan. 8, 2016.
(Continued)

*Primary Examiner* — Russell S Glass
(74) *Attorney, Agent, or Firm* — Haverstock & Owens, A Law Corporation

(57) ABSTRACT

A dynamic personalizable automated finance management system that provides a financial management platform that enables users to easily generate a plurality of customized rules or conditions associated with one or more accounts thereby creating account plans that intelligently and passively execute the transfer of funds among accounts. The rules with a plan are able to define if, how much, when and where to transfer money to and from the accounts based on user entered criteria or triggers upon which the rules/conditions are based.

37 Claims, 106 Drawing Sheets

Related U.S. Application Data

(60) Provisional application No. 62/062,427, filed on Oct. 10, 2014.

(56) References Cited

U.S. PATENT DOCUMENTS

| | | | | |
|---|---|---|---|---|
| 8,190,517 | B1* | 5/2012 | Baker | G06Q 40/00 |
| | | | | 705/35 |
| 8,332,316 | B2 | 12/2012 | Baker et al. | |
| 8,439,746 | B2 | 5/2013 | Gagner et al. | |
| 8,712,881 | B1 | 4/2014 | Phillips et al. | |
| 8,751,329 | B2 | 6/2014 | Kemery | |
| 10,074,091 | B2 | 9/2018 | Crawford | |
| 10,346,847 | B2 | 7/2019 | Crawford | |
| 11,100,513 | B2 | 8/2021 | Crawford | |
| 2002/0029194 | A1* | 3/2002 | Lewis | G06Q 20/10 |
| | | | | 705/40 |
| 2004/0143522 | A1* | 7/2004 | Wall | G06Q 40/02 |
| | | | | 705/34 |
| 2006/0015417 | A1 | 1/2006 | Wittmer | |
| 2006/0287953 | A1* | 12/2006 | Chauhan | G06Q 20/10 |
| | | | | 705/39 |
| 2007/0136136 | A1 | 6/2007 | Nossik | |
| 2008/0183628 | A1 | 7/2008 | Oliver et al. | |
| 2010/0069148 | A1 | 3/2010 | Cargill | |
| 2011/0054970 | A1 | 3/2011 | Minsky et al. | |
| 2013/0211999 | A1 | 8/2013 | Madhavan et al. | |
| 2013/0238487 | A1 | 9/2013 | Biske | |
| 2013/0238489 | A1 | 9/2013 | Bouey et al. | |
| 2014/0114737 | A1 | 4/2014 | Espejo | |
| 2014/0172621 | A1 | 6/2014 | Vitolia | |
| 2015/0193872 | A1* | 7/2015 | Ivanoff | G16H 50/20 |
| | | | | 705/38 |
| 2016/0125408 | A1 | 5/2016 | Crawford | |
| 2018/0349903 | A1 | 12/2018 | Crawford | |
| 2019/0080325 | A1 | 3/2019 | Pourfallah et al. | |
| 2019/0354979 | A1 | 11/2019 | Crawford | |
| 2021/0365944 | A1 | 11/2021 | Crawford | |

FOREIGN PATENT DOCUMENTS

| | | | | |
|---|---|---|---|---|
| GB | 2566824 A | 3/2019 | | |
| WO | WO-2014078936 A1 * | 5/2014 | | G06Q 20/10 |
| WO | 2016/057827 A1 | 4/2016 | | |
| WO | 2020/243514 A1 | 12/2020 | | |

OTHER PUBLICATIONS

International Preliminary Report for the International Application No. PCT/US2015/054754 dated Apr. 11, 2017.

International Search Report for the International Application No. PCT/US2020/035244 dated Sep. 29, 2020.

International Preliminary Report for the International Application No. PCT/US2020/035244 dated Nov. 16, 2021.

International Preliminary Report on Patentability for International Application No. PCT/US2020/035244 dated Nov. 16, 2021.

* cited by examiner

LOGIN

Email [        ]
Password [        ]  [ GO > ]

or REGISTER

First Name [        ]
Last Name [        ]
Email [        ]
Password [        ]  [ GO > ]

Login or register to begin

Fig. 5A

What would you like to do?

⇨ Create a streaming plan for savings
    Save for a house or car, or set aside a percentage of your income to pay for taxes
Create a streaming plan for paying another user
    Repay loans, send allowance, pay salaries or recurring fees, etc.
Create a streaming plan for receiving payments from another user
    Receive a stream of money from another person or user
Create a streaming plan to pay a recurring bill
    Set up an intelligent bill pay plan so you only make decisions when necessary
Create a streaming plan to split funds or income
    Divide money or income from an account or account group into any number of other accounts
Making a single one time payment to another user
    Manually send a simple payment from any connected account
Make a single one time bill payment
    Manually pay a bill from any connected account
View and manage all plans & payments: Timeline Priority Management Center
    Manually pay a bill from any connected account
Request an incoming payment proposal
    Ask another person or user to propose a draft for a payment plan Base options from logged in account

Fig. 5B

Which account will fund your streaming savings plan?

From: | Select ⌃
Wells Fargo Savings (x-9491)
Wells Fargo Checking (x-2243)
AFM Account Balance Add Bank Account Choose the account to which you'd like to direct your savings transfers:

To: | Select ⌃
Wells Fargo Savings (x-9491)
Wells Fargo Checking (x-2243)
AFM Account Balance Add Bank Account Give a nickname to this savings plan Savings plan to buy a home

NEXT >

Choose accounts to transfer from and to and name your savings plan

Save this plan for later
Cancel this plan

Fig. 5C

How often would you like to make a transfer to your account

Define a transfer frequency: Once every [14] number of
days
weeks
months
hours
minutes Beginning when? July 28, 2014
Ending when? No end date Leave the above setting as "No end date" to keep this plan running until stopped manually How much would you like to save in total? $ [        ]

To pay without limit, enter "0" or leave this field blank

< BACK

NEXT >

Select the frequency and totals for your savings deposits

Save this plan for later
Cancel this plan

Fig. 5D

What type of transfer would you like to make and how much?

Select transfer type | Select ⌃
Simple transfer (fixed amount)
Percentage transfer
Hybrid transfer (fixed amount + percentage)

How much would you like to transfer with each deposit? $ [____]
Add a condition (change transfer amount depending on your balance or income at the time)

[< BACK]   [NEXT >]
Define rules and conditions on a simple fixed amount savings plan
Save this plan for later
Cancel this plan

Fig. 5E

What type of transfer would you like to make and how much?

How much would you like to save in total? $ [____]
To pay without limit, enter "0" or leave this field blank Select transfer type | Simple transfer (fixed amount) ⌃

How much would you like to transfer with each deposit? $ [____]  } UNLESS THE FOLLOWING CONDITIONS ARE MET:

$ [____]

CONDITIONAL RULE #1 (Pay a different amount IF...)
Remove this rule if | SELECT A CONDITION TYPE ⌃ | is | SELECT OPERATOR ⌃
My funding account balance | less than
Payee account balance | less than or equal to
My recent income | more than
My recent income from certain source(s) | more than or equal to
Date of transfer | in the range of (Adds as many rules as the user chooses as long as they do not overlap)

Add another condition to Conditional Rule #1 to make it more specific
(Above conditions must be true for Rule #1 to be executed)

In this case, how much would you like to transfer with each deposit? $ [____]

Add another conditional rule (change transfer amount depending on various conditions)

[< BACK]   [NEXT >]
Define rules and conditions on a simple fixed amount savings plan
Save this plan for later
Cancel this plan

Fig. 5F

What type of transfer would you like to make and how much?

Select transfer type | Simple transfer (fixed amount) ⌄

How much would you like to transfer with each deposit? $ | 100 | } UNLESS THE FOLLOWING CONDITIONS ARE MET:

$ | 5000

CONDITIONAL RULE #1
(Pay a different amount IF...)
Remove this rule if | My funding account balance ⌄ | is | is more than ⌄

Add another condition to make this rule more specific
(Above conditions must be true for Rule #1 to be executed)

In this case, how much would you like to deposit with each transfer? $ | 1500 from: $ | 1000
to: $ | 4999.99

CONDITIONAL RULE #2
(Pay a different amount IF...)
Remove this rule if | SELECT A CONDITION TYPE ⌄ | is | SELECT OPERATOR ⌄

| My funding account balance | less than |
| Payee account balance | less than or equal to |
| My recent income | more than |
| My recent income from certain source(s) | more than or equal to |
| Date of transfer | in the range of |

Add another condition to make this rule more specific
(Above conditions must be true for Rule #2 to be executed)

In this case, how much would you like to deposit with each transfer? $ | 750

Add another conditional rule (change transfer amount depending on various conditions)

| < BACK |           | NEXT > |
                     Save this plan for later
                     Cancel this plan Define rules and conditions on a simple fixed amount savings plan

Fig. 5G

What type of transfer would you like to make and how much?

Select transfer type: Percentage transfer

On what amount will you be calculating your percentage deposits? My income from within a certain amount of time ↳ For how much time before this payment would you like to calculate recent income? 7 Days What percentage would you like to transfer with each deposit? 10 %

UNLESS THE FOLLOWING CONDITIONS ARE MET:

→ $ 5000

CONDITIONAL RULE #1 (Pay a different amount IF...)
Remove this rule if | SELECT A CONDITION TYPE | is | SELECT OPERATOR |
| --- | --- | --- |
| My funding account balance | | less than |
| Payee account balance | | less than or equal to |
| My recent income | | more than |
| My recent income from certain source(s) | | more than or equal to |
| Date of transfer | | in the range of |

Add another condition to make this rule more specific
(Above conditions must be true for Rule #1 to be executed)

In this case, what percentage amount would you like to deposit? 25 %

(Adds as many rules as the user chooses as long as they do not overlap)

Add another conditional rule (change transfer amount depending on various conditions)

[ < BACK ]                                    [ NEXT > ]
                                              Save this plan for later
                                              Cancel this plan Define rules and conditions on a percentage savings plan

Fig. 5H

What type of transfer would you like to make and how much?

Select transfer type: Percentage transfer

Percentage of what amount? Sum of account deposits since last payment

What percentage amount would you like to deposit? 10 %

UNLESS THE FOLLOWING CONDITIONS ARE MET:

$ 5000

CONDITIONAL RULE #1 (Pay a different amount IF...) if My funding account balance is is more than Remove this rule Add another condition to make this rule more specific
(Above conditions must be true for Rule #1 to be executed)

In this case, what percentage amount would you like to deposit? 25 %

↳ Of what amount? Entire funding account balance from $ 1000
to $ 4999.99

CONDITIONAL RULE #2 (Pay a different amount IF...) if SELECT A CONDITION TYPE is SELECT OPERATOR Remove this rule

| SELECT A CONDITION TYPE | SELECT OPERATOR |
|---|---|
| My funding account balance | less than |
| Payee account balance | less than or equal to |
| My recent income | more than |
| My recent income from certain source(s) | more than or equal to |
| Date of transfer | in the range of |

Add another condition to make this rule more specific
(Above conditions must be true for Rule #2 to be executed)

In this case, what percentage amount would you like to deposit? 15 %

↳ Of what amount?

| Select |
|---|
| Entire funding account balance |
| Entire balance minus a certain amount |
| Sum of account deposits since last payment |

Deduct what amount from your account before calculating this percentage deposit? $ 500

Add another conditional rule (change transfer amount depending on various conditions)

< BACK    NEXT >

Define rules and conditions on a percentage savings plan

Save this plan for later
Cancel this plan

Fig. 5I

What type of transfer would you like to make and how much?

Select transfer type | Select ∧
Simple transfer (fixed amount)
Percentage transfer
Hybrid transfer (fixed amount + percentage)

Percentage of what amount? | Select ∧
Entire funding account balance
Entire balance minus a certain amount
My income from within a certain amount of time ↳ For how much time before this payment would you like to calculate recent income? | 7 | Days ∧

What percentage amount would you like to transfer? [ ] %

Plus what fixed amount? $ [ ]

Add another conditional rule (change transfer amount depending on various conditions)

[ < BACK ]     [ NEXT > ]

Save this plan for later
Cancel this plan

Define rules and conditions on a hybrid savings plan

Fig. 5J

What type of transfer would you like to make and how much?

Select transfer type [Hybrid transfer (fixed amount+percentage) ⌃]

Percentage of what amount? [My income since last transfer ⌃]

What percentage amount would you like to transfer? [10] %

Plus what fixed amount? $ [100]

from $ [1000.01]
to $ [10,000]

CONDITIONAL RULE #1 if [SELECT A CONDITION TYPE ⌃] is [SELECT OPERATOR ⌃]
(Pay a different amount IF...)
Remove this rule

| SELECT A CONDITION TYPE | SELECT OPERATOR |
|---|---|
| My funding account balance | less than |
| Payee account balance | less than or equal to |
| My recent income | more than |
| My recent income from certain source(s) | more than or equal to |
| Date of transfer | in the range of |

Add another condition to make this rule more specific
(Above conditions must be true for Rule #1 to be executed)

In this case, what percentage amount would you like to deposit? [15] %

↳ Of what amount? [Entire funding account balance ⌃]

Plus what fixed amount? $ [0]

Add another conditional rule #2 (change transfer amount depending on various conditions)

[< BACK]                    [NEXT >]
                            Save this plan for later
                            Cancel this plan Define rules and conditions on a hybrid savings plan

Fig. 5K

What type of transfer would you like to make and how much?

Select transfer type | Hybrid transfer (fixed amount+percentage) ⌄

On what amount will you be calculating your percentage deposits? | My income from within a certain amount of time ⌄

↳ For how much time before this payment would you like to calculate recent income? | 7 | Days ⌄

What percentage amount would you like to transfer? | 10 | % from $ | 1000.01
to $ | 10,000

Plus what fixed amount? $ | 100

CONDITIONAL RULE #1
(Pay a different amount IF...)
Remove this rule if | My funding account balance ⌄ | is | is in the range of ⌄

Add another condition to make this rule more specific
(Above conditions must be true for Rule #1 to be executed)

In this case, what percentage amount would you like to deposit? | 25 | %

↳ Of what amount? | Entire funding account balance ⌄

Plus what fixed amount? $ | 0

$ 250

CONDITIONAL RULE #2
(Pay a different amount IF...)
Remove this rule if | SELECT A CONDITION TYPE ⌄ | is | SELECT OPERATOR ⌄

| My funding account balance | less than |
| Payee account balance | less than or equal to |
| My recent income | more than |
| My recent income from certain source(s) | more than or equal to |
| Date of transfer | in the range of |

Add another condition to make this rule more specific
(Above conditions must be true for Rule #2 to be executed)

In this case, what percentage amount would you like to deposit? | 15 | %

↳ Of what amount? | Entire funding account balance ⌄

Plus what fixed amount? $ | 0

Add another conditional rule (change transfer amount depending on various conditions)

[ < BACK ]   [ NEXT > ]

Save this plan for later
Cancel this plan

Define rules and conditions on a hybrid savings plan

Fig. 5L

Would you like to require manual approval before your transfers are sent?

Require confirmation before releasing funds?
- ○ No, release all my transfers automatically as I have set them
- ○ Yes, I want to approve each transfer before my money is moved
- ⦿ Yes, but I only want confirmation on certain parts of my plan ↳ Which parts of your plan do you want to enable confirmation for?

- ☐ Base/Default Rule
  Save 10% of entire balance, plus $100
- ☐ Conditional Rule #1
  Unless balance is less than $1000, then transfer 5%, plus $0
- ☑ Conditional Rule #2
  Or unless balance is between $4000 and $10000, then transfer 12%, plus $3000

How would you like to be notified for manual confirmation of these deposits?
- ☐ Voice call
- ☑ Text Message
  ↳ Phone number: [          ]
- ☐ Email

[ < BACK ]    [ NEXT > ]
Save this plan for later
Cancel this plan

Determine user confirmation preferences

Fig. 5M

Review and save your plan

| | |
|---|---|
| Savings Plan Nickname | John's Sample Home Savings Plan |
| Transferring from account | Wells Fargo Checking (---- ---- ---- 9820) |
| Transferring to account | Wells Fargo Savings (---- ---- ---- 1422vvvt) |
| Transfer to be made every | 1 month |
| Starting on | Feb 14, 2014 |
| Ending on | No end date |
| Limit | Save without limit |
| Base Rule | Save 10% of entire balance, plus $100... |
| Conditional Rule #1 | Unless balance is less than $1000, then transfer 5%, plus $0 |
| Conditional Rule #2 | Or unless balance is between $4000 and $10000, then transfer 12%, plus $3000 (text confirmation required) |
| Conditional type | Text confirmation, (555) 555-5555 |

| < BACK | | NEXT > |
|---|---|---|
| | | Save this plan for later |
| | | Cancel this plan |

Review, save, and start this plan

Fig. 5N

LOGIN

Email [        ]
Password [        ]   GO > or REGISTER

First Name [        ]
Last Name [        ]
Email [        ]
Password [        ]   GO >

Login or register to begin

Fig. 6A

What would you like to do?

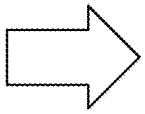

Create a streaming plan for savings
        Save for a house or car, or set aside a percentage of your income to pay for taxes <u>Create a streaming plan for paying another user</u>
        Repay loans, send allowance, pay salaries or recurring fees, etc.

Create a streaming plan for receiving payments from another user
        Receive a stream of money from another person or user Create a streaming plan to pay a recurring bill
        Set up an intelligent bill pay plan so you only make decisions when necessary Create a streaming plan to split funds or income
        Divide money or income from an account or account group into any number of other accounts Make a single one time payment to another user
        Manually send a simple payment from any connected account Make a single one time bill payment
        Manually pay a bill from any connected account View and manage all plans & payments: Timeline Priority Management Center
        Manually pay a bill from any connected account Request an incoming payment proposal
        Ask another person or user to propose a draft for a payment plan Base options from logged in account

Fig. 6B

Which account will fund your payment plan?

From: | Select ⌃ |
--- 
| Wells Fargo Savings (x-9491) |
| Wells Fargo Checking (x-2243) |
| AFM Account Balance |

Add Bank Account

What type of transfer will this be?

To: | Select ⌃ |
---
| Transfer to another person's or business' AFM account |
| Direct deposit to another person's or business' bank account |

Enter AFM recipient's username (email address)

| name@domain.com |
---

Give a nickname to this payment plan

| Re-payment plan for personal loan from John |
---

| NEXT > |
---

Save this plan for later
Cancel this plan

Choose an account to fund the plan and set up a payee

Fig. 6C

How often would you like to pay into your recipient's account?

Define a payment frequency: Once every [ 14 ] number of [ days / weeks / months / hours / minutes ]

Beginning when? [ July 28, 2014 ]

Ending when? [ No end date ]

Leave the above setting as "No end date" to keep this plan running until stopped manually How much would you like to pay this recipient in total? $ [          ]
To pay without limit, enter "0" or leave this field blank Add interest to increase the amount entered above, if any? [          ] % APR*
To pay without an interest rate, enter "0" or leave this field blank

[ < BACK ]                                    [ NEXT > ]

Select the frequency, limit, and interest for this payment

Save this plan for later
Cancel this plan

Fig. 6D

What amount would you like to send with each transfer?

Select transfer type [ Select ⌃ ]
[ Simple transfer (fixed amount) ]
[ Percentage transfer ]
[ Hybrid transfer (fixed amount + percentage) ]

How much would you like to send with each transfer? $ [          ]

Add another conditional rule (change transfer amount depending on various conditions at the time)

[ < BACK ]                                    [ NEXT > ]

Define rules and conditions on simple fixed amount payments

Save this plan for later
Cancel this plan

Fig. 6E

What amount would you like to send with each transfer?

Select transfer type  | Simple transfer (fixed amount) ⌃ |

How much would you like to send with each transfer?  $[_____]  } UNLESS THE FOLLOWING CONDITIONS ARE MET:

$[_____]

CONDITIONAL RULE #1 if | SELECT A CONDITION TYPE ⌃ | is | SELECT OPERATOR ⌃ |
(Pay a different amount IF...)

| My funding account balance | less than |
| Payee account balance | less than or equal to |
| My recent income | more than |
| My recent income from certain source(s) | more than or equal to |
| Date of transfer | in the range of |

Remove this rule

Add another condition to make this rule more specific
(Above conditions must be true for Rule #1 to be executed)

(Adds as many rules as the user chooses as long as they do not overlap)

In this case, how much would you like to send with each transfer?  $[_____]

Add another conditional rule (change transfer amount depending on various conditions)

[ < BACK ]                    [ NEXT > ]

Define rules and conditions on simple fixed amount savings

Save this plan for later
Cancel this plan

Fig. 6F

What amount would you like to send with each transfer?

Select transfer type [Simple transfer (fixed amount) ⌄]

How much would you like to send with each transfer? $[100]  } UNLESS THE FOLLOWING CONDITIONS ARE MET:

CONDITIONAL RULE #1 (Pay a different amount IF...)
Remove this rule if [My funding account balance ⌄] $[5000]

Add another condition to Conditional Rule #1 to make it more specific
(Above conditions must be true for Rule #1 to be executed)

In this case, how much would you like to send with each transfer? $[1500]

from $[1000]
to $[4999.99]

CONDITIONAL RULE #2 (Pay a different amount IF...)
Remove this rule if [SELECT A CONDITION TYPE ⌄] is [SELECT OPERATOR ⌄]

| My funding account balance | | less than |
| Payee account balance | | less than or equal to |
| My recent income | | more than |
| My recent income from certain source(s) | | more than or equal to |
| Date of transfer | | in the range of |

Remove this condition from [April 1, Yearly 📅]
to [Aug 31, Yearly 📅]

AND if [SELECT A CONDITION TYPE ⌄] is [SELECT OPERATOR ⌄]

| Funding source balance | | is before |
| Recent income | | is on or before |
| Recent income from a certain source | | is after |
| Date of scheduled bill payment | | is on or after |
| | | in the range of |

Remove this condition

Add another condition to Conditional Rule #2 to make it more specific
(Above conditions must be true for Rule #2 to be executed)

In this case, how much would you like to send with each transfer? $[750]

Add another conditional rule (change transfer amount depending on various conditions)

[< BACK]

Define rules and conditions on simple fixed amount payments

[NEXT >]

Save this plan for later
Cancel this plan

Fig. 6G

What amount would you like to send with each transfer?

Select transfer type | Select ⌃
| Simple transfer (fixed amount) |
| Percentage transfer |
| Hybrid transfer (fixed amount + percentage) |

On what amount will you be calculating your percentage deposits? | Select ⌃
| My entire funding account balance |
| My entire balance minus a certain amount |
| My income from within a certain amount of time |

↳ For how much time before this payment would you like to calculate recent income? | 7 | Days ⌃

What percentage amount would you like to send? | [____] % of my income

Add another conditional rule (change transfer amount depending on various conditions)

[ < BACK ]   [ NEXT > ]

Define rules and conditions on percentage amount payments

Save this plan for later
Cancel this plan

Fig. 6H

What amount would you like to send with each transfer?

Select transfer type: Percentage transfer

On what amount will you be calculating your percentage payments? My income from within a certain amount of time ↳ For how much time before this payment would you like to calculate recent income? 7 Days What percentage amount would you like to send? 10 %

UNLESS THE FOLLOWING CONDITIONS ARE MET:

CONDITIONAL RULE #2 (Pay a different amount IF...)
Remove this rule if SELECT A CONDITION TYPE is SELECT OPERATOR

| SELECT A CONDITION TYPE | SELECT OPERATOR |
|---|---|
| My funding account balance | less than |
| Payee account balance | less than or equal to |
| My recent income | more than |
| My recent income from certain source(s) | more than or equal to |
| Date of transfer | in the range of |

Add another condition to make this rule more specific
(Above conditions must be true for Rule #2 to be executed)

In this case, what percentage amount would you like to transfer? 25 %

↳ Of what amount? Entire funding account balance

Add another conditional rule (change transfer amount depending on various conditions)

[ < BACK ]                                    [ NEXT > ]
                                              Save this plan for later
Define rules and conditions on percentage     Cancel this plan
amount payments

Fig. 6I

What amount would you like to send with each transfer?

Select transfer type: [Percentage transfer ⌄]

On what amount will you be calculating your percentage payments? [My income from within a certain amount of time ⌄]
↳ For how much time before this payment would you like to calculate recent income? [7] [Days ⌄]

What percentage amount would you like to send? [10] %  } UNLESS THE FOLLOWING CONDITIONS ARE MET:

CONDITIONAL RULE #1
(Pay a different amount IF...)
Remove this rule

[My funding account balance is more than: ⌄]  $ [5000]
Add another condition to make this rule more specific
(Above conditions must be true for Rule #1 to be executed)

In this case, what percentage amount would you like to transfer? [25] %
↳ Of what amount? [Entire funding account balance ⌄]
from $ [1000]
to $ [4999.99]

CONDITIONAL RULE #2
(Pay a different amount IF...)
Remove this rule if [SELECT A CONDITION TYPE ⌄]
- My funding account balance
- Payee account balance
- My recent income
- My recent income from certain source(s)
- Date of transfer is [SELECT OPERATOR ⌄]
- less than
- less than or equal to
- more than
- more than or equal to
- In the range of Add another condition to make this rule more specific
(Above conditions must be true for Rule #2 to be executed)

In this case, what percentage amount would you like to transfer? [15] %
↳ Of what amount? [Select ⌄]
- Entire funding account balance
- Entire balance minus a certain amount
- Sum of account deposits since last payment Deduct what amount from your account before calculating this percentage payment? $ [500]

Add another conditional rule (change transfer amount depending on various conditions)

[< BACK]                                          [NEXT >]
Define rules and conditions on percentage         Save this plan for later
amount payments                                   Cancel this plan

Fig. 6J

What type of transfer would you like to make and how much?

Select transfer type | Select ⌃
Simple transfer (fixed amount)
Percentage transfer
Hybrid transfer (fixed amount + percentage)

On what amount will you be calculating your percentage payments? | My income from within a certain amount of time ⌃
↳ For how much time before this payment would you like to calculate recent income? | 7 | Days ⌃

What percentage amount would you like to send? | ☐ %

Plus what fixed amount? $ ☐

Add another conditional rule (change transfer amount depending on various conditions)

[ < BACK ]

Define rules and conditions on hybrid payments

[ NEXT > ]

Save this plan for later
Cancel this plan

Fig. 6K

What type of transfer would you like to make and how much?

Select transfer type | Hybrid transfer (fixed amount + percentage) ⌃

On what amount will you be calculating your percentage payments? | My income from within a certain amount of time ⌃

↳ For how much time before this payment would you like to calculate recent income? | 7 | Days ⌃

What percentage amount would you like to send? | 10 | %

Plus what fixed amount? $ | 100 from $ | 1000.01
to $ | 10,000

CONDITIONAL RULE #1 (Pay a different amount IF...)
Remove this rule if | SELECT A CONDITION TYPE ⌃ | is | SELECT OPERATOR ⌃
| My funding account balance | | less than
| Payee account balance | | less than or equal to
| My recent income | | more than
| My recent income from certain source(s) | | more than or equal to
| Date of transfer | | In the range of Add another condition to make this rule more specific
(Above conditions must be true for Rule #2 to be executed)

In this case, what percentage amount would you like to transfer? | 15 | %

↳ Of what amount? | Entire funding account balance ⌃

Plus what fixed amount? | $ 0

Add another conditional rule (change transfer amount depending on various conditions)

[ < BACK ]        [ NEXT > ]

Define rules and conditions on hybrid payments

Save this plan for later
Cancel this plan

Fig. 6L

What amount would you like to send with each transfer?

Select transfer type: Hybrid transfer (fixed amount + percentage)

On what amount will you be calculating your percentage payments?: My income from within a certain amount of time ↳ For how much time before this payment would you like to calculate recent income? 7 Days What percentage amount would you like to send? 10 %

Plus what fixed amount? $ 100

CONDITIONAL RULE #1
(Pay a different amount IF...)
Remove this rule

My funding account balance is in the range of: from $ 1000.01 to $ 10,000

Add another condition to make this rule more specific
(Above conditions must be true for Rule #1 to be executed)

In this case, what percentage amount would you like to transfer? 15 %

↳ Of what amount? Entire funding account balance

Plus what fixed amount? $ 0

Fig. 6M

CONDITIONAL RULE #2
(Pay a different amount IF...)
Remove this rule $ 250 if | SELECT A CONDITION TYPE ∧ | is | SELECT OPERATOR ∧
--- | --- | ---
My funding account balance | | less than
Payee account balance | | less than or equal to
My recent income | | more than
My recent income from certain source(s) | | more than or equal to
Date of transfer | | in the range of Remove this condition from | April 1, Yearly
to | Aug 31, Yearly AND if | SELECT A CONDITION TYPE ∧ | is | SELECT OPERATOR ∧
--- | --- | ---
| Funding source balance | | is before
| Recent income | | is on or before
| Recent income from a certain source | | is after
| Date of scheduled bill payment | | is on or after
| | | in the range of Remove this condition Add another condition to make this rule more specific
(Above conditions must be true for Rule #2 to be executed)

In this case, what percentage amount would you like to transfer?  0 %

↳ Of what amount?  Entire funding account balance ∧

Plus what fixed amount?  $ 0

Add another conditional rule (change transfer amount depending on various conditions)

[ < BACK ]    [ NEXT > ]

Define rules and conditions on hybrid payments

Save this plan for later
Cancel this plan

Fig. 6N

Would you like to require manual approval before your transfers are sent?

Require confirmation before releasing funds?
- ○ No, release all my transfers automatically as I have set them
- ○ Yes, I want to approve each transfer before my money is moved
- ⊙ Yes, but I only want confirmation on certain parts of my plan ↳ Which parts of your plan do you want to enable confirmation for?
- ☐ Base/Default Rule
  Pay 10% of funding account balance, plus $100...
- ☐ Conditional Rule #1
  Unless balance is less than $1000, then transfer 5% of funding account balance
- ☑ Conditional Rule #2
  Or unless balance is between $4000 and $10000, then transfer 12% of funding account balance, plus $3000

How would you like to be notified for manual confirmation of these payments?
- ☐ Voice call
- ☑ Text Message
  ↳ Phone number: [          ]
- ☐ Email Allow payee to co-edit this plan?
- ○ No, just activate this plan as soon as I approve it
- ⊙ Yes and activate this plan only after both the payee and I approve it

[ < BACK ]        [ NEXT > ]

Save this plan for later
Cancel this plan

Determine user confirmation preferences & editing settings

Fig. 6O

Would you like to require manual approval before your transfers are sent?

Require confirmation before releasing funds?  ○ No, release all my transfers automatically as I have set them
○ Yes, I want to approve each transfer before my money is moved
  ↳ ☐ Move bank funds to escrow while awaiting my approval
    Bank transfers usually take 3-4 days. While approval is pending, move money to a temporary account so it can be sent ASAP once I approve.
⊙ Yes, but I only want confirmation on certain parts of my plan
  ↳ Which parts of your plan do you want to enable confirmation for?

☐ Base/Default Rule
Pay 10% of funding account balance, plus $100...
  ☐ Move bank funds to escrow while awaiting my approval
    Bank transfers usually take 3-4 days. While approval is pending, move money to a temporary account so it can be sent ASAP once I approve.

☐ Conditional Rule #1
Unless balance is less than $1000, then transfer 5% of funding balance
  ☐ Move bank funds to escrow while awaiting my approval
    Bank transfers usually take 3-4 days. While approval is pending, move money to a temporary account so it can be sent ASAP once I approve.

☑ Conditional Rule #2
Or unless balance is between $4000 and $10000, then transfer 12% of funding account balance, plus $3000
  ☑ Move bank funds to escrow while awaiting my approval
    Bank transfers usually take 3-4 days. While approval is pending, move money to a temporary account so it can be sent ASAP once I approve.

How would you like to be notified for manual confirmation of these deposits?
☐ Voice call
☑ Text Message
  ↳ Phone number: [            ]
☐ Email Allow payee to co-edit this plan?  ⊙ No, just activate this plan as soon as I approve it
○ Yes and activate this plan only after both the payee and I approve it

[ < BACK ]                    [ NEXT > ]
                              Save this plan for later
                              Cancel this plan Determine user confirmation & editing settings

Fig. 6P

Review and save your plan

| | |
|---|---|
| Payment Plan Nickname | Repayment plan for personal loan to John |
| Transferring from account | Wells Fargo Checking (---- ---- ---- 9491) |
| Transferring to account | AFM User: name@domain.com |
| Transfer to be made every | 14 days |
| Starting on | July 28, 2014 |
| Ending on | No end date |
| Limit | Pause plan after $150,000 has been payed, with no interest |
| Base Transfer Rule | Pay 10% of entire balance, plus $100... |
| Conditional Rule #1 | Unless balance is less than $1000, then transfer 5%, plus $0 |
| Conditional Rule #2 | Or unless balance is between $1000.01 and $10000, then transfer 12%, plus $3000 (text confirmation required) |
| Conditional type | Text confirmation, (555) 555-5555 |

[ < BACK ]                                    [ NEXT > ]

Save this plan for later
Cancel this plan

Review, save, and submit this plan

Fig. 6Q

LOGIN

Email [           ]

Password [           ]                    [ GO > ]

or REGISTER

First Name [           ]

Last Name [           ]

Email [           ]

Password [           ]                    [ GO > ]

Login or register to begin

Fig. 7A

What would you like to do?

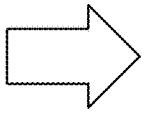

- Create a streaming plan for savings
  Save for a house or car, or set aside a percentage of your income to pay for taxes
- Create a streaming plan for paying another user
  Repay loans, send allowance, pay salaries or recurring fees, etc.
- Create a streaming plan for receiving payments from another user
  Receive a stream of money from another person or user
- Create a streaming plan to pay a recurring bill
  Set up an intelligent bill pay plan so you only make decisions when necessary
- Create a streaming plan to split funds or income
  Divide money or income from an account or account group into any number of other accounts
- Make a single one time payment to another user
  Manually send a simple payment from any connected account
- Make a single one time bill payment
  Manually pay a bill from any connected account
- View and manage all plans & payments: Timeline Priority Management Center
  Manually pay a bill from any connected account
- Request an incoming payment proposal
  Ask another person or user to propose a draft for a payment plan Base options from logged in account

Fig. 7B

Enter the email address of the AFM user who will be paying you

| name@domain.com |

Choose an account into which you'd like to receive these payments

From: | Select ∧ |
| Wells Fargo Savings (x-9491) |
| Wells Fargo Checking (x-2243) |
| AFM Account Balance |

Add Bank Account

Give a nickname to this incoming payment plan

| Re-payment plan for personal loan to Mary Ann |

| NEXT > |

Save this plan for later
Cancel this plan

Choose accounts to transfer from and to

Fig. 7C

How often would you like to be paid?

Define a payment frequency: Once every [14] number of [days / weeks / months / hours / minutes]

Beginning when? [July 28, 2014]

Ending when? [No end date]
Leave the above setting as "No end date" to keep this plan running until stopped manually How much would you like to be paid this recipient in total? $[    ]
To pay without limit, enter "0" or leave this field blank Add interest to increase the amount entered above, if any? [    ] % APR*
To pay without an interest rate, enter "0" or leave this field blank

[< BACK]                                [NEXT >]
                                Save this plan for later
Select the frequency, start date, limit, and interest    Cancel this plan
for these incoming payments

Fig. 7D

What amount would you like to receive with each transfer?

Would you like to receive a fixed amount or a percentage? [Select ⌄]
Simple transfer (fixed amount)
Percentage transfer
Hybrid transfer (fixed amount + percentage)

On what amount do you want percentages calculated for your payer's deposits? [Payers' income from within a certain amount of time ⌄]
↳ For how much time before this payment would you like recent income to be calculated? [7] [Days ⌄]

What percentage amount would you like to receive? [    ] %

Plus what fixed amount? $[    ]

Add a conditional rule (change transfer amount depending on various conditions)

[< BACK]                                [NEXT >]
                                Save this plan for later
Define incoming hybrid transfer rules and               Cancel this plan
conditions

Fig. 7E

What amount would you like to receive with each transfer?

Would you like to receive a fixed amount or a percentage? | Hybrid transfer (fixed amount + percentage) ⌃

On what amount do you want percentages calculated for your payer's deposits? | Payers' income from within a certain amount of time ⌃

↳ For how much time before this payment would you like recent income to be calculated? | 7 | Days ⌃

What percentage amount would you like to receive? | 10 | %

Plus what fixed amount? | $ 100 from $ 1000.01
to $ 10,000

CONDITIONAL RULE #1 (Pay a different amount IF...)
Remove this rule if | SELECT A CONDITION TYPE ⌃ | is | SELECT OPERATOR ⌃
| My funding account balance | | less than
| Payee account balance | | less than or equal to
| My recent income | | more than
| My recent income from certain source(s) | | more than or equal to
| Date of transfer | | in the range of Add another condition to make this rule more specific
(Above conditions must be true for Rule #1 to be executed)

In this case, what percentage amount would you like to receive? | 15 | %

↳ Of what amount? | Entire funding account balance ⌃

Plus what fixed amount? | $ 0

Add another conditional rule (change transfer amount depending on various conditions)

[ < BACK ]                    [ NEXT > ]
                              Save this plan for later
Define incoming hybrid transfer rules and    Cancel this plan
conditions

Fig. 7F

What amount would you like to receive with each transfer?

Would you like to receive a fixed amount or a percentage? | Hybrid transfer (fixed amount + percentage) ⌄

On what amount do you want percentages calculated for your payer's deposits? | Payers' income from within a certain amount of time ⌄
↳ For how much time before this payment would you like recent income to be calculated? | 7 | Days ⌄

What percentage amount would you like to receive? | 10 | %

Plus what fixed amount? | $ 100

CONDITIONAL RULE #1
(Pay a different amount IF...)
Remove this rule

Payer's funding account balance is in the range of: ⌄ | from $ 1000.01
 | to $ 10,000

Add another condition to make this rule more specific
(Above conditions must be true for Rule #1 to be executed)

In this case, what percentage amount would you like to receive? | 15 | %
↳ Of what amount? | Entire funding account balance ⌄

Plus what fixed amount? | $ 0

$ 250

CONDITIONAL RULE #2
(Pay a different amount IF...)
Remove this rule if | SELECT A CONDITION TYPE ⌄ | is | SELECT OPERATOR ⌄
| My funding account balance | | less than
| Payee account balance | | less than or equal to
| My recent income | | more than
| My recent income from certain source(s) | | more than or equal to
| Date of transfer | | in the range of Add another condition to make this rule more specific
(Above conditions must be true for Rule #2 to be executed)

In this case, what percentage amount would you like to receive? | 0 | %
↳ Of what amount? | Entire funding account balance ⌄

Plus what fixed amount? | $ 0

Add another conditional rule (change transfer amount depending on various conditions)

[ < BACK ]    [ NEXT > ]

Define incoming hybrid transfer rules and conditions

Fig. 7G

Save this plan for later
Cancel this plan

Should the payer have to manually approve transfers before they're sent?

Should the payer's confirmation be required before realeasing funds to you?
- ○ No, all transfers should be sent automatically
- ○ Yes, payer should approve each transfer before sending
- ⊙ Yes, but payer should only have to approve certain transfers
  - ↳ For which parts of your plan should the payer have to give confirmation?
    - ☐ Base/Default Rule
      Send 10% of payer's entire balance, plus $100...
    - ☐ Conditional Rule #1
      Unless payer's balance is less than $1000, then transfer 5% plud $0
    - ☑ Conditional Rule #2
      Or unless payer's balance is between $4000 and $10000, then transfer 12%, plus $3000

Receive notifications when money is deposited into your account?
- ⊙ No
- ○ Yes
  - ↳ ☐ Voice call ☑ Text Message
  ↳ Phone number: [          ]

☐ Email

[ < BACK ]                                    [ NEXT > ]
                                    Save this plan for later
Determine user confirmation preferences    Cancel this plan

Fig. 7H

Review and send this proposal for incoming payments

| | |
|---:|:---|
| Payment Plan Nickname | Repayment plan for loan to Mary Ann |
| Transferring from user | Mary Ann Kelley (mak@icloud.com |
| Transferring to account | Wells Fargo Checking (x-9382) |
| Transfer to be made every | 14 days |
| Starting on | July 28, 2014 |
| Ending on | No end date |
| Total to be paid | $20,000, with no interest |
| Base Transfer Rule | Pay 10% of payer's entire balance, plus $100... |
| Conditional Rule #1 | Unless payer's balance is less than $1000, then transfer 5%, plus $0 |
| Conditional Rule #2 | Or unless balance is between $1000.01 and $10000, then transfer 12%, plus $3000 (payer confirmation required) |
| Transfer notification preference | Don't notify me when transfers clear |

[ < BACK ]          [ SAVE AND SEND THIS PROPOSAL > ]

Save this plan for later
Cancel this plan

Review, save, and start this plan

Fig. 7I

LOGIN

Email [                    ]

Password [                    ]          [ GO > ]

or REGISTER

First Name [                    ]

Last Name [                    ]

Email [                    ]

Password [                    ]          [ GO > ]

Login or register to begin

Fig. 8A

What would you like to do?

Create a streaming plan for savings
Save for a house or car, or set aside a percentage of your income to pay for taxes Create a streaming plan for paying another user
Repay loans, send allowance, pay salaries or recurring fees, etc.

Create a streaming plan for receiving payments from another user
Receive a stream of money from another person or user

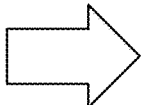 <u>Create a streaming plan to pay a recurring bill</u>
Set up an intelligent bill pay plan so you only make decisions when necessary Create a streaming plan to split funds or income
Divide money or income from an account or account group into any number of other accounts Make a single one time payment to another user
Manually send a simple payment from any connected account Make a single one time bill payment
Manually pay a bill from any connected account View and manage all plans & payments: Timeline Priority Management Center
Manually pay a bill from any connected account Request an incoming payment proposal
Ask another person or user to propose a draft for a payment plan Base options from logged in account

Fig. 8B

Enter the payer's name you'd like these payments to come from

| Thomas Kelley |

Enter the payer's phone number you'd like these payments to come from

| 555-202-5555 |

Enter the payer's address you'd like these payments to come from

| 120 State Street Oakland CA 90020 |

Give a nickname to this bill payment plan

| Plan to pay my water bill |

From: | Select ∧ |
| Wells Fargo Savings (x-9491) |
| Wells Fargo Checking (x-2243) |
| AFM Account Balance |

Add Bank Account

| < BACK |   | NEXT > |

Save this plan for later
Cancel this plan

Set up bill pay "from" information and funding account

Fig. 8C

Set up your payee's information below

Select payee type: | Select ∧ |
| Individual |
| Corporation, business, or legal entity |
| AFM Account Balance |

Enter the name of the person or entity you'd like to pay

| Virgin Mobile |

Enter the payee's full address where we would mail payments if necessary

| ATN: Accts Receivable 88 Universe Lane LA CA 22334 |

Enter your account number with this payee if applicable

| 2320744471 |

| < BACK |   | NEXT > |

Save this plan for later
Cancel this plan

Set up bill pay "to" information

Fig. 8D

Set up your payee's information below

Select payee type: | Select ⌃ |
| Individual |
| Corporation, business, or legal entity |
| AFM Account Balance |

Enter the name of the person or entity you'd like to pay

| Virgin Mobile |
| Virgin Mobile |

Enter the payee's full address where we would mail payments if necessary

| 88 Wireless Court, San Francisco CA 94105 |

Enter your account number with this payee if applicable

| 8033154 |

Username

| lifeisgood |

Password

| •••••••• |

[ < BACK ]  [ NEXT > ]

Set up bill pay "to" information

Save this plan for later
Cancel this plan

Fig. 8E

How often would you like to pay your bill?
(If no balance is due on a scheduled date, no payment will be made)

Define a payment frequency: Once every [ 14 ] number of

| days |
| weeks |
| months |
| hours |
| minutes |

Beginning when? [ July 28, 2014 ]

Ending when? [ No end date ]

Leave the above setting as "No end date" to keep this plan running until stopped manually How much would you like to pay this recipient in total? $ [          ]
To pay without limit, enter "0" or leave this field blank Add interest to increase the amount entered above, if any? [          ] % APR*
To pay without an interest rate, enter "0" or leave this field blank

[ NEXT > ]

Select the frequency, start date, limit, and interest rate for these payments

Fig. 8F

How often would you like to pay your bill?
(If no balance is due on a scheduled date, no payment will be made)

When would you like to send this payment?

○ Pay automatically when a bill is due
⊙ Allow me to schedule payments
↳ Define a payment frequency: Once every [14] number of [days ▼]
weeks
months
hours
minutes Beginning when? [July 28, 2016]
Ending when? [No end date] 📅
Leave the above setting as "No end date" to keep this plan running until stopped manually How much would you like to pay this recipient in total? $[          ]
To pay without limit, enter "0" or leave this field blank Add interest to increase the amount entered above, if any? [          ] % APR*
To pay without an interest rate, enter "0" or leave this field blank

[< BACK]   [NEXT >]
Select a frequency, start date, limit, and   Save this plan for later
interest rate for these payments   Cancel this plan

Fig. 8G

What amount would you like to send with each transfer?
How much would you like  ○ Pay the amount due on my bill, if any
to send with each transfer?  ⊙ Pay a fixed amount $[          ]

Add a conditional rule (change transfer amount depending on various conditions)

[< BACK]   [NEXT >]
Define rules, conditions, and amounts on a   Save this plan for later
bill pay   Cancel this plan

Fig. 8H

What amount would you like to send with each transfer?

How much would you like to send with each transfer?
○ Pay the amount due on my bill, if any
⊙ Pay a fixed amount $ [        ]

$ 200

CONDITIONAL RULE #1 if
(Pay a different amount IF...)
Remove this rule

| SELECT A CONDITION TYPE ⌃ |
| Funding source balance |
| Recent income |
| My recent income from a certain source |
| Date of scheduled bill payment |
| Bill due date |
| Amount due | is
| SELECT OPERATOR ⌃ |
| less than |
| less than or equal to |
| more than |
| more than or equal to |
| in the range of |

(Adds as many rules as the user chooses as long as they do not overlap)

Add another condition to make this rule more specific
(Above conditions must be true for Rule #1 to be executed)

In this case how much would you like to send with each transfer?
○ Pay the amount due on my bill, if any
⊙ Pay a fixed amount

↳ $ [        ]

Add another conditional rule (change transfer amount depending on various conditions)

[ < BACK ]

Define rules, conditions, and amounts on a bill pay

[ NEXT > ]
Save this plan for later
Cancel this plan

Fig. 8I

What amount would you like to send with each transfer?

How much would you like to send with each transfer?   ○ Pay the amount due on my bill, if any
⊙ Pay a fixed amount $ [                    ]

$ 200

CONDITIONAL RULE #1
(Pay a different amount IF...)
Remove this rule if | Amount due ⌃ | is | less than or equal to ⌃

Remove this condition $ 500

AND if | SELECT A CONDITION TYPE ⌃ | is | SELECT OPERATOR ⌃

| Funding source balance |
| Recent income |
| My recent income from a certain source |
| Date of scheduled bill payment |
| Bill due date |
| Amount due (Already chosen above) |

| less than |
| less than or equal to |
| more than |
| more than or equal to |
| in the range of |

(Adds as many conditions as the user chooses as long each has a different parameter)

Remove this condition

Add another condition to make this rule more specific
(Above conditions must be true for Rule #1 to be executed)

In this case how much would you like to send with each transfer?   ○ Pay the amount due on my bill, if any
⊙ Pay a fixed amount $ [                    ]

Add another conditional rule (change transfer amount depending on various conditions)

[ < BACK ]

Define rules, conditions, and amounts on a bill pay

[ NEXT > ]

Save this plan for later
Cancel this plan

Fig. 8J

What amount would you like to send with each transfer?

How much would you like to send with each transfer?  ○ Pay the amount due on my bill, if any
⊙ Pay a fixed amount $ [        ]

CONDITIONAL RULE #1  if [Amount due ⌃]  is [less than or equal to ⌃]  $ [200]
(Pay a different amount IF...)
Remove this condition
Remove this rule AND if [Funding account balance ⌃]  is [more than or equal to ⌃]  $ [500]
Remove this condition Add another condition to make this rule more specific
(Above conditions must be true for Rule #1 to be executed)

In this case how much would you like to send with each transfer?  ○ Pay the amount due on my bill, if any
⊙ Pay a fixed amount
$ [        ]

from $ [200.01]
to $ [300]

CONDITIONAL RULE #2  if [Amount due ⌃]  is [is in the range of ⌃]
(Pay a different amount IF...)
Remove this condition
Remove this rule AND if [Funding account balance ⌃]  is [more than or equal to ⌃]  $ [500]
Remove this condition Add another condition to make this rule more specific
(Above conditions must be true for Rule #2 to be executed)

In this case how much would you like to send with each transfer?  ○ Pay the amount due on my bill, if any
⊙ Pay a fixed amount
$ [200]

Add another conditional rule (change transfer amount depending on various conditions)

[< BACK]                                              [NEXT >]
Define rules, conditions, and amounts on a            Save this plan for later
bill pay                                              Cancel this plan

Fig. 8K

What amount would you like to send with each transfer?

How much would you like to send with each transfer? $ [_____]

Add a conditional rule (change transfer amount depending on various conditions)

[ < BACK ]          [ NEXT > ]
                    Save this plan for later
Define rules, conditions, and amounts on a    Cancel this plan
bill pay

Fig. 8L

What amount would you like to send with each transfer?

○ $ [_____]

⦿ Pay the amount due on my bill, if any

CONDITIONAL RULE #1   if | SELECT A CONDITION TYPE ⌃ | is | SELECT OPERATOR ⌃ |    Dec 1, 2016
(Pay a different amount      | Funding source balance        |    | is before                  |
IF...)                        | Recent income                 |    | is on or before            |
Remove this rule              | My recent income from a certain source | | is after        |
                              | Date of scheduled bill payment  |     | is on or after       |
                                                                         | in the range of      |

(Adds as many rules as     Add another condition to make this rule more specific
the user chooses as        (Above conditions must be true for Rule #1 to be executed)
long as they do not
overlap)
                           ○ In this case how much would you   $ [_____]
                             like to send with each transfer?

⦿ Pay the amount due on my bill, if any

Add another conditional rule (change transfer
amount depending on various conditions)

[ < BACK ]                                                        [ NEXT > ]
                                                                  Save this plan for later
Define rules, conditions, and amounts on a                        Cancel this plan
bill pay

Fig. 8M

What amount would you like to send with each transfer?

◉ $ 90

○ Pay the amount due on my bill, if any

CONDITIONAL RULE #1    if | Date of scheduled bill payment ⌃ | is | after ⌃ |    ▸ $ Dec 1, 2016 🗓
(Pay a different amount IF...)
Remove this condition
Remove this rule

▸ $ 500

AND if | SELECT A CONDITION TYPE ⌃ | is | SELECT OPERATOR ⌃
| Funding source balance | | less than |
| Recent income | | less than or equal to |
| My recent income from a certain source | | more than |
| ~~Date of scheduled bill payment~~ | | more than or equal to |
| Remove this condition | | in the range of |

(Adds as many conditions as the user chooses as long each has a different parameter)

Add another condition to make this rule more specific
(Above conditions must be true for Rule #1 to be executed)

◉ In this case how much would you like to send with each transfer?    $ 45

○ Pay the amount due on my bill, if any

Add another conditional rule (change transfer amount depending on various conditions)

[< BACK]                                             [NEXT >]

Define rules, conditions, and amounts on a bill pay
                                                     Save this plan for later
                                                     Cancel this plan

Fig. 8N

What amount would you like to send with each transfer?

⊙ $ [90]

○ Pay the amount due on my bill, if any

CONDITIONAL RULE #1
(Pay a different amount IF...)
Remove this rule if [Date of scheduled transfer ⌃] is [after ⌃] → $ [Dec 1, 2015] 🗓

Remove this condition

AND if [Funding account balance ⌃] is [more than or equal to ⌃] → $ [500]

Remove this condition

Add another condition to make this rule more specific
(Above conditions must be true for Rule #1 to be executed)

⊙ In this case how much would you like to send with each transfer?   $ [45]

○ Pay the amount due on my bill, if any

CONDITIONAL RULE #2
(Pay a different amount IF...)
Remove this rule if [Funding account balance ⌃] is [is more than ⌃] → $ [10,000]

Remove this condition

Add another condition to make this rule more specific
(Above conditions must be true for Rule #2 to be executed)

In this case how much would you like to send with each transfer?   $ [200]

Add another conditional rule (change transfer amount depending on various conditions)

[< BACK]

Define rules, conditions, and amounts on a bill pay

[NEXT >]

Save this plan for later
Cancel this plan

Fig. 8O

Would you like to require manual approval before your payments are sent?

Require confirmation before releasing funds?
- ○ No, always pay this bill automatically as I have set up this plan
- ○ Yes, I want to approve each payment before my money is moved
- ⦿ Yes, but I only want confirmation on certain parts of my plan
  ↳ Which parts of your plan do you want to enable confirmation for?
    - ☐ Base/Default Rule
      Pay $0
    - ☐ Conditional Rule #1
      Unless the bill is ≤ $200 AND funding account has ≥ $500, then pay the amount due
    - ☑ Conditional Rule #2
      Or unless bill is $200.01 - $300 and funding account has ≥ $500, then pay $200

Receive notifications when money is deposited into your account?
- ☐ Voice call
- ☑ Text Message
  ↳ Phone number: [          ]
- ☐ Email

[ < BACK ]                                    [ NEXT > ]

Determine user confirmation preferences       Save this plan for later
                                              Cancel this plan

Fig. 8P

Would you like to require manual approval before your payments are sent?

Enable confirmation before releasing your transfers?   ○ No, always pay this bill automatically as I have set up this plan
○ Yes, I want to approve each payment before my money is moved
　　↳ ☐ Move bank funds to escrow while awaiting my approval
　　　　Bank transfers usually take 3-4 days. While approval is pending, move money to a temporary account so it can be sent ASAP once I approve.

⊙ Yes, but I only want confirmation on certain parts of my plan
　↳ Which parts of your plan do you want to enable confirmation for?

☐ Base/default bill pay rule
Pay $0
　☐ Move bank funds to escrow while awaiting my approval. Bank transfers usually take 3-4 days. While approval is pending, move money to a temporary account so it can be sent ASAP once I approve.

☐ Conditional Rule #1
Unless the bill is ≤ $200 AND funding account has ≥ $500, then pay the amount due
　☐ Move bank funds to escrow while awaiting my approval. Bank transfers usually take 3-4 days. While approval is pending, move money to a temporary account so it can be sent ASAP once I approve.

☑ Conditional Rule #2
Or unless bill is $200.01 - $300 and funding account has ≥ $500, then pay $200
　☑ Move bank funds to escrow while awaiting my approval. Bank transfers usually take 3-4 days. While approval is pending, move money to a temporary account so it can be sent ASAP once I approve.

How would you like to be notified for manually confirming deposits?
☐ Voice call
☑ Text Message
　↳ Phone number: [          ]
☐ Email

[ < BACK ]                                    [ NEXT > ]
                                              Save this plan for later
Determine user confirmation & editing settings         Cancel this plan

Fig. 8Q

Review and save your plan

| | |
|---:|:---|
| Bill Payment Plan Nickname | Repayment plan for loan to Mary Ann |
| Transferring from account | Wells Fargo Checking (---- ---- ---- 9491) |
| "From" information | Thomas Kelley, (555) 202-5555, 120 State Street Oakland CA 90020 |
| Transferring to | Virgin Mobile |
| Transfer to be made every | 14 days |
| Starting on | July 28, 2016 |
| Ending on | No end date |
| Limit | No limit |
| Base Transfer Rule | Pay Nothing |
| Conditional Rule #1 | Unless bill is $200 or less and funding account has at least $500, then pay the bill in full |
| Conditional Rule #2 | Or if bill is $200.01 - $300 and funding account has at least $500, pay $200 flat (text confirmation required) |
| Confirmation type | Text confirmation, (555) 555-5555 |

[ < BACK ]        [ SAVE AND ACTIVATE > ]

Save this plan for later
Cancel this plan

Review, save, and start this plan

Fig. 8R

Bose SoundLink Mini Bluetooth
by Bose
★★★★★ 1,864 customer reviews | 788 answered questions Share ✉ f T ⊕

Price: $199.00 & FREE Shipping. Details

In Stock.
Ships from and sold by Amazon.com. Gift-wrap available.
Want it tomorrow, April 4? Order within 1 hr 43 mins Details

- Advanced audio performance
- The most compact speaker from Bose easily goes where you go
- Wirelessly connects to your Bluetooth device
- Rechargeable battery plays up to 7 hours
> See more product details 9 new from $199.00

Qty: 1

☐ Yes, I want FREE Two-Day Shipping with Amazon Prime

[Add to Cart]

or

Sign in to turn on 1-Click ordering.

[Add to Wish List]

"AFM" this item >
Create a save and purchase plan for this item.

Trade in your item
Get up to a $54.70 Gift Card.      [Trade in]   Learn More

More buying choices
CircuitCity
$199.00 + Free Ship...     [Add to Cart]

Pic 1

Protect and Personalize Your Soundlink Mini
Soft cover allows you to customize the appearance of Sound Link Mini speakers while providing added protection for the aluminum body from scratches or abrasions. Available in Blue, Green or Orange. >See more

| Pic 1 | Pic 2 | Pic 3 | Pic 4 | Pic 5 |

Find an item online and create a save and purchase plan for it

Fig. 9A

Choose your shipping options

Shipment 1 of 1

Shipping from Amazon.com (Learn more)

Shipping to: Mary Ann Keller, 555 Junction Dr, Los Angeles, CA 90020

- Bose SoundLink Mini Bluetooth Speaker
  $199.00 - Quantity: 1
  Sold by: Amazon.com LLC Change quantities or delete Choose a shipping speed
○ Free Shipping (5-8 business days)
◉ Standard Shipping (3-5 business days) $13.95

Continue

Continue

Find an item online and create a save and purchase plan for it

Fig. 9B

Is this the item you would like to save and purchase?

Bose SoundLink Mini
Bluetooth Speaker
$199.00

Plus $13.95 Standard Shipping (3-5 business days) to
Mary Ann Keller, 555 Junction Dr., Los Angeles CA, 90020

CURRENT TOTAL
$212.95

[ NO, CANCEL > ]          [ YES, CONTINUE > ]
                          Save this plan for later
                          Cancel this plan Confirm item and shipping preference for save and purchase plan Which account will fund your save and purchase plan?

From: | Select ∧ |
| --- |
| Wells Fargo Savings (x-9491) |
| Wells Fargo Savings (x-2243) |
| AFM Account Balance |

Add Bank Account

Item you are saving up to purchase from Amazon.com

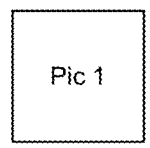

Bose SoundLink Mini
Bluetooth Speaker
$199.00
    Plus $13.95 Standard Shipping (3-5 business days)

CURRENT TOTAL
$212.95

A savings bin will be automatically created for this plan, Nickname your bin

| Savings bin for Bose SoundLink Mini |
| --- |

Give a nickname to this save and purchase plan

| Savings plan for Bose SoundLink Mini |
| --- |

| NEXT > |
| --- |

Save this plan for later
Cancel this plan

Choosing a funding account, create and
name a savings bin, and name the plan

Fig. 9D

How often would you like to save for your item?

Define a savings frequency: Once every [14] number of [days / weeks / months / hours / minutes]

Beginning when? [July 28, 2014]

Ending when? [No end date]
Leave the above setting as "No end date" to keep this plan running until completed or stopped manually If this item's price and/or shipping rates go up, what's the most you're willing to spend on it total (including shipping)  $ [250]
Leave blank or enter "0" if you want to set the maximum amount to be saved as the current price of the item plus shipping, or $212.95

What would you like to do if the total price for the items & shipping goes above the limit you set above?
○ Keep saving anyway until the limit set above is reached
○ Pause the plan and let me decide what to do next
⦿ Cancel the plan and:
 ○ Leave all saved funds in this plan's savings bin
 ○ Return all saved funds to this plan's funding account
 ⦿ Move all saved funds from this plan to my main balance on this system

[< BACK]  [NEXT >]
Save this plan for later
Cancel this plan

Select the frequency, start and end dates, and limits for this plan

Fig. 9E

What amount would you like to save with each transfer?

| Select transfer type | Select ⌃ |
| --- | --- |
| | Simple transfer (fixed amount) |
| | Percentage transfer |
| | Hybrid transfer (fixed amount + percentage) |

On what amount will you be calculating your percentage savings transfers? | My income from within a certain amount of time ⌃

↳ For how much time before this payment would you like to calculate recent income? | 7 | Days ⌃

What percentage amount would you like to save? [ ] %

Plus what fixed amount? $ [ ]

Add another conditional rule (change transfer amount depending on various conditions)

[ < BACK ]                               [ NEXT > ]

Save this plan for later
Cancel this plan

Define conditions and rules on a hybrid save and purchase plan

Fig. 9F

What amount would you like to save with each transfer?

Select transfer type | Hybrid transfer (fixed amount + percentage) ⌃

On what amount will you be calculating your percentage deposits? | My income from within a certain amount of time ⌃

↳ For how much time before this payment would you like to calculate recent income? | 7 | Days ⌃

What percentage amount would you like to save? | .25 | %

Plus what fixed amount? | $ | 10

→ $ 4000

CONDITIONAL RULE #1 (Pay a different amount IF...)
Remove this rule if | SELECT A CONDITION TYPE ⌃ | is | SELECT OPERATOR ⌃
--- | --- | --- | ---
| My funding account balance | | less than
| Payee account balance | | less than or equal to
| My recent income | | more than
| My recent income from certain source(s) | | more than or equal to
| Date of transfer | | in the range of Add another condition to make this rule more specific
(Above conditions must be true for Rule #1 to be executed)

In this case, what percentage amount would you like to save? | | %

↳ Of what amount? | Entire funding account balance ⌃

Plus what fixed amount? | $

☑ Or just check here to save the remaining balance needed

Add another conditional rule (change transfer amount depending on various conditions)

< BACK

Define conditions and rules on a hybrid save and purchase plan

NEXT >

Save this plan for later
Cancel this plan

Fig. 9G

What amount would you like to save with each transfer?

Select transfer type: Hybrid transfer (fixed amount + percentage)

On what amount will you be calculating your percentage deposits? My income from within a certain amount of time ↳ For how much time before this payment would you like to calculate recent income? 7 Days What percentage amount would you like to save? .25 %

Plus what fixed amount? $ 10

$ 4000

CONDITIONAL RULE #1 (Pay a different amount IF...) if SELECT A CONDITION TYPE is SELECT OPERATOR
Remove this rule

| SELECT A CONDITION TYPE | SELECT OPERATOR |
|---|---|
| My funding account balance | less than |
| Payee account balance | less than or equal to |
| My recent income | more than |
| My recent income from certain source(s) | more than or equal to |
| Date of transfer | in the range of |

Add another condition to make this rule more specific
(Above conditions must be true for Rule #1 to be executed)

In this case, what percentage amount would you like to save? %

↳ Of what amount? Entire funding account balance

Plus what fixed amount? $

☑ Or just check here to save the remaining balance needed

Add another conditional rule (change transfer amount depending on various conditions)

Define conditions and rules on a hybrid save and purchase plan

Fig. 9H

CONDITIONAL RULE #2 if | SELECT A CONDITION TYPE | is | SELECT OPERATOR | → $ 250
(Pay a different amount
IF...)
Remove this rule

| SELECT A CONDITION TYPE | SELECT OPERATOR |
|---|---|
| My funding account balance | less than |
| Payee account balance | less than or equal to |
| My recent income | more than |
| My recent income from certain source(s) | more than or equal to |
| Date of transfer | in the range of |

Add another condition to make this rule more specific
(Above conditions must be true for Rule #2 to be executed)

In this case, what percentage amount would you like to save?    [ 0 ] %

↳ Of what amount? [ Entire funding account balance ⌄ ]

Plus what fixed amount?    $ [ 0 ]

☐ Or just check here to save the remaining balance needed

Add another conditional rule (change transfer
amount depending on various conditions)

[ < BACK ]         [ NEXT > ]

Save this plan for later
Cancel this plan

Define conditions and rules on a hybrid save
and purchase plan

Fig. 9I

Would you like to require manual approval before your savings transfers are made?

Require confirmation before releasing funds?
- ○ No, release all transfers automatically as I have set them
- ○ Yes, I want to approve each transfer before my money is moved
- ⦿ Yes, but I only want to use confirmation on certain parts of my plan ↳ Which parts of your plan do you want to require confirmation for?
- ☐ Base/Default Rule
  Save .25% of entire balance, plus $10...
- ☑ Exception #1
  Unless balance is more than $1000, then save the remaining amount needed
- ☐ Exception #2
  Or unless balance is less than $250, don't save anything How would you like to be notified for manual confirmation of these actions?
- ☐ Voice call
- ☑ Text Message
  　↳ Phone number: [          ]
- ☐ Email When your plan has saved enough money to buy this item, purchase it automatically?
- ⦿ No, send me a notification and let me decide what to do at that time
- ○ Yes, just buy the item and send it to me at the address I provided when I set up the plan
- ○ Yes, but send the item to me at a different address

[ < BACK ]　　　　　　　　　　　　　　　　　　　　[ NEXT > ]

Configure user confirmation preferences

Save this plan for later
Cancel this plan

Fig. 9J

Review and start your plan

| | |
|---|---|
| Save & Purchase plan nickname | Savings plan for Bose Soundlink Mini |
| Item to purchase | Bose Soundlink Mini from Amazon.com |
| Transferring from account | Wells Fargo Checking (---- ---- ---- 9491) |
| Transferring to savings bin | Savings bin for Bose Soundlink Mini |
| Transfer to be made every | 14 days |
| Starting on | July 28, 2015 |
| Ending on | No end date |
| Limit | Save no more than $250 for this product |
| If item price(s) rise(s) beyond limit | Cancel the plan and return funds to my main system balance |
| Base Rule | Save .25% of entire balance, plus $10... |
| Conditional Rule #1 | Unless bill is more than $4000, then save the remaining balance needed for the purchase (text confirmation required) |
| Conditional Rule #2 | Or unless balance is less than $250, don't do anything |
| Confirmation type | Text confirmation, (555) 555-5555 |
| Purchase confirmation setting | When this plan has saved enough to buy the item, contact me so I can decide what to do next |
| Shipping address | Mary Keller, 44 Junction way, Los Angeles, CA, 90020 |

[ < BACK ]   [ SAVE AND ACTIVATE > ]

Save this plan for later
Cancel this plan

Review, save, and activate this plan

Fig. 9K

LOGIN

Email [                    ]

Password [                    ]  [ GO > ]

or REGISTER

First Name [                    ]

Last Name [                    ]

Email [                    ]

Password [                    ]  [ GO > ]

Login or register to begin

Fig. 10A

What would you like to do?

Create a streaming plan for savings
        Save for a house or car, or set aside a percentage of your income to pay for taxes Create a streaming plan for paying another user
        Repay loans, send allowance, pay salaries or recurring fees, etc.

Create a streaming plan for receiving payments from another user
        Receive a stream of money from another person or user Create a streaming plan to pay a recurring bill
        Set up an intelligent bill pay plan so you only make decisions when necessary

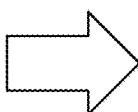

<u>Create a streaming plan to split funds or income</u>
        Divide money or income from an account or account group into any number of other accounts Make a single one time payment to another user
        Manually send a simple payment from any connected account Make a single one time bill payment
        Manually pay a bill from any connected account View and manage all plans & payments: Timeline Priority Management Center
        Manually pay a bill from any connected account Request an incoming payment proposal
        Ask another person or user to propose a draft for a payment plan Base options from logged in account

Fig. 10B

Which account will you be withdrawing from to fund this transfer plan?

From: Wells Fargo Savings (x-9491) ⌃

Add Bank Account

Choose the first account to which you'd like to direct transfers

To: Wells Fargo Savings (x-2243) ⌃

Add Bank Account

Give a nickname to this receiving account

Business operations fund

How much to pay this recipient in total?

0

Leave blank or enter "0" to pay without limit

Choose the second account to which you'd like to direct transfers

To: My AFM Account Balance ⌃

Add Bank Account

Give a nickname to this receiving account

My payout as owner of 75% of shares of business

How much to pay this recipient in total?

0

Leave blank or enter "0" to pay without limit

Choose accounts to transfer from and to

Fig. 10C

Choose another account to which you'd like to direct transfers

To: | Select |
| --- |
| Wells Fargo Checking (x-2243) |
| My AFM Account Balance |
| Add another person's or business' bank account |
| Add another person's or business' AFM account |

↳ Account Holder's First Name [ ]

Account Holder's Last Name [ ]

Account Number [ ]

Routing Number [ ]

Give a nickname to this receiving account

[ Payout to my partner, owner of 25% of shares of business ]

Add another destination account

How much to pay this recipient in total?

[ 0 ]

Leave blank or enter "0" to pay without limit

Give a nickname to this multiple account transfer plan

[ Send business operations funds and pay partners ]

[ NEXT > ]

Choose accounts to transfer from and to

Fig. 10D

How often would you like to make transfers into your receiving accounts?

Define a payment frequency: Once every [14] number of 
weeks
months
hours
minutes Beginning when? [July 28, 2014]

Ending when? [No end date]

Leave the above setting as "No end date" to keep this plan running until stopped manually

[< BACK]   [NEXT >]

Save this plan for later
Cancel this plan

Select the frequency and start date for the transfers to be made

Fig. 10E

What amount would you like to send with each transfer?

Select transfer type: | Select ∧
| Simple transfer (fixed amount)
| Percentage transfer
| Hybrid transfer (fixed amount + percentage)

What percentage amount would you like to send to Business operations fund? [      ]

Percentage of what amount? | Funding account income from within a certain amount of time ∧

↳ For how much time before this payment would you like to calculate recent income? | 7 | Days ∧

Plus what fixed amount? [      ]

<u>Add another conditional rule</u> (change transfer amount depending on various conditions)

What percentage amount would you like to send to My payout as owner of 75% of shares of business? [      ]

Percentage of what amount? | Funding account income from within a certain amount of time ∧

↳ For how much time before this payment would you like to calculate recent income? | 7 | Days ∧

Plus what fixed amount? [      ]

<u>Add another conditional rule</u> (change transfer amount depending on various conditions)

Define amounts for multiple hybrid transfers

Fig. 10F

What percentage amount would you like to send to Payout to my partner, owner of 25% of shares of business? [    ] %

Percentage of what amount? [Funding account income from within a certain amount of time ⌃]

↳ For how much time before this payment would you like to calculate recent income? [7] [Days ⌃]

Plus what fixed amount? $ [    ]

Add another conditional rule (change transfer amount depending on various conditions)

[< BACK]          [NEXT >]

Save this plan for later
Cancel this plan

Define amounts for multiple hybrid transfers

Fig. 10G

What amount would you like to send with each transfer?

Select transfer type: [Hybrid transfer (fixed amount + percentage) ∧]

What percentage amount would you like to send to Business operations fund? [20]

Percentage of what amount? [Funding account income from within a certain amount of time ∧]

↳ For how much time before this payment would you like to calculate recent income? [7] [Days ∧]

Plus what fixed amount? $[0]

$[2,000,000.01]

CONDITIONAL RULE #1
For Business Operations Fund
(Pay a different amount IF...)
Remove this rule if [Funding account balance ∧] is [more than ∧]
Remove this condition
Add another condition to make this rule more specific
(Above conditions must be true for Rule #1 to be executed)

In this case, what percentage amount would you like to transer? [10] %

↳ Of what amount? [Entire funding account balance ∧]

Plus what fixed amount? $[20,000]

from $[200,000]
to $[2,000,000]

CONDITIONAL RULE #2
For Business Operations Fund
(Pay a different amount IF...)
Remove this rule if [Funding account balance ∧] is [in the range of ∧]
Remove this condition
Add another condition to make this rule more specific
(Above conditions must be true for Rule #2 to be executed)

In this case, what percentage amount would you like to transfer? [15] %

↳ Of what amount? [Entire balance minus a certain amount ∧]

Deduct what amount from your account before calculating this percentage payment? $[20,000]

Plus what fixed amount? [0]

Add another conditional rule (change transfer amount depending on various conditions)

Define conditions for multiple hybrid transfers

Fig. 10H

What percentage amount would you like to send to My payout as owner of 75% of shares of business? `60`

Percentage of what amount? `Funding account income from within a certain amount of time ⌄`

↳ For how much time before this payment would you like to calculate recent income? `7` `Days ⌄`

Plus what fixed amount? `0`

$ `2,000,000.01`

CONDITIONAL RULE #1
For my payout as owner of 75% of shares of business
(Pay a different amount IF...)
Remove this rule if `Funding account balance ⌄` is `more than ⌄`
Remove this condition
Add another condition to make this rule more specific
(Above conditions must be true for Rule #1 to be executed)

In this case, what percentage amount would you like to transfer? `30` %

↳ Of what amount? `Entire funding account balance ⌄`

Plus what fixed amount? $ `0` from $ `200,000`
to $ `2,000,000`

CONDITIONAL RULE #2
For my payout as owner of 75% of shares of business
(Pay a different amount IF...)
Remove this rule if `Funding account balance ⌄` is `in the range of ⌄`
Remove this condition
Add another condition to make this rule more specific
(Above conditions must be true for Rule #2 to be executed)

In this case, what percentage amount would you like to transfer? `45` %

↳ Of what amount? `Entire balance minus a certain amount ⌄`

Deduct what amount from your account before calculating this percentage payment? $ `20,000`

Plus what fixed amount? `0`

Add another conditional rule (change transfer amount depending on various conditions)

Define conditions for multiple hybrid transfers

Fig. 10I

What percentage amount would you like to send to Payout to my partner, owner of 25% of shares of business? `20` %

Percentage of what amount? `Funding account income from within a certain amount of time ⌃`

↳ For how much time before this payment would you like to calculate recent income? `7` `Days ⌃`

Plus what fixed amount? $ `0`

$ `2,000,000.01`

CONDITIONAL RULE #1
For my payout as owner of 25% of shares of business
(Pay a different amount IF...)
Remove this rule if `Funding account balance ⌃` is `more than ⌃`
Remove this condition
Add another condition to make this rule more specific
(Above conditions must be true for Rule #1 to be executed)

In this case, what percentage amount would you like to transfer? `10` %

↳ Of what amount? `Entire funding account balance ⌃`

Plus what fixed amount? $ `0` from $ `200,000`
to $ `2,000,000`

CONDITIONAL RULE #2
For my payout as owner of 25% of shares of business
(Pay a different amount IF...)
Remove this rule if `Funding account balance ⌃` is `in the range of ⌃`
Remove this condition
Add another condition to make this rule more specific
(Above conditions must be true for Rule #2 to be executed)

In this case, what percentage amount would you like to transfer? `15` %

↳ Of what amount? `Entire balance minus a certain amount ⌃`

Deduct what amount from your account before calculating this percentage payment? $ `20,000`

Plus what fixed amount? `0`

Add another conditional rule (change transfer amount depending on various conditions)

`< BACK`    `NEXT >`

Save this plan for later
Cancel this plan

Define conditions for multiple hybrid transfers

Fig. 10J

Would you like to require manual approval before your transfers are sent?

Require confirmation before releasing funds?
- ○ No, send all transfers automatically as I have set them
- ○ Yes, I want to approve each transfer before my money is moved
- ⦿ Yes, but I only want confirmation on certain parts of my plan
  ↳ Which parts of your plan do you want to enable confirmation for?

Business operations fund
- ☐ Base/Default Rule
  Send 20% of entire balance, plus $0...
- ☐ Conditional Rule #1
  Unless balance is more than $2,000,000.01, then transfer 10%, plus $20K
- ☑ Conditional Rule #2
  Or unless balance is between $200,000 and $2,000,000, then transfer 15% of (balance minus $20,000), plus $0

My payout as owner of 75% of shares of business
- ☐ Base/Default Rule
  Send 60% of entire balance, plus $0...
- ☐ Conditional Rule #1
  Unless balance is more than $2,000,000.01, then transfer 30%, plus $0
- ☑ Conditional Rule #2
  Or unless balance is between $200,000 and $2,000,000, then transfer 15% of (balance minus $20,000), plus $0

My payout as owner of 25% of shares of business
- ☐ Base/Default Rule
  20% of entire balance, plus $0...
- ☐ Conditional Rule #1
  Unless balance is more than $2,000,000.01, then transfer 10%, plus $0
- ☑ Conditional Rule #2
  Or unless balance is between $200,000 and $2,000,000, then transfer 15% of (balance minus $20,000), plus $0

How would you like to be notified for manual confirmation of these actions?
- ☐ Voice call
- ☑ Text Message
  ↳ Phone number: [          ]
- ☐ Email

[< BACK]    [NEXT >]

Determine user confirmation preferences

Save this plan for later
Cancel this plan

Fig. 10K

Review and save your plan

| | |
|---|---|
| Payment Nickname | Send business operations funds and pay partners |
| Transferring from account | Wells Fargo Checking (---- ---- ---- 9491) |
| Transferring to account | AFM User: name@domain.com |
| Transfer to be made every | 14 days |
| Starting on | July 28, 2014 |
| Ending on | No end date |

Business operations fund

| | |
|---|---|
| Base Rule | Send 20% of entire balance... |
| Conditional Rule #1 | Unless balance is less than $2,000,000.01, then transfer 10%, plus $20K |
| Conditional Rule #2 | Or unless balance is between $200,000 and $2,000,000, then transfer 15% of (balance minus $20K), plus $0 (text confirmation) |
| Limit | No limit |

My payout as owner of 75% of shares of business

| | |
|---|---|
| Base Rule | Send 60% of entire balance... |
| Conditional Rule #1 | Unless balance is less than $2,000,000.01, then transfer 30%, plus $0K |
| Conditional Rule #2 | Or unless balance is between $200,000 and $2,000,000, then transfer 45% of (balance minus $20K), plus $0 (text confirmation) |
| Limit | No limit |

My payout as owner of 25% of shares of business

| | |
|---|---|
| Base Rule | Send 20% of entire balance... |
| Conditional Rule #1 | Unless balance is less than $2,000,000.01, then transfer 10%, plus $0K |
| Conditional Rule #2 | Or unless balance is between $200,000 and $2,000,000, then transfer 15% of (balance minus $20K), plus $0 (text confirmation) |
| Limit | No limit |
| Confirmation type | Text confirmation, (555) 555-5555 |

Review, save, and start this plan

[ SAVE AND START THIS PLAN > ]

< Go back and edit this plan

Fig. 10L

LOGIN
Email [                    ]
Password [                    ]  [ GO > ]

or REGISTER
First Name [                    ]
Last Name [                    ]
Email [                    ]
Password [                    ]  [ GO > ]

Login or register to begin

Fig. 11A

What would you like to do?

Create a streaming plan for savings
        Save for a house or car, or set aside a percentage of your income to pay for taxes Create a streaming plan for paying another user
        Repay loans, send allowance, pay salaries or recurring fees, etc.

Create a streaming plan for receiving payments from another user
        Receive a stream of money from another person or user Create a streaming plan to pay a recurring bill
        Set up an intelligent bill pay plan so you only make decisions when necessary Create a streaming plan to split funds or income
        Divide money or income from an account or account group into any number of other accounts

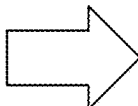
    <u>Make a single one time payment to another user</u>
        Manually send a simple payment from any connected account Make a single one time bill payment
        Manually pay a bill from any connected account View and manage all plans & payments: Timeline Priority Management Center
        Manually pay a bill from any connected account Request an incoming payment proposal
        Ask another person or user to propose a draft for a payment plan Base options from logged in account

Fig. 11B

Which account will fund your payment plan?

From: [Select ▲]
Wells Fargo Checking (x-9491)
Wells Fargo Checking (x-2243)
My AFM Account Balance Add Bank Account What type of transfer will this be?

To: [Select ▲]
Transfer to another person's or business' AFM account
Direct deposit to another person's or business' bank account Enter AFM recipient's username (email address)

[akess@icloud.comx]

Give a nickname to this payment plan

[Summer incentive for Adam in marketing sales]

[< BACK]                                             [NEXT >]
                                              Save this plan for later
Choose an account to fund                     Cancel this plan
the plan and set up a payee    Fig. 11C

When would you like to send this bill payment?

○ Pay now
⊙ Schedule the payment
   ↳ Date [July 28, 2016] 📅
     Time [12:00 pm] 🕐

[< BACK]                                             [NEXT >]
                                              Save this plan for later
Determine when to send the payment            Cancel this plan

Fig. 11D

What amount would you like to send?

Enter a fixed amount to pay   $[          ]

Add another conditional rule (change transfer
amount depending on various conditions)

[< BACK]                                             [NEXT >]
                                              Save this plan for later
Define rules, conditions, and                 Cancel this plan
amounts on a single payment    Fig. 11E

What amount would you like to send?

Enter a fixed amount to pay $ [500]

CONDITIONAL RULE #1
(Pay a different amount IF...)
Remove this rule if | SELECT A CONDITION TYPE ⌄
   | Funding source balance
   | Recent income
   | Recent income from a certain source
   | ↳ Select Source Account ⌄
   | CITI Business is | SELECT OPERATOR ⌄ → $ [20,000]
   | less than
   | less than or equal to
   | more than
   | more than or equal to
   | in the range of How many days back from the scheduled payment date should "recent income" be calculated for this condition?   [30]

Enter tags separated by commas to identify deposits to be included in calculating "recent income"   [nike, adidas, puma]

Add another condition to make this rule more specific
(Above conditions must be true for Rule #1 to be executed)

In this case how much would you like to pay?   $ [2,000]

Add another conditional rule (change transfer amount depending on various conditions)

[< BACK]

Define rules, conditions, and amounts on a single payment

[NEXT >]
Save this plan for later
Cancel this plan

Fig. 11F

Would you like to require manual approval before this payment is sent?

Require confirmation before releasing funds?
- ○ No, make this payment automatically as scheduled
- ○ Yes, I want to confirm this payment before money is sent
- ⊙ Yes, but I only want confirmation on certain rules
  - ↳ Which parts of your plan do you want to enable confirmation for?
    - ☐ Base/Default Rule
      Pay $500
    - ☑ Conditional Rule #1
      Unless the funding account has had more than $20,000 of income within 30 days of the date of this transfer from deposits tagged "Nike", "Adidas", "Puma", then pay $2,000

How would you like to be notified for manual confirmation of these payment?
- ☐ Voice call
- ☑ Text Message
  - ↳ Phone number: [         ]
- ☐ Email

[< BACK]    [NEXT >]

Determine user confirmation preferences

Save this plan for later
Cancel this plan

Fig. 11G

Would you like to require manual approval before this payment is sent?

Require confirmation before releasing funds?
- ○ No, make this payment automatically as scheduled
- ○ Yes, I want to approve each payment before my money is moved
  - ☐ Move bank funds to escrow while awaiting my approval
    Bank transfers usually take 3-4 days. While approval is pending, move money to a temporary account so it can be sent ASAP once I approve.
- ⦿ Yes, but I only want confirmation on certain rules
  - Which parts of your plan do you want to enable confirmation for?

IF ESCROW OPTIONS ARE ENABLED THESE ADDITIONAL CHECK BOXES BECOME AVAILABLE

- ☐ Base/default payment rule
  Pay $500
  - ☐ Move bank funds to escrow while awaiting my approval. Bank transfers usually take 3-4 days. While approval is pending, move money to a temporary account so it can be sent ASAP once I approve.
- ☑ Conditional Rule #1
  Unless the funding account has had than $20,000 of income within 30 days of the date of this transfer from deposits tagged "Nike", Adidas", "Puma", then pay $2,000
  - ☐ Move bank funds to escrow while awaiting my approval. Bank transfers usually take 3-4 days. While approval is pending, move money to a temporary account so it can be sent ASAP once I approve.

How would you like to be notified for manual confirmation of this payment?
- ☐ Voice call
- ☑ Text Message
  - Phone number: [         ]
- ☐ Email

[< BACK]                                    [NEXT >]
                                   Save this plan for later
                                      Cancel this plan Determine user confirmation preferences

Fig. 11H

Review and save your payment

| | |
|---:|:---|
| Nickname for this payment | Summer incentive for Adam in marketing sales |
| Transferring from account | Wells Fargo Savings (---- ---- ---- 9491) |
| Transferring to | Adam Kessler (akess@icloud.com) |
| Date | July 28, 2016 |
| Time | 12:00 pm |
| Base transfer rule | Pay $500... |
| Conditional Rule #1 | Unless the funding account has had more than $20,000 of income within 30 days of the date of this transfer from deposits tagged "Nike", "Adidas", "Puma", then pay $2,000 (text message confirmation required) |
| Confirmation type | Text confirmation, (555) 555-5555 |

[ < BACK ]                              [ SAVE AND ACTIVATE > ]

<u>Save this plan for later</u>
<u>Cancel this plan</u>

Review, save, and start this bill payment

Fig. 11I

LOGIN

| | |
|---:|:---|
| Email | [                    ] |
| Password | [                    ] |

[ GO > ]

or REGISTER

| | |
|---:|:---|
| First Name | [                    ] |
| Last Name | [                    ] |
| Email | [                    ] |
| Password | [                    ] |

[ GO > ]

Login or register to begin

Fig. 12A

What would you like to do?

Create a streaming plan for savings
        Save for a house or car, or set aside a percentage of your income to pay for taxes Create a streaming plan for paying another user
        Repay loans, send allowance, pay salaries or recurring fees, etc.

Create a streaming plan for receiving payments from another user
        Receive a stream of money from another person or user Create a streaming plan to pay a recurring bill
        Set up an intelligent bill pay plan so you only make decisions when necessary Create a streaming plan to split funds or income
        Divide money or income from an account or account group into any number of other accounts Make a single one time payment to another user
        Manually send a simple payment from any connected account

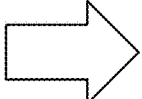
    <u>Make a single one time bill payment</u>
        Manually pay a bill from any connected account View and manage all plans & payments: Timeline Priority Management Center
        Manually pay a bill from any connected account Request an incoming payment proposal
        Ask another person or user to propose a draft for a payment plan Base options from logged in account

Fig. 12B

Enter or confirm your information below to match that which your payee has on record for you. This will be displayed to your payee in the "from" field of this payment.

Enter the payer's name you'd like these payments to come from

> Thomas Kelley

Enter the payer's phone number you'd like these payments to come from

> 555 202-5555

Enter the payer's address you'd like these payments to come from

> 120 State Street Oakland CA 90020

Give a nickname to this bill payment plan

> July phone bill - single payment

From: Select
- Wells Fargo Checking (x-9491)
- Wells Fargo Checking (x-2243)
- My AFM Account Balance Add Bank Account

[ < BACK ]   [ NEXT > ]

Set up bill pay "from" information and funding account

Save this plan for later
Cancel this plan

Fig. 12C

Set up your payee's information below

Select payee type: | Select ⌃ |
| Individual |
| Corporation, business, or legal entity |
| AFM Account Balance |

Enter the name of the person or entity you'd like to pay

| Virgin Mobile |

Enter the payee's full address where we would mail payments if necessary

| ATN: Accts Receivable 88 Universe Lane LA CA 22334 |

Enter your account number with this payee if applicable

| 2320744471 |

| < BACK |  | NEXT > |

Set up bill pay "to" information

Save this plan for later
Cancel this plan

Fig. 12D

Set up your payee's information below

Select payee type: | Select ⌃ |
| Individual |
| Corporation, business, or legal entity |
| AFM Account Balance |

Enter the name of the person or entity you'd like to pay

| Virgin Mobile |
| Virgin Mobile |

Enter the payee's full address where we would mail payments if necessary

| 88 Wireless Court, San Francisco CA 94105 |

Enter your account number with this payee if applicable

| 8033154 |

Username | lifeisgood |

Password | •••••••••• |

| < BACK |    | NEXT > |

Set up bill pay "to" information

Save this plan for later
Cancel this plan

Fig. 12E

When would you like to send this bill payment?
○ Pay now
⊙ Schedule the payment
↳ Date | July 28, 2016 | 📅 |
Time | 12:00 pm | 🕐 |

| < BACK |    | NEXT > |

Determine when to send the payment

Save this plan for later
Cancel this plan

Fig. 12F

When would you like to send this bill payment?

○ Make the next payment when it is due
○ Pay now
⊙ Schedule the payment
    ↳ Date | July 28, 2016 | 📅
       Time | 12:00 pm | 🕐

[< BACK]                                                [NEXT >]
Determine when to send the payment         Save this plan for later
                                                                                          Cancel this plan

Fig. 12G

When amount would you like to send?

⊙ Pay the amount due on my bill, if any
○ Pay a fixed amount
        $ [             ]

Add another conditional rule (change transfer amount depending on various conditions)

[< BACK]                                                [NEXT >]
Define rules, conditions, and amounts on a     Save this plan for later
bill pay                                                                 Cancel this plan

Fig. 12H

When amount would you like to send with each transfer?

How much would you like to send with each transfer?
- ⦿ Pay the amount due on my bill, if any
- ◯ Pay a fixed amount $ [        ]

→ $ [250]

CONDITIONAL RULE #1 (Pay a different amount IF...)
Remove this rule if | SELECT A CONDITION TYPE ⌃ | is | SELECT OPERATOR ⌃
| Funding source balance | | less than |
| Recent income | | less than or equal to |
| Recent income from a certain source | | more than |
| | | more than or equal to |
| | | in the range of |

Add another condition to make this rule more specific
(Above conditions must be true for Rule #1 to be executed)

How much would you like to send with each transfer?
- ⦿ Pay the amount due on my bill, if any
- ◯ Pay a fixed amount

↳ $ [0]

Add another conditional rule (change transfer amount depending on various conditions)

[ < BACK ]

Define rules, conditions, and amounts on a bill pay

[ NEXT > ]
Save this plan for later
Cancel this plan

Fig. 12I

What amount would you like to send?

Enter a fixed amount to pay  $ [          ]

Add another conditional rule (change transfer amount depending on various conditions)

[ < BACK ]

Define rules, conditions, and amounts on a bill pay

[ NEXT > ]
Save this plan for later
Cancel this plan

Fig. 12J

When amount would you like to send?

Enter a fixed amount to pay         $ [ 100 ]

$ [ 150 ]

CONDITIONAL RULE #1   if | SELECT A CONDITION TYPE ⌃ | is | SELECT OPERATOR ⌃ |
(Pay a different amount      | Funding source balance              |    | less than                      |
              IF...)                | Recent income                       |    | less than or equal to     |
Remove this rule            | Recent income from a certain source |    | more than                      |
                                                                              | more than or equal to    |
                                                                              | in the range of             |

Add another condition to make this rule more specific
(Above conditions must be true for Rule #1 to be executed)

In this case how much     $ [ 0 ]
would you like to pay?

Add another conditional rule (change transfer
amount depending on various conditions)

[ < BACK ]                                                [ NEXT > ]
Define rules, conditions, and amounts on        Save this plan for later
a bill pay                                                    Cancel this plan

Fig. 12K

Would you like to require manual approval before this bill payment is sent?

Require confirmation before releasing funds?
- ○ No, pay this bill automatically as scheduled
- ○ Yes, I want to confirm this bill payment before my money is sent
- ⊙ Yes, but I only want confirmation on certain rules
  ↳ Which parts of your plan do you want to enable confirmation for?
  - ☐ Base/default bill pay rule
    Pay bill in full
  - ☑ Conditional Rule #1
    Unless funding account balance is less than $250, then pay nothing How would you like to be notified for manual confirmation of this payment?
- ☐ Voice call
- ☑ Text Message
  ↳ Phone number: [        ]
- ☐ Email

[< BACK]                                              [NEXT >]
                                              Save this plan for later
                                              Cancel this plan Determine user confirmation preferences

Fig. 12L

Would you like to require manual approval before this payment is sent?

Require confirmation before releasing funds?
- ○ No, pay this bill automatically as scheduled
- ○ Yes, I want to confirm this bill payment before my money is sent
  - ↳ ☐ Move bank funds to escrow while awaiting my approval
    Bank transfers usually take 3-4 days. While approval is pending, move money to a temporary account so it can be sent ASAP once I approve.
- ⊙ Yes, but I only want confirmation on certain rules
  - ↳ Which parts of your plan do you want to enable confirmation for?
    - ☐ Base/default payment rule
      Pay bill in full
      - ☐ Move bank funds to escrow while awaiting my approval. Bank transfers usually take 3-4 days. While approval is pending, move money to a temporary account so it can be sent ASAP once I approve.
    - ☑ Conditional Rule #1
      Unless funding account balance is less than $250, then pay nothing
      - ☐ Move bank funds to escrow while awaiting my approval. Bank transfers usually take 3-4 days. While approval is pending, move money to a temporary account so it can be sent ASAP once I approve.

[IF ESCROW OPTIONS ARE ENABLED THESE ADDITIONAL CHECK BOXES BECOME AVAILABLE]

How would you like to be notified for manual confirmation of this payment?
- ☐ Voice call
- ☑ Text Message
  - ↳ Phone number: _____
- ☐ Email

[< BACK]  [NEXT >]

Save this plan for later
Cancel this plan

Determine user confirmation & settings

Fig. 12M

Review and save your bill payment

| | |
|---:|:---|
| Nickname for this Bill Payment | July phone bill - single payment |
| Transferring from account | Wells Fargo Savings (---- ---- ---- 9491) |
| "From" information | Thomas Kelley, (555) 202-5555, 120 State Street Oakland CA 90020 |
| Transferring to | Virgin Mobile |
| Date | July 28, 2016 |
| Time | 12:00 pm |
| Base transfer rule | Pay bill in full... |
| Conditional Rule #1 | Unless funding account balance is less than $250, then pay nothing |
| Confirmation type | Text confirmation, (555) 555-5555 |

[ < BACK ]    [ SAVE AND ACTIVATE > ]

Save this plan for later
Cancel this plan

Review, save, and submit this bill payment

Fig. 12N

LOGIN

| | |
|---:|:---|
| Email | [           ] |
| Password | [           ]    [ GO > ] | or REGISTER

| | |
|---:|:---|
| First Name | [           ] |
| Last Name | [           ] |
| Email | [           ] |
| Password | [           ]    [ GO > ] |

Login or register to begin

Fig. 13A

What would you like to do?

Create a streaming plan for savings
        Save for a house or car, or set aside a percentage of your income to pay for taxes Create a streaming plan for paying another user
        Repay loans, send allowance, pay salaries or recurring fees, etc.

Create a streaming plan for receiving payments from another user
        Receive a stream of money from another person or user Create a streaming plan to pay a recurring bill
        Set up an intelligent bill pay plan so you only make decisions when necessary Create a streaming plan to split funds or income
        Divide money or income from an account or account group into any number of other accounts Make a single one time payment to another user
        Manually send a simple payment from any connected account Make a single one time bill payment
        Manually pay a bill from any connected account View and manage all plans & payments: Timeline Priority Management Center
        Manually pay a bill from any connected account

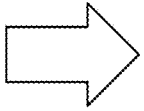

<u>Request an incoming payment proposal</u>
        Ask another person or user to propose a draft for a payment plan Base options from logged in account

Fig. 13B

Enter the email address of the AFM user who you'd like to pay you name@domain.com Choose an account into which you'd like to receive these payments From: | Select ∧
Wells Fargo Checking (x-8491)
Wells Fargo Checking (x-2243)
My AFM Account Balance Add Bank Account How much would you like to be paid by this recipient in total? $ [____]
To pay without limit, enter "0" or leave this field blank Add an interest rate to this payment? [____] % APR*
To pay without an interest rate, enter "0" or leave this field blank Give a nickname to this payment plan Re-payment plan for personal loan to Mary Ann Subject Please make me a AFM proposal for repayment Note to Payee Regarding this Payment Request Hi Mary Ann,
Please submit a proposal to me for repayment the small loan as we discussed. After you enter your proposal and send it back to me, I'll confirm it and activate the plan.

Thank you,
Thom

Receive notifications when transfers are deposited into your account?
○ No
⊙ Yes ☐ Voice call ☑ Text Message
 ↳ Phone number: (555) 555-5555

☐ Email

NEXT >
Save this plan for later
Cancel this plan

Compose basic payment request

Fig. 13C

Review and send this incoming payment proposal

| | |
|---|---|
| Payment Plan Nickname | Repayment plan for loan to Mary Ann |
| Transferring from account | Mary Ann Kelley (mak@icloud.com) |
| Transferring from account | Wells Fargo Savings (---- ---- ---- 9382) |
| Limit | Pause plan after $5000 has been paid with no interest |
| Subject | Please make me a AFM proposal for repayment |
| Note to Payee Regarding this Payment Request | Hi Mary Ann,<br>Please submit a proposal to me for repayment the small loan as we discussed. After you enter your proposal and send it back to me, I'll confirm it and activate the plan.<br><br>Thank you,<br>Thom |
| Transfer notification preference | Text confirmation, (555) 555-5555 |

[ < BACK ]    [ SAVE AND SEND THIS REQUEST > ]

Save this plan for later
Cancel this plan

Review, save, and send this request for payment

Fig. 13D

Here you can create account groups to act as a single account

Choose the accounts below to be added to your new account group

☐ Wells Fargo Savings (x-8238)

☑ Wells Fargo Checking (x-8238)

☑ My PayPal account (thom@icloud.com)

☑ My AFM Account Balance

Give a nickname to this account group

[ My liquid accounts ]

[ SAVE ]

Create a new account group    Save and add another account group

Fig. 13E

☑ Funding account must have at least  $ ____

☐ Bill amount must be less than  $ ____

Fig. 14

DYNAMIC FINANCIAL MANAGEMENT SYSTEM, METHOD AND DEVICE

RELATED APPLICATIONS

This application is a continuation of U.S. patent application Ser. No. 16/428,848, filed on May 31, 2019, and entitled "A DYNAMIC FINANCIAL MANAGEMENT SYSTEM, METHOD AND DEVICE, which is a continuation-in-part of U.S. patent application Ser. No. 16/059,907, filed on Aug. 9, 2018, and entitled "A DYNAMIC FINANCIAL MANAGEMENT SYSTEM, METHOD AND DEVICE, which is a continuation of U.S. patent application Ser. No. 14/878,857, filed on Oct. 8, 2015, and entitled "A DYNAMIC FINANCIAL MANAGEMENT SYSTEM, METHOD AND DEVICE," which claims priority from U.S. Provisional Patent Application Ser. No. 62/062,427, filed Oct. 10, 2014 and entitled "SYSTEM AND METHOD FOR PROVIDING AN INFRASTRUCTURE, MODULAR COMPONENTS, AND CONFIGURABLE USER INTERFACE AND RELATED FUNCTIONALITY TO ENABLE AND FACILITATE SIMPLIFIED, OPTIMIZED, AND CONSOLIDATED MANAGEMENT OF FINANCES AND FINANCIAL OBLIGATIONS," all of which are hereby incorporated by reference in their entirety.

FIELD OF THE INVENTION

The present invention relates to the field of financial management. Specifically, the present invention relates to a personalized dynamic financial management system, method and device.

BACKGROUND OF THE INVENTION

Currently, all automatic savings or bill payment systems are limited to "dumb" payments that are for fixed amounts and are unable to adjust based on differing financial or other conditions. In particular, none of these systems allow users to easily automate rule based payments that cause transfers to behave dynamically according to evaluations of fluctuating variables such as balances, income, and other factors. As a result, users who desire more intricate control and/or are financially unable to rigidly save or make payments according to unchanging schedules and static amounts are unable to setup automatic finance management that meets their needs.

SUMMARY OF THE INVENTION

A dynamic personalizable automated finance management system provides a financial management platform that enables users to easily generate a plurality of customized rules or conditions associated with one or more accounts thereby creating account plans. In particular, the rules are able to define if, how much, when and where to transfer money to and from the accounts based on user entered criteria or triggers upon which the rules/conditions are based. A first aspect is directed to method of dynamic financial management of one or more of monetary accounts. The method comprises receiving, at a financial management server, identification by a user of one or more of the monetary accounts as source accounts for an account rule and identification of one or more other of the monetary accounts as destination accounts for the account rule, wherein the identification of at least one of the source accounts and the destination accounts includes generating a source/destination rule that when executed defines a subset of the one or more monetary accounts, and further wherein monetary accounts within the subset are able to change over time based on the source/destination rule, receiving, at the financial management server, selection by the user of an evaluation trigger that describes one or more times when the account rule is evaluated by the financial management server, receiving, at the financial management server, selection by the user of a primary condition of the account rule, the primary condition comprising a primary transfer amount metric that metric defines a quantity of money from the source accounts that is to be transferred if the primary condition is met and generating the account rule based on the source accounts, the destination accounts the evaluation trigger and the primary condition.

In some embodiments, generating the source/destination rule comprises the financial management server presenting a list of a plurality of the monetary accounts to the user, the user selecting the one or more of the monetary accounts; and the financial management server automatically generating parameters of the source/destination rule that cause the source/destination rule to identify the one or more of the monetary accounts if executed at that time. In some embodiments, the source/destination rule comprises receiving selection by the user of a query and a data set, wherein the source/destination rule uses the query to search the data set upon execution. In some embodiments, the method further comprises identifying transaction patterns of transactions of at least one of the monetary accounts that is associated with the user by monitoring one or more characteristics of the at least one of the accounts, wherein the characteristics comprise one or more of transaction source, amount, destination, type, frequency, time, day and date. In some embodiments, the method further comprises providing an income token prompt message to the user that identifies the at least one of the monetary accounts as possible income source based on the transaction patterns meeting a pattern criteria, and upon confirmation of the prompt message by the user, generating a token that uniquely identifies the at least one of the monetary accounts as an income source.

In some embodiments, the account rule is associated with a rule following function, the method further comprising providing notifications when the account rule is executed to one or more other users when the other users select the rule following function of the account rule. In some embodiments, the account rule is associated with a rule cloning function, the method further comprising when other users select the rule cloning function, automatically generating a duplicate of the account rule having the same evaluation trigger and the same primary condition for the other users. In some embodiments, the account rule is associated with a rule contribution function, the method further comprising when other users select the rule contribution function, automatically generating a contribution rule having the same destination for the other users such that the other users are able to contribute to the account rule. In some embodiments, at least one of an evaluation trigger and a primary condition of the contribution rule is dependent on at least one of an amount of funds in the destination of the account rule, an execution of the account rule and values of the evaluation trigger and the primary condition of the account rule.

A second aspect is directed to a dynamic financial management server for the management of one or more of monetary accounts. The server comprises a processor and a non-transitory computer-readable medium storing a financial management product and communicatively coupled with the servers over one or more networks, wherein the financial management product is operable to receive an account rule including account rule data selected by a user via a user interface, the account rule data comprising a designation of one of the monetary accounts as a source account for an account rule and a designation of another of the monetary accounts as a destination account for the account rule, wherein the designation of at least one of the source accounts and the destination accounts includes generating a source/destination rule that when executed defines a subset of the one or more monetary accounts, and further wherein monetary accounts within the subset are able to change over time based on the source/destination rule, an evaluation trigger that describes one or more times when the account rule is evaluated and a primary condition of the account rule including a primary transfer amount metric that defines a primary quantity of money from the source account that is to be transferred if the primary condition is met and store the account rule on the non-transitory computer-readable medium, wherein the account rule is based on the source account, the destination account, the evaluation trigger, and the primary condition.

In some embodiments, generating the source/destination rule comprises presenting a list of a plurality of the monetary accounts to the user, the user selecting the one or more of the monetary accounts and automatically generating parameters of the source/destination rule that cause the source/destination rule to identify the one or more of the monetary accounts if executed at that time. In some embodiments, generating the source/destination rule comprises receiving selection by the user of a query and a data set, wherein the source/destination rule uses the query to search the data set upon execution. In some embodiments, the financial management product is operable to identify transaction patterns of transactions of at least one of the monetary accounts that is associated with the user by monitoring one or more characteristics of the at least one of the accounts, wherein the characteristics comprise one or more of transaction source, amount, destination, type, frequency, time, day and date. In some embodiments, the financial management product is operable to provide an income token prompt message to the user that identifies the at least one of the monetary accounts as possible income source based on the transaction patterns meeting a pattern criteria, and upon confirmation of the prompt message by the user, generate a token that uniquely identifies the at least one of the monetary accounts as an income source.

In some embodiments, the account rule is associated with a rule following function, wherein the financial management product is operable to provide notifications when the account rule is executed to one or more other users when the other users select the rule following function of the account rule. In some embodiments, the account rule is associated with a rule cloning function, wherein the financial management product is operable to, when other users select the rule cloning function, automatically generate a duplicate of the account rule having the same evaluation trigger and the same primary condition for the other users. In some embodiments, the account rule is associated with a rule contribution function, wherein the financial management product is operable to, when other users select the rule contribution function, automatically generate a contribution rule having the same destination for the other users such that the other users are able to contribute to the account rule. In some embodiments, at least one of an evaluation trigger and a primary condition of the contribution rule is dependent on at least one of an amount of funds in the destination of the account rule, an execution of the account rule and values of the evaluation trigger and the primary condition of the account rule.

A third aspect is directed to a dynamic financial management product stored on a non-transitory computer-readable medium for providing dynamic financial management of one or more monetary accounts by performing a method comprising receiving, via a user interface of the product, selection by a user of one of the monetary accounts as a source account for an account rule and selection of another of the monetary accounts as a destination account for the account rule, wherein the selection of at least one of the source accounts and the destination accounts includes generating a source/destination rule that when executed defines a subset of the one or more monetary accounts, and further wherein monetary accounts within the subset are able to change over time based on the source/destination rule, receiving, via the user interface of the product, selection by the user of an evaluation trigger that describes one or more times when the account rule is evaluated, receiving, via the user interface of the product, selection by the user of a primary condition of the account rule including a primary transfer amount metric that defines a primary quantity of money from the source account that is to be transferred if the primary condition is met, generating the account rule based on the source account, the destination account, the evaluation trigger, the primary condition and the exception conditions, and linking the account rule with a user profile of the user and storing the account rule on the non-transitory computer-readable medium.

In some embodiments, generating the source/destination rule comprises the financial management server presenting a list of a plurality of the monetary accounts to the user, the user selecting the one or more of the monetary accounts; and the financial management server automatically generating parameters of the source/destination rule that cause the source/destination rule to identify the one or more of the monetary accounts if executed at that time. In some embodiments, generating the source/destination rule comprises receiving selection by the user of a query and a data set, wherein the source/destination rule uses the query to search the data set upon execution. In some embodiments, the method comprises identifying transaction patterns of transactions of at least one of the monetary accounts that is associated with the user by monitoring one or more characteristics of the at least one of the accounts, wherein the characteristics comprise one or more of transaction source, amount, destination, type, frequency, time, day and date. In some embodiments, the method comprises providing an income token prompt message to the user that identifies the at least one of the monetary accounts as possible income source based on the transaction patterns meeting a pattern criteria, and upon confirmation of the prompt message by the user, generating a token that uniquely identifies the at least one of the monetary accounts as an income source.

In some embodiments, the account rule is associated with a rule following function, wherein the method comprises providing notifications when the account rule is executed to one or more other users when the other users select the rule following function of the account rule. In some embodiments, the account rule is associated with a rule cloning function, wherein the method comprises when other users select the rule cloning function, automatically generating a duplicate of the account rule having the same evaluation trigger and the same primary condition for the other users. In some embodiments, the account rule is associated with a rule contribution function, wherein the method comprises when other users select the rule contribution function, automatically generating a contribution rule having the same destination for the other users such that the other users are able to contribute to the account rule. In some embodiments, at least one of an evaluation trigger and a primary condition of the contribution rule is dependent on at least one of an amount of funds in the destination of the account rule, an execution of the account rule and values of the evaluation trigger and the primary condition of the account rule.

A fourth aspect is directed to a financial management device for the management of one or more of monetary accounts. The device comprises a processor and a non-transitory computer-readable medium storing a dynamic financial management product, wherein when executed by the processor the product performs a method comprising receiving, via a user interface of the product, selection by a user of one of the monetary accounts as a source account for an account rule and selection of another of the monetary accounts as a destination account for the account rule, wherein the selection of at least one of the source accounts and the destination accounts includes generating a source/destination rule that when executed defines a subset of the one or more monetary accounts, and further wherein monetary accounts within the subset are able to change over time based on the source/destination rule, receiving, via the user interface of the product, selection by the user of an evaluation trigger that describes one or more times when the account rule is evaluated, receiving, via the user interface of the product, selection by the user of a primary condition of the account rule including a primary transfer amount metric that defines a primary quantity of money from the source account that is to be transferred if the primary condition is met, generating the account rule based on the source account, the destination account, the evaluation trigger, the primary condition and the exception conditions, and linking the account rule with a user profile of the user and storing the account rule on the non-transitory computer-readable medium.

In some embodiments, generating the source/destination rule comprises the financial management server presenting a list of a plurality of the monetary accounts to the user, the user selecting the one or more of the monetary accounts; and the financial management server automatically generating parameters of the source/destination rule that cause the source/destination rule to identify the one or more of the monetary accounts if executed at that time. In some embodiments, generating the source/destination rule comprises receiving selection by the user of a query and a data set, wherein the source/destination rule uses the query to search the data set upon execution. In some embodiments, the method comprises identifying transaction patterns of transactions of at least one of the monetary accounts that is associated with the user by monitoring one or more characteristics of the at least one of the accounts, wherein the characteristics comprise one or more of transaction source, amount, destination, type, frequency, time, day and date. In some embodiments, the method comprises providing an income token prompt message to the user that identifies the at least one of the monetary accounts as possible income source based on the transaction patterns meeting a pattern criteria, and upon confirmation of the prompt message by the user, generating a token that uniquely identifies the at least one of the monetary accounts as an income source.

In some embodiments, the account rule is associated with a rule following function, wherein the method comprises providing notifications when the account rule is executed to one or more other users when the other users select the rule following function of the account rule. In some embodiments, the account rule is associated with a rule cloning function, wherein the method comprises when other users select the rule cloning function, automatically generating a duplicate of the account rule having the same evaluation trigger and the same primary condition for the other users. In some embodiments, the account rule is associated with a rule contribution function, wherein the method comprises when other users select the rule contribution function, automatically generating a contribution rule having the same destination for the other users such that the other users are able to contribute to the account rule. In some embodiments, at least one of an evaluation trigger and a primary condition of the contribution rule is dependent on at least one of an amount of funds in the destination of the account rule, an execution of the account rule and values of the evaluation trigger and the primary condition of the account rule. In some embodiments, the device is one of a mobile device, a smart phone, a smart watch, a laptop computer and a desktop computer.

BRIEF DESCRIPTION OF THE DRAWINGS

FIGS. 5A-5N illustrate images of exemplary screen shots that correspond to path AA according to some embodiments.

FIGS. 6A-6Q illustrate images of exemplary screen shots that correspond to path BB according to some embodiments.

FIGS. 7A-7I illustrate images of exemplary screen shots that correspond to path CC according to some embodiments.

FIGS. 8A-8R illustrate images of exemplary screen shots that correspond to path DD according to some embodiments.

FIGS. 9A-9K illustrate images of exemplary screen shots that correspond to path EE according to some embodiments.

FIGS. 10A-10L illustrate images of exemplary screen shots that correspond to path FF according to some embodiments.

FIGS. 11A-11I illustrate images of exemplary screen shots that correspond to path GG according to some embodiments.

FIGS. 12A-12N illustrate images of exemplary screen shots that correspond to path HH according to some embodiments.

FIGS. 13A-13E illustrate images of exemplary screen shots that correspond to path II according to some embodiments.

DETAILED DESCRIPTION OF THE INVENTION

Figure 1A:
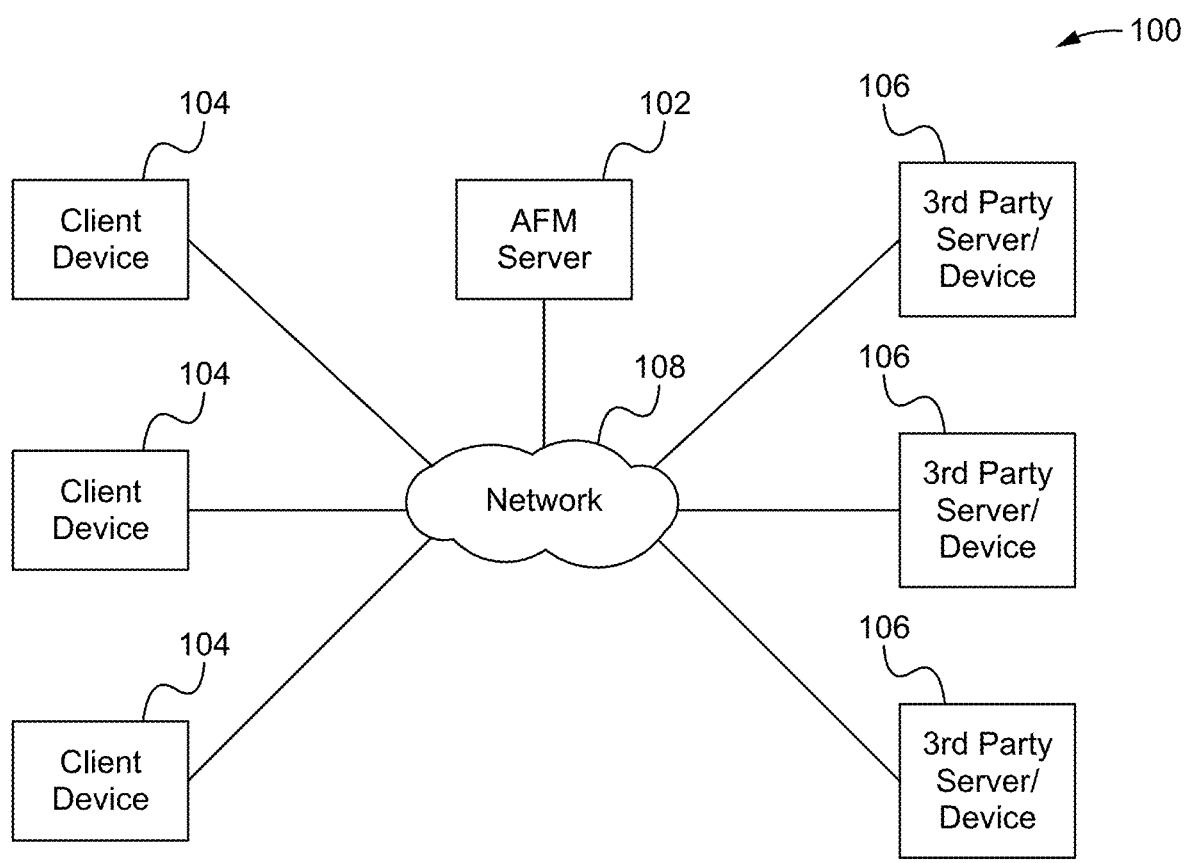
FIG. 1A illustrates a dynamic personalizable automated finance management system (AFM) system for providing features of an AFM product according to some embodiments.

The dynamic personalizable automated finance management system (AFM) described herein provides a financial management platform that allows users to easily generate a plurality of customized rules having conditions associated with one or more accounts thereby creating account plans (each plan having one or more rules and each rule having one or more conditions). In particular, the conditions/rules/plans are able to define how much, when and where to transfer money to and from the accounts based on user entered criteria or triggers upon which the conditions of the rules/plans are based. In other words, the AFM gives a user the ability to schedule the payment of bills or the movement of money among different accounts depending on the status and activity of his/her accounts and/or related conditions. As a result, the AFM enables individuals to personalize the actions of their accounts beyond mere savings or bill payment to automatically and dynamically adjust to different personal financial situations or preferences. Accordingly, the AFM provides the advantage of allowing users to move money according to various scheduled rules, thus allowing users at large to fully control their moneys, incomes, and payments based on highly customizable rules. For example if a user schedules a payment for a future date, he/she are able to set up a rule to skip the payment if his/her funding source account (account from which the user's own funds are taken) has a low balance, or increase the payment if his/her funding account balance is unusually high. Therefore, at a time when a transfer is scheduled to be executed (as determined by an entered frequency or an event such as a deposit made to an account and/or the clearance thereof), all of the user's custom settings and rules are evaluated uniquely against all present related conditions to determine what dollar amount should be transferred, when it should be transferred and where it should be transferred to/from.

Thus, the AFM is able to be used to set up a fluctuating savings plan for a freelancer with highly variable income patterns, create a specific revenue—split for business partners from one main account to multiple others, set up a dedicated "save and purchase plan" for an item from an online retailer, automatically pay bills as long as they are not unusually high and there exists at least a certain balance in the user's funding account, or passively repay debt among friends or family members. Further, the AFM provides a smart way to conditionally direct income, payments, or savings automatically, mainly in response to fluctuations in the balance and cash-flow of a user's funding source account, but also possibly in response to many other measurable or readable conditions. Accordingly, the AFM provides users with a reliable, passive solution for automatically sending, receiving, and moving different amounts of money according to fluctuations in the users' incomes, account balances, or other digitally available variables from publicly accessible data such as stock prices or prices of products online to private data read through 3rd party application program interfaces. In other words, the AFM is able to provide users with more control over the automation of their cash flow and purchases by incorporating scheduling with programmatic conditional rules which evaluate available data and hence determine resultant financial actions.

AFM System

Figure 1B:
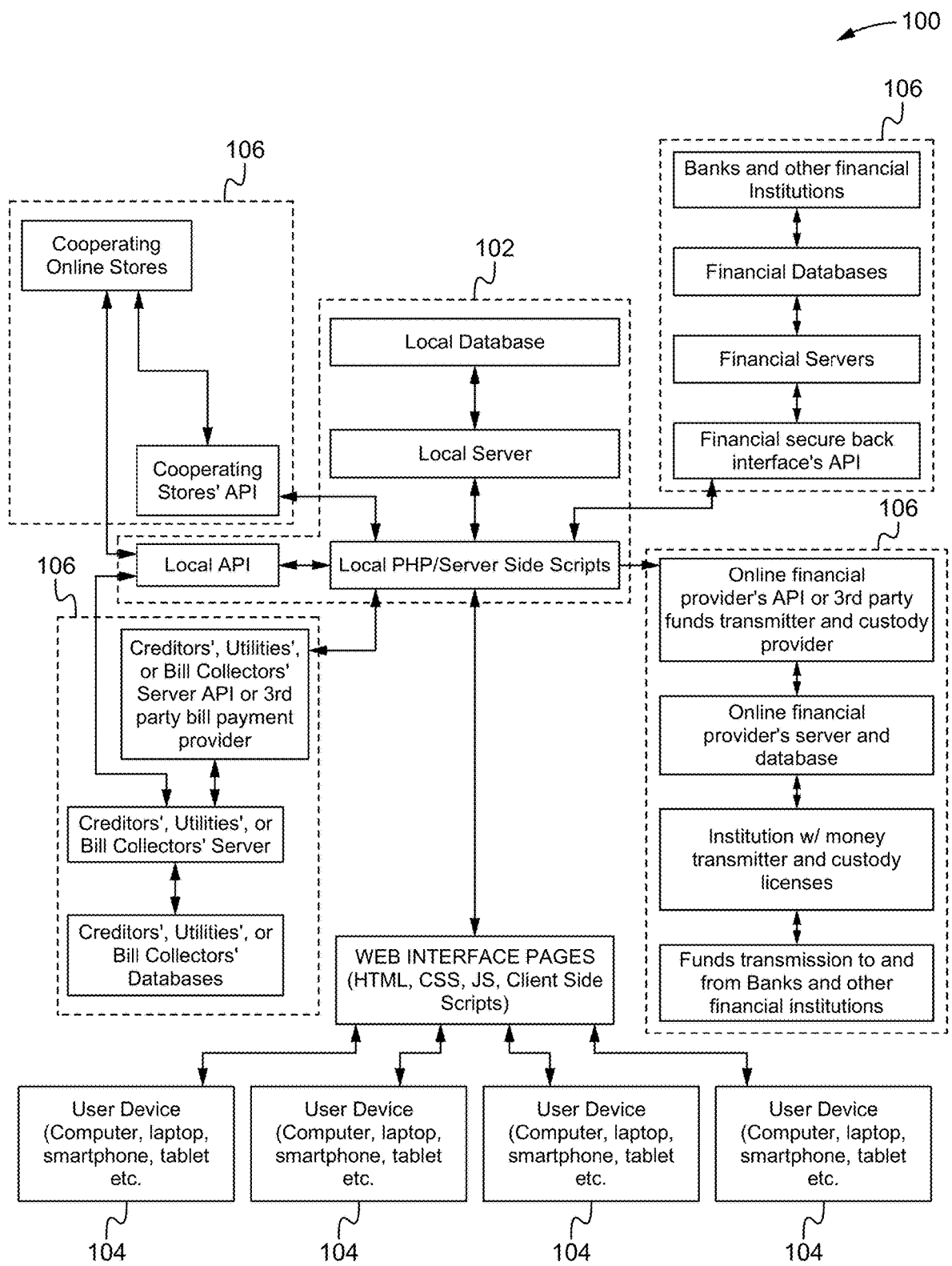
FIG. 1B illustrates an exemplary more detailed view of the AFM system according to some embodiments.

FIG. 1A illustrates an AFM system 100 for providing features of an AFM product according to some embodiments. Similarly, FIG. 1B illustrates an exemplary more detailed view of the AFM system 100 according to some embodiments As shown in FIGS. 1A and 1B, the system 100 comprises one or more AFM servers 102, one or more client devices 104 and one or more third party servers/devices 106 all coupled together over one or more networks 108. The networks 108 are able to be one or a combination of wired or wireless networks as are well known in the art. The one or more servers 102 are able to store, maintain and/or operate the AFM product for providing the dynamic financial management features of the AFM as described below. In some embodiments, the entirety of the AFM product and its features is able to be provided by the servers 102, for example, in the form of one or more websites operated by the servers 102. Alternatively, a user is able to download some or all of the product from the servers 102 onto one of the client devices 104, wherein the product is in the form of a program or application that is able to execute locally on the client device 104 and provides some or all of the AFM product features.

Alternatively, the product is able to be in the form of a widget that operates on one or a plurality of server and/or websites (e.g. to provide added functionality to a bank website). In particular, in such embodiments the downloaded application, widget and/or the servers 102 together are able to provide all of the features of the AFM product by communicating via the network 108. In other words, together and/or separately the features of the AFM product are able to be provided by one or more widgets operating on other website/servers, one or more websites on the servers 102 and/or a local AFM application on the client devices 102. Alternatively, the application and/or widget is able to provide all of the features of the product without the servers 102. Accordingly, although described herein as a downloadable application for the sake of brevity, it is understood that the described features are able to be provided by the other platforms described above.

After being downloaded to the client device 104, the application is able to use the local memory on the device 104 to store and utilize data necessary for operation of the application in an application database on the device 104. Alternatively, some or all of the data for operating the application is able to be stored in a server database on the servers 102 such that the application must connect to the servers 102 over the networks 108 in order to utilize the data on the server database. For example, the locally executing application is able to remotely communicate with the servers 102 over the network 108 to perform any features of the application and/or access any data on the server database not available with just the data on the application database. In some embodiments, the same data is stored on both the server database and the application database such that either local or remote data access is possible. In such embodiments, the databases are able to be periodically synchronized over the network 108. Although as shown in FIG. 1A one AFM server 102 is coupled with three client devices 104 and three 3$^{rd}$ party servers/devices 106, it is understood that the system 100 is able to comprise any number of servers 102, devices 104 and/or servers/devices 106 coupled together via the network 108. Additionally, it should be noted that, for the sake of brevity, the following discussion relates to the functions and operation of application, the application user interface and the application database, however it is understood that the discussion is able to also relate to the function and operation of the website, the website user interface and the server database, or both.

The third party servers 106 are able to comprise merchants, banks and other financial institutions, online financial providers, billing service providers, online gaming services, academic institutions, and/or other network-accessible software and/or hardware entities. Specifically, the third party servers 106 are able to be entities having data upon which rules are able to be based (e.g. account data, grade data, sports data), entities having items/services for purchase and data about those items/services, and/or entities having financial account data from which or with which money is able to be transferred. In some embodiments, the user interface of the AFM product (as provided by the website and/or application) is able to comprise a focused question by question guide presentation that enables users to easily schedule financial transactions which may change depending on user defined rules. Alternatively, other forms of interface presentations are able to be used that enable the generation of rules and other features of the product as described herein. Thus, the AFM interface provides the advantage of a streamlined process that breaks down each of the features of the product into a few easy steps.

Figure 2:
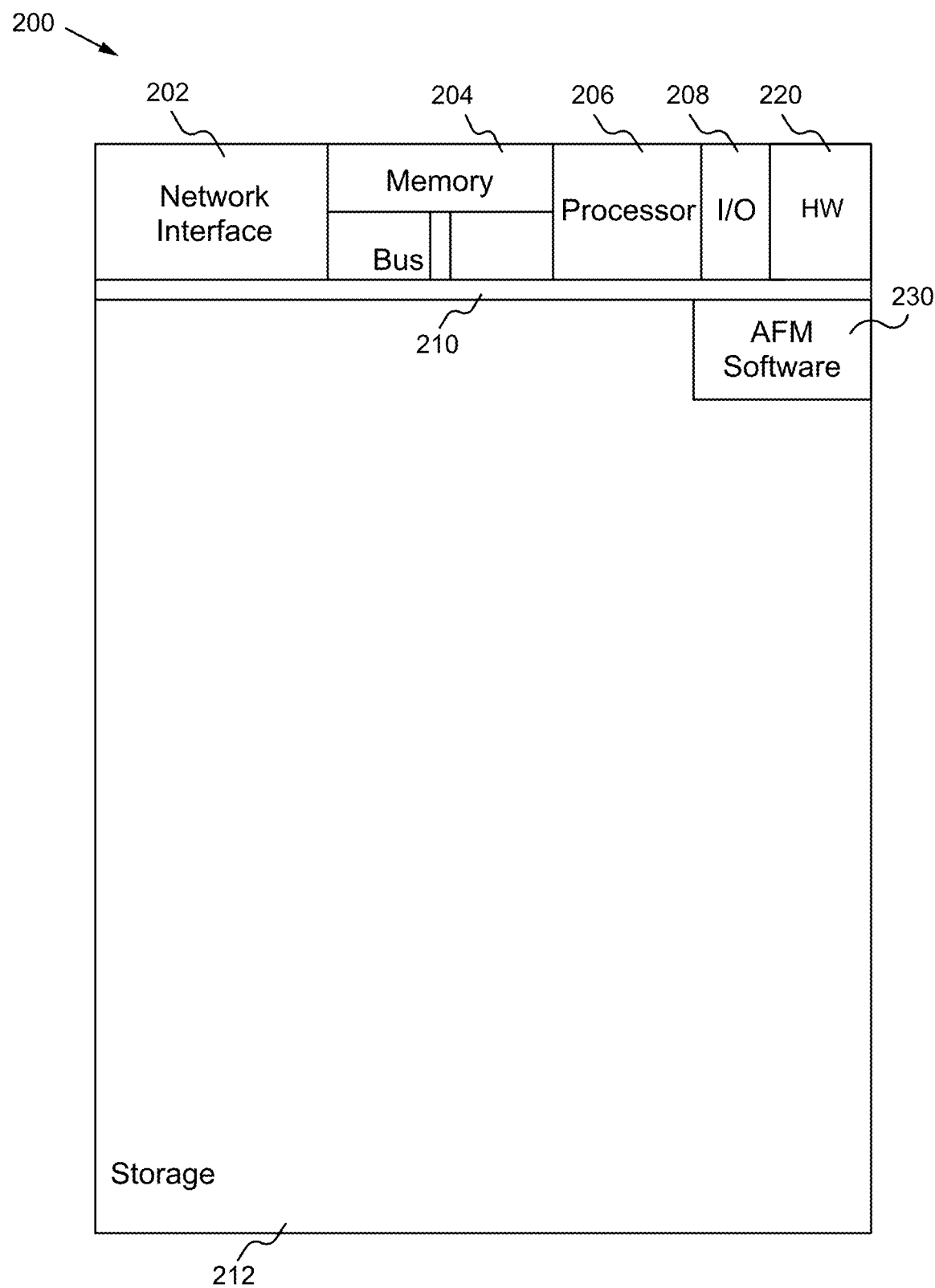
FIG. 2 illustrates a block diagram of an exemplary computing device according to some embodiments.

FIG. 2 illustrates a block diagram of an exemplary computing device 200 according to some embodiments. The computing device 200 is able to be one or more of the servers 102 and/or one or more of the devices 104. In general, a hardware structure suitable for implementing the computing device 200 includes a network interface 202, a memory 204, a processor 206, I/O device(s) 208, a bus 210 and a storage device 212. Alternatively, one or more of the illustrated components are able to be removed or substituted for other components well known in the art. The choice of processor is not critical as long as a suitable processor with sufficient speed is chosen. The memory 204 is able to be any conventional computer memory known in the art. The storage device 212 is able to include a hard drive, RAM, SRAM, CDROM, CDRW, DVD, DVDRW, flash memory card or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, display, printer, modem, touchscreen, button interface and other devices. The AFM software or module(s) 230 used to operate the application and/or website are likely to be stored in the storage device 212 and memory 204 and processed as applications are typically processed. More or less components shown in FIG. 2 are able to be included in the computing device 200. In some embodiments, AFM hardware 220 is included. Although the computing device 200 in FIG. 2 includes software 230 and hardware 220 for the AFM product, the features of the AFM product are able to be implemented on the computing device 200 in hardware, firmware, software or any combination thereof. Examples of suitable computing devices include a personal computer, a laptop computer, a computer workstation, a server, a datacenter, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a Blu-ray® writer/player, a television, a home entertainment system or any other suitable computing device.

AFM Product

The AFM product (as implemented by the application and/or website) is able to comprise a login and registration module, an account module, a rule/plan editing module, a rule generation module, a group identification module, a token generation module, a social module, a notification module, a rule prioritization module, a review module, an account grouping module, a product purchase module and a virtual savings bin module, wherein the product user interface is configured to enable users to utilize the modules.

The Login and Registration Module

The login and registration module enables a user to create a user profile by inputting username and password information via the graphical user interface that is then associated with the profile such that the information is able to be used to identify the user when logging onto the application. Alternatively, the login information is able to be omitted and a user is able to use the application without creating a user profile or logging in. In such embodiments, the application on each client device 104 is able to have single a unique profile or identifier that is able to be identified by the server 102 and/or AFM product. After a user profile is created, the user is able to access the profile and any associated data by entering the username and password in order to identify themselves to the application. In some embodiments, 2-factor identity verification may be required, wherein a second tier of validation must be satisfied, such as the automatic transmission via SMS of a temporary password to a user's mobile device which must be entered in order to access the profile.

The Account Module

The account module enables a user to add one or more accounts to the associated user profile, add or move money between the accounts and withdraw money from the accounts. For example, in order to add an account the module enables a user to enter a routing number and an account number of the account which they would like to associated with the user profile. The user is then able to be prompted for a username and password (or another method of verification) to automatically verify the bank account. Further, if adding a credit card, the user is able to enter the card number, expiration date, and security code, wherein if further verification is required by the credit card issuer, steps will be taken as advised by the card provider. Moreover, if adding an online payment system account (e.g. PayPal®), the module is able to ask and input a username and password associated with the online payment system to link the account. In this manner, the account module enables the user to save the added account and/or add additional accounts. The account module further enables money to be added/transferred/withdrawn between the accounts. For example, the user is able to select one of the accounts associated with the user profile, enters an amount to be added to or withdrawn from another account and confirms the deposit. In some embodiments, the user is able to enter a nickname for the deposit transaction.

The Rule Generation Module

The rule generation module enables users to generate a rule/plan for one or more accounts (and/or combined accounts as described below) that dynamically transfer money into and/or out of the accounts. Each rule comprises a duration, one or more condition-trigger pairs, an interval/frequency, and one or more actions. As a result, the rules/plans are able to automatically perform designated actions (e.g. transfer money) to manage the accounts of a user profile according to the scenarios defined by the condition-trigger pairs of the rules/plans. For example, a user is able to use the rule generation module to generate an auto bill pay rule/plan associated with an account with two condition pairs. One condition pair to automatically pay a bill if it is under $200 (e.g. condition 1: trigger=bill amount, condition=less than or equal to $200, action=pay bill), and another condition pair to hold the payment, notify the user, and let him/her decide what to do next if the bill is over $200 (e.g. condition 2: trigger=bill amount, condition=greater than $200, action=notify and wait for confirmation). Alternatively, the second/another condition pair is able to be an exception to the first condition such that the first condition is not performed if the second/exception condition is met. For example, the second condition is able to hold the payment, notify the user, and let him/her decide what to do next if the balance of the auto bill pay source account is below $200 (e.g. condition 2: trigger=source account balance, condition=less than $200, action=notify and wait for confirmation). Thus, in the first scenario the bill is not paid (without confirmation) if it is over the expected amount, and in the second scenario, the bill is not paid without confirmation (even if it is lower than $200) if the source account balance is below $200. Auto bill pay rule generation selection boxes are able to be added to the rule generation interface shown in FIGS. 5-13 as an easier way to add the "funding account must have at least" and/or the "bill amount must be less than" conditions to any of the rules (as either a primary or exception condition). Indeed, any number of types and combinations of conditions described herein are able to be utilized to customize the auto bill pay.

Consequently, using one or a plurality of these types of rules/plans for one or more of a user's accounts, the user is able to customize the AFM product such that is automatically financially manages the user's money as desired.

The duration of each rule defines when implementation of the rule by the product (e.g. implementation module) is to begin and end. For example, the duration is able to be a defined range of dates such as Jan. 1, 2012 to Mar. 3, 2012 or an undefined range of dates (e.g. with no defined end date) such Jan. 1, 2012 to manual termination by the user. In some embodiments, the duration is able to be seasonal or annual by defining the range of dates such as January $1^{st}$, to March $3^{rd}$, whereby not specifying a start and end year, the plan is able to persist from year to year and be evaluated as valid as long as the date of execution of the rule is after the first date and before the second date of the same year, or of the following year in cases when the first date is a month that occurs sequentially later in a year such as October $1^{st}$ to February $3^{rd}$. Alternatively, the end and/or start of the duration is able to be based on a starting and/or ending trigger. For example, the end is able to be when a predetermined amount of money transferred by the rule reaches a desired value (e.g. goal). In particular, the end and/or start triggers are able to be any one or combination of the triggers of the condition-trigger pairs as described below wherein the start or termination of performance of the rule by the performance module occurs based on the end/start triggers occurring.

The condition-trigger pairs define a trigger or monitored variable (e.g. parameter, criteria) upon which the control of the accounts (for which the plan/rules are created) is based and an associated condition of a value or range of values that the trigger must match in order for an action associated with the pair to be performed. For example, if the value of a trigger matches an acceptable value of the paired condition, the condition is met and the associated action is able to be performed (assuming any other conditions associated with the action have also been met). In some embodiments, each rule is able to have a "primary" condition-trigger pair and one or more "exception" condition-trigger pairs, wherein the primary pair is executed when none of the exception conditions are satisfied. In such embodiments, the condition of this primary pair is the value or values indicated by the interval/frequency of the rule as when the rule is to be evaluated (e.g. every Monday) and the trigger of the primary pair is the interval/frequency parameter (e.g. the day of the week) such that the primary condition-trigger pair is met whenever the interval/frequency is met. As a result, the action associated with the primary pair is executed (pending satisfaction of user confirmation requirements, if any) at each interval when the rule is evaluated unless at least one of conditions of the exception pairs is met (in which case the action of the at least one of the conditions of the exception pairs is executed (again pending satisfaction of user confirmation requirements).

In some embodiments, each of the triggers is one of the group comprising: an account balance (e.g. source account, destination account, third party account, local account or combination thereof), a balance change (e.g. income) of an account (source and/or destination account), a balance change (having a value within a specific range, from a specific source, of a specific type and/or during a specific time period) of an account (source and/or destination account), a current date or time (e.g. day, month, year), a price of an item/service (including or excluding taxes, shipping costs, discounts/sales and/or other fees), bill due date, total amount owed (e.g. billed amount plus remaining debt), minimum payment due on bill, a current amount billed (e.g. billed amount), letter/number grade, grade point average, event outcome (e.g. sports event, spread, point totals), other network accessible data values or combinations thereof. For example, a trigger is able to be check deposits or debits, direct/auto deposit deposits, the clearing of check deposits or debits, the clearing of direct/auto deposit deposits, deposits or debits having a value within a desired range (e.g. greater than $100), deposits/debits within last month, the sum of deposits/debits within the last month having a value within a selected range, deposits/debits from one or more designated third party accounts, and/or check deposits within last month within a specified value range from a designated third party account. In other words, any data that is able to be monitored or accessed over a network (e.g. the internet) is able to be used as a trigger.

Similarly, the conditions are each able to comprise one or a set of values that the trigger is able to be that satisfy the condition. Thus, the conditions are able to be a numerical range or single value (e.g. 1-100), a dynamic numerical range or single value (e.g. between 10 and 15% of total balance of account), a dynamic or static non-numerical value (e.g. letter grade A, a letter grade above previous letter grade), an event/outcome (e.g. Celtics beat Lakers) or a combination thereof. In other words, the conditions are able to comprise any value or set of values that the paired triggers can be.

Additionally, each of the condition-trigger pairs is associated with one or more of the actions such that if the pair is satisfied the one or more of the actions are able to be performed. Further, a plurality of pairs are able to be associated with the same one or more actions such that the action is only performed if all of the associated pairs have been satisfied. For example, a first pair associated with the action of a transfer of $100 to a savings account is able to require an account balance of over $500 and a second pair associated with the same action is able to require a most recent deposit of greater than $1000. Thus, the action of transferring the $100 dollars will only occur when both of the pairs have been satisfied, wherein an action or set of actions are able to be associated with any number of a plurality of pairs. In some embodiments, the pairs of each rule/plan are mutually exclusive such that only one of the pairs is able to be satisfied at once (and therefore only one of the associated actions is performed at once). Alternatively, one or more of the pairs of each rule/plan are able to be satisfied simultaneously or concurrently such that the associated actions are all performed. Indeed, as described above, when one of the actions is associated with a plurality of pairs, by definition, all of the plurality of the pairs all need to be satisfied simultaneously or concurrently for the action to be performed.

In some embodiments, each of the rules further comprise starting, ending and/or milestone condition pairs. In particular, these pairs are the same as the condition-trigger pairs except for the differences described herein. Specifically, the action for when the starting condition pair is satisfied is to start the implementation of the rule, the action for when the ending condition pair is satisfied is to terminate or pause the implementation of the rule, and the action for when the milestone condition pair is satisfied is a notification that a milestone has been reached (e.g. saved $1000) to specified users via specified message medium. As a result, the starting and/or ending pairs are able to be used by the implementation module to determine when to start or end implementation of the rule. For example, a starting condition pair is able to be "start when the account balance reaches $1000" and an ending condition pair is able to be "terminate when the account balance reaches $10000." Alternatively, the ending condition is able to be omitted or indicate that the rule is to be performed indefinitely. And the notification module is activated when a milestone pair is satisfied to transmit the milestone message/notification. For example, a milestone condition pair is able to be "notify parents when grade point average is below to 2.0." Alternatively, in some embodiments one or both of the starting and ending condition pairs are simply starting and/or ending dates, wherein the implementation module begins implementing the rule on the starting date and ends implementation (via termination or pausing) at the end date, wherein the difference between the terminate action and the pause action is that although both result in the rule no longer being actively implemented, the termination action also deletes (or categorizes as completed) the rule from the AFM system whereas the pause action saves the rule for future use/re-activation.

The interval (or time of evaluation) defines when and/or how frequently the pairs of the rule are evaluated to determine if the conditions are satisfied by the triggers and thus whether the associated actions should be taken. Thus, the interval is able to be a periodic time (e.g. weekly, monthly, every 10 days), a single time (e.g. Jan. 1, 2020), upon demand/command by a user or based on an interval condition pair. Specifically, the interval condition pair is able to be the same as the condition-trigger pairs except that the action for satisfaction of the interval condition pair is evaluate the rule and its condition-trigger pairs. For example, the interval condition pair is able to be "every time a deposit is made to a selected account" or "every time a deposit is received from a specific source in a selected account," or any of the other possible triggers/conditions like the condition trigger-pairs. Thus, by selecting the interval, the user is able to refine when the rule is implemented.

As described above, the actions are each associated with one or more of the pairs described above wherein the actions are performed if all of the associated pairs have been satisfied. The actions are able to comprise a transfer of money (e.g. withdrawal or deposit between two or more accounts), a purchase of an item/service (based on the purchase module), information notification to a user of a status (e.g. transfer performed), confirmation notification to a user of a pending action (e.g. please confirm transfer should be performed), termination or pausing of a rule (e.g. for an ending pair), starting of a rule (e.g. for a starting pair), milestone notification (e.g. similar to information notification for milestone pair), or other actions known in the art. Additionally, the actions are able to be conditional or independent combinations of the above actions, wherein independent combinations of actions are all implemented independently when the pairs are met whereas conditional combinations require one or more of the actions of the combination to wait on the performance of one or more of the other actions of the combination (and/or other data) before performance. In other words, two or more actions are grouped such that the same one or more conditions being satisfied causes the entire group to be performed. For example, a condition combination of actions is able to be a confirmation message action and a money transfer action wherein the money transfer action does not occur unless the confirmation action has been performed and the user confirmed that the transfer should be sent/made. As another example, an independent combination is able to be a notification message action and a money transfer action wherein both the notification and the money transfer are performed independent of each other.

Further, each of the actions are able to have associated values and/or messages. For example, transfers are able to have an amount of money to transfer and notifications are able to have the data or text of the message to be conveyed, the medium to convey the message and the addresses or users to convey the message to. In particular, the transfer values, like the trigger values, are able to be static amounts (value), relative/dynamic amounts (5% of deposits in the last month) or a combination/hybrid amount ($400 plus 5% of the total balance of the account). Thus, the implementation module is able to use these action values to determine how much to transfer and/or what to "say" when performing transfer and/or notification actions. Thus, the rule generation module enables users to select one or more of the actions, the triggers, the conditions (acceptable values and/or measurement metric/equation) and the interval via the user interface (e.g. selection from a list of a drop down box, entering text in a text box). Alternatively, one or more of the components of each of the rules are able to be determined automatically by the generation module with default values (e.g. if the user does not or cannot select a value). Once the necessary aspects of the rule/plan have been selected or assigned a default value, the generation module generates and stores the rule such that it is able to be implemented by the implementation module as described below.

FIG. 5N, from the path AA as described below, illustrates a generated rule of a plan having an action of transferring money from a selected checking source account to a selected savings destination account based on a primary condition trigger pair (base transfer rule) and two exception condition trigger pairs (conditional rule 1 and conditional rule 2). Specifically, the primary condition will pay a metric determined amount every interval/frequency of 1 month unless the first exception is met with the trigger of the payer's checking account balance meeting the condition of being less than $1000 or the second exception is met with the trigger of the payer's checking account balance meeting the condition of the balance being between $4000 and $10000. The primary condition transfer amount metric/equation is 10% of the checking account balance plus $100, the first exception condition transfer amount metric/equation is 5% of the checking account balance plus $0 and the second exception condition transfer amount metric/equation is 12% of the checking account balance plus $3000. Further, the rule/plan will last for the duration of from Feb. 14, 2014 to an indefinite end date (e.g. no end date; save without limit). Finally, the second exception condition requires a confirmation "(text confirmation is required)" before it is executed whereas the primary and first exception condition do not require confirmation before execution is performed. Other examples of rule/plans are shown in FIGS. 6Q, 7I, 8R, 9K, 10L, 11I and 12N.

Group Identification Module

In some embodiments, the AFM comprises a group identification module that enables users to create more complex trigger-condition pairs for one or more rules/plans by allowing parameters/values of the pairs to be identified dynamically (e.g. a changing group) instead of statically. In particular, the module enables the sources/destinations of the trigger-condition pairs to be described by source/destination rules (e.g. that are determined at the time of execution of the plan/rule). Thus, instead of just selecting a static source or destination (e.g. a particular account) as a source/destination for a rule/condition-trigger pair (e.g. transfer X to account Y if account A has more than $200), a user is able to create a source/destination rule that defines the source or destination (e.g. transfer X to account Y with money from source group A if it is greater than $200, where source group A is defined by source rule A). For example, a rule/condition-trigger pair including a source/destination rule is able to be: transfer X to account Y with money from source group A if it is greater than $200, where source group A is defined by source rule A which is "all deposits in the last month from sources including the keywords: A and B or C." Or another example would be: transfer X to destination group A if account Y has more than $200, where destination group A is defined by destination rule A, which is "accounts including the keywords: A and B or C." Thus, instead of identifying one or more sources/destinations directly and statically, the module enables a user to identify them dynamically using a source/destination rule (where the sources/destinations that are identified by the rule can change over time as the characteristics of the sources/destinations change and the fall out of or move into the boundaries of the rule). Further, the source/destination rules are able to be used in combination with the static identification of one or more sources/destinations (e.g. to ensure that a source/destination is always included even if it falls out of the rule). For example, a source rule is able to be: $100 of account Z (i.e. a static source identifier) and "all deposits in the last month from sources including the keywords: A and B or C" (i.e. a dynamic rule source identifier) such that the source group will always include the statically identified source in addition to the dynamically changing sources that fall into the source rule. As a result, the group identification module of the AFM provides the benefit of enabling a user to define dynamic sources/destinations for use in rules.

The source/destination rules are able to be created by a user via the AFM user interface by manually entering queries, data sets to apply the queries to and/or valuation parameters as the dynamic data (and/or along with selecting static data from presented options (e.g. a list of accounts)). In particular, the queries are able to include identified characteristics (e.g. name, account number, owner) and operators (e.g. boolean operators) combined with keywords, strings or other types of queries (e.g. equal to keyword A). The data sets are able to include source or destination type identifiers (e.g. all accounts, all owned accounts, accounts created in the past year, savings accounts, or other types of accounts) and the valuation parameters are able to define how the money in the source is quantified (e.g. only money in time frame A, only money above threshold A, all money in account, only 10% of total money in account). Thus, a user is able to input as a new source rule 1) characteristic: name; operator: equal to; keywords A, B and C; data set: all owned accounts; and valuation parameters: deposits in the last month.

As a result, when determining the source/destination group for that new source/destination rule, the module applies the keywords A, B and C to the data set of all the owned accounts, and using the resulting accounts, it identifies the portion of the money in those accounts that satisfies the valuation parameter of deposited in the last month. That identified money in those identified accounts is what is defined by that new source rule at that time for the purposes of executing a plan/rule that includes that source rule. In some embodiments, during creation of a new source/destination rule the results (i.e. the accounts/valuation that would be defined by the rule at that time) are presented to the user such that the user is able to verify that the source/destination rule is adequate or further refine the query, parameter and/or data set to produce different results. In some embodiments, while the query terms are able to be entered in a search box, the query target characteristic, data set and/or valuation parameter are able to selected from one or more presented options (e.g. drop-down boxes presenting possible data sets and/or parameters for a user to select).

In some embodiments, instead of (or in addition to) manually entering data for a source/destination rule the user is able to select one or more elements from a selected/displayed data set (e.g. all debits in the last year), and the group identification module automatically creates a rule that defines the selected elements from the data set (at that time). For example, upon selecting elements (e.g. deposits) A, B and C from a data set of A-Z, the module automatically generates a query that when applied to the data set returns only elements similar to A, B and C. Similarly, the module enables a user to select one or more of the elements of the data set for exclusion from the rule. For example, upon selecting elements (e.g. deposits) A, B and C for inclusion and element D for exclusion from a data set of A-Z, the module generates a query that when applied to the data set returns only elements similar to A, B and C and not similar to element D. Thus, the AFM provides the benefit of enabling the dynamic source/destination rule creation to be automatically performed based on user selections from the data set instead of manually entering queries. Moreover, when forming a source/destination rule, the module enables a user to combine static data, manually entered dynamic data (e.g. manually entered query), and/or automatically generated static data (e.g. query automatically generated based on user selections) to create the source/destination rule. Alternatively or in addition, the data set itself to be searched is also able to be dynamic and defined by a data set rule that is created in the same manner as the source/destination rules as described herein.

In some embodiments, the generation module enables a user to save and/or name one or more of the source/destination rules/groups (e.g. spendable money rule/group, after tax income rule/group, work deposit rule/group, priority debit rule/group) such that when creating new condition-trigger pairs or modifying existing condition-trigger pairs, the saved rules/groups are able to be accessed a selected for one or more of the conditions/triggers of the condition-trigger pairs (without needing to recreate the rule again).

Token Generation Module

In some embodiments, the AFM is able to comprise a token generating module or application programming interface that generates a token for depositors or other users to add to or "tag" their transactions with (e.g. as added meta-data or other parts of the transaction) such that the AFM is able to detect and use the tokens to automatically identify those deposits as being from that depositor/user (instead of relying on keywords or other identifiers). In some embodiments, instead of or addition to the AFM, the tokens are able to be provided by a third party entity for use with the AFM and or other systems. In such embodiments, the issued tokens are able to be universally unique rather than unique only to the AFM system. In either case, the token used to tag is able to be selected or entered by a user and/or automatically selected by the AFM to identify desired income transaction sources (e.g. when creating one or more account rules/plans, source/destination rules and/or generating financial reports). In particular, in this manner each token is able to be used to identify income sources and the associated transactions for providing granularly level budgeting breakdowns to users.

In some embodiments, the module is able to use artificial intelligence (AI), pattern recognition, AI-augmented pattern recognition, or meta-data to search through user transactions for possible income sources that are able to be tagged as an income source. For example, the module is able to monitor transaction source, amount, destination, type (e.g. check, auto-deposit, credit, etc.), frequency, time, day, date and/or other transaction characteristics of an account/user and then automatically identifying individual sources of income based on patterns in these characteristics (e.g. the characteristics/patterns meeting or matching a static or evolving characteristic/pattern value criteria/range of values) and proposing/presenting them to the user in a prompt/message/notification to be approved, discarded, or excluded by the user as needing a particular tag/token. In some embodiments, the module is able to monitor the characteristics of the transactions that are not confirmed by the user (after being prompted) and/or that are explicitly excluded or identified as not being income and adjust the characteristic/pattern value criteria based on the characteristic values/patterns of the excluded transactions.

Thus, if the module determines that for a particular user account a transaction occurs at a particular frequency (e.g. every 7 days), at a particular time in the month (e.g. every $15^{th}$ and $30^{th}$ day), and/or for a particular amount (e.g. the same amount each time, between a particular value range or above a threshold value), the module is able to send a notification/prompt to the user on the AFM that asks the user to determine if the transactions or source of the transactions can be tagged as a particular source (e.g. income source). In some embodiments, the prompt is able to be a part of the rule/plan generation process as a supplement to the source selection portion. Alternatively or in addition, module is able to prompt the user to actively search through one or more of the transactions and select one or more of the transactions as needing a tag applied to those transactions.

In some embodiments, the token generation module is able to issue unique identifying tokens externally to banks, credit unions, payment platforms, private businesses, or individual consumers upon request. For example, an AFM issued income token assigned to Joe Adam would allow an AFM user to select Joe as an income source regardless of whether Joe paid him via another entity (e.g. a bank, Zelle, direct deposit, or Paypal), as long as the institutions processing the transactions and associated data were all participating in the use of the AFM tokens in order to identify the transaction/deposit. In some embodiments, the AFM is able to issue a unique token to a platform like PayPal paired with a unique token for the specific user Joe Adam. In such embodiments, for example, both tokens are able to be included within an ACH request to a bank from PayPal wherein the bank would make the tokens associated with the transaction available to 3rd parties that had been authorized access by the account owner (such as data aggregators like Plaid and Yodlee), and the AFM enables a user to create a rule specifying that a particular plan be triggered and/or funded by any payment received from any Paypal user (by identifying sources with the PayPal unique tag), or funded by Joe Adam via PayPal (including the Joe Adam and/or PayPal tags, but excluding payment from Joe Adam via Zelle including a Zelle tag). In some embodiments, this cross-platform token is able to include additional meta-data relevant to the purpose of the transaction, the intended use of the transaction, a particular originating or intermediary account or sub-account, or any other such data intended to communicate unambiguously across various platforms for the purpose of easy, simple, intelligent, and accurate management of finances.

As a result, the AFM enables searching and tagging income for the purpose of identifying a specific depositor and/or identifying income through the use of artificial intelligence (AI), pattern recognition, AI-augmented pattern recognition, or meta-data.

Performance Module

The performance module automatically performs (e.g. via the servers 102 and/or client devices 104) the plans/rules generated by the user according to the characteristics of the plans/rules as defined by the users when generating the rules/plans. In particular, the performance module begins monitoring the starting triggers of each of the rules once they have been created and then begins performing each of the rules when their duration begins based on the starting trigger and ceases performance when their duration ends based on the ending trigger.

Similarly, during the performance of each of the rules, the performance module monitors all of the condition trigger values at the specified intervals and performs the associated actions when one or more of the conditions are satisfied based on the values of the corresponding trigger(s). As a result, the performance module automatically and dynamically performs the AFM plans thereby enabling the users to easily control their financial accounts.

The Social Module

The social module enables user to specify whether one or more rules (or plans) are public or private, wherein rules specified as private are concealed from view and rules specified as public are able to be viewed by one or more other selected groups/categories users of the AFM (e.g. all users, only users identified as friends, only users selected by the rule creator, or other user groups). If a rule is public, the social module automatically enables one or more other users/accounts on the AFM system to comment on, like, follow (and/or invite to follow), clone and/or become a contributor to the rule (and/or invite to contribute). Alternatively, the social module enables one or more rules to be public, but prevents the rule from being contributed to and/or followed by other users based on selections by the owner of the rule.

Using the cloning function, a user is able to select one or more public rules of other users and the social module automatically creates a duplicate rule for that user (while prompting the user to select parameters that cannot be duplicated such as source accounts that are not controlled by the user). In addition to the values/parameters of the rule, the function is able to duplicate ancillary data about the rule such as a link to the item being saved for, audio/text/video (e.g. photos), rule name, goal amount or other data that has been associated with the rule. In some embodiments, the social module enables a user to specify which parts of a public rule are able to be duplicated by another user. Specifically, they are able to specify that current saving amounts or other parameters or values of the rule are hidden or not able to be cloned. For example, if a user selects for cloning a public rule that states "transfer $200 from checking account A to savings account B if balance of checking account is greater than $2000 on the 1st of each month," the social module automatically creates a duplicate rule and prompts the user to finish the rule by entering accounts "A" and "B" which they control and the user desires to substitute for the parts of the cloned rule that the user does not control (and thus cannot be duplicated).

Using the following function, a user is able to view public rules from other users (e.g. friends) and select one or more of those rules to be followed (if the user who created the rule enabled the following function for the public rule). Once followed, the social module is able to send notifications (e.g. using the notification module) about changes to the status of the rule (e.g. when transactions are made based on the rule, when the rule is edited, if the owner of the rule inputs a message about the rule). For example, a user is able to create a public rule about saving to an account for a vacation to Hawaii that is followed by the parents of the user who then get notifications about deposits into the account (e.g. at one or more user-selected or default account balance milestones), notifications about changes to the amount needed for the rule/vacation, and/or user generated messages about the rule (e.g. "We decided to change plans, now saving for a vacation in Alaska, not Hawaii"). The social module enables a user to select what types or combinations of notifications are sent to which users (e.g. just messages, just milestones, etc.).

Using the contributor function, a user is able to select one or more public rules for which contribution has been enabled by the rule creator and the social module generates a contribution rule that contributes to the selected public rule. For example, if a user has made a public rule about saving to an account for a vacation to Hawaii that is contributed to by the parents of the user, the AFM facilitates the creation of the contribution rule that contributes (based on any specified parameters) to the same Hawaii vacation account in order to help and encourage their child to save for the Hawaii vacation. In some embodiments, the social module automatically creates a generic contribution rule for which the destination of the contribution is the same as the destination of the contributed to rule and prompts the user to edit or add needed parameters (e.g. source account or accounts from which the contribution is to be collected from, trigger-condition pair values, or other parameters of the rule described herein).

In some embodiments, the contribution rule trigger-condition pairs are able to be based on or a function of actions of/changes in status of the contributed rule. For example, a user is able to specify: that the contribution rule contributes an amount that is a factor/ratio (e.g. half, double, 0.25, etc.) of the amount contributed by the contributed to rule; that the contribution rule contributes at the same intervals, different intervals, upon the total contribution by the contributed rule reaching one or more thresholds (e.g. contribute $1000 more when the existing total reaches $1000 to reward for reaching the milestone) and/or a specified relationship to the intervals (e.g. ever other interval) as the contributed rule; that the contribution rule contributes a specified greater or less amount based on the amount contributed by the contributed rule (e.g. contribute an amount such that the sum of the amount contributed by the contributed to rule itself and the contribution rule is equal to $1000); that the contribution rule caps or limits a total amount of contributions made within a period, a total amount of money to be sent in a single transaction, a duration of the contribution rule and/or other limits on the extent of the contributions; and/or that any of the condition trigger pairs of the contribution rule are based on values of the contributed rule in any combination. In some embodiments, like the following function, the contribution function is able to provide notifications to the contributor users about updates/changes to the contributed rule and/or messages from the contributed to user. In some embodiments, the social module notifies the owner of the public rule of the newly generated contribution rule and/or requires the owner of the contributed to rule to approve the request by the user to contribute before the contribution rule is enabled.

In any case, the social module provides the benefit of enabling users to follow another user's plan, clone it, or become a contributor, which provides a social aspect to monetary planning that results in more enthusiasm, teamwork and other encouragement for better monetary habits.

The Notification Module

The notification module enables users to specify whether they would like notifications when one or more of the conditions have been met and sends the notifications based on the user specifications. The notifications are able to be in the form of text messages, emails, voice messages or other types of notification known in the art. For example, one or more of the actions associated with the rules are able to be assigned a notification status, wherein if the status indicates to, the notification module is able to provide notifications before one or more of the actions are performed. As another example, the notification module is able to optionally send notifications to the user based on one or more milestones of a rule being met, such as a savings account reaching the halfway point or a grade point average becoming greater than 3.0.

Additionally, one or more of the notifications are able to include a confirmation feature, wherein the action associated with the notification is able to only be performed by the module if the user confirms that the action should be made in response to the notification. For example, each of the condition-trigger pairs of a rule are able to have different or the same confirmation requirements that must be satisfied before the action associated with the condition-trigger pair (and the rule) is performed by the AFM product. Thus, the notifications are able to be used to ensure unwanted actions are not taken by the AFM product without user confirmation. Indeed, in some embodiments when a funding account holder receives a notification including a confirmation feature for manual approval on a pending transfer (e.g. as a result of the conditions of a rule being met), the user has the option to log in and approve the scheduled amount or manually enter an alternative dollar amount to be released instead (e.g. manually overriding the transfer amount). The user is able to also have the option to cancel any individual transfer that is awaiting his/her confirmation. The notification module is further able to send the notifications to one or more parties other than the user (wherein the other party's contact information has been input to the AFM product). For example, both users of a transfer between two users are able to receive notifications as desired.

The Rule/Plan Editing Module

The rule/plan editing module enables a user to review one or more of the existing rules associated with the user profile and change any of the selected characteristics of the rule and/or delete the rule. For example, the user is able to add conditions to the rule or rules within a given payment plan, change targets of one or more conditions or other adjustments to the rule(s). Additionally, in some embodiments, when a user finishes the initial set up of a rule establishing a payment plan of money from one or more accounts of the user ("payer") to another account of a different user or third party ("payee"), the rule editing module enables the payer to either allow the payee to review and edit the details of the rule(s) or instead to save and immediately activate the plan without enabling the payee to edit/confirm the rule(s). In contrast, in some embodiments if a rule establishing a payment plan is created by a user who is the payee, the rule is able to always be submitted to the payer for review and editing or approval. In such embodiments, once a payer has received the rule or rules generated by the payee, the editing module enables the payer to allow or revoke the payee's ability to edit plan details. Additionally, in some embodiments whenever this "allow payee editing" feature of the editing module is enabled, any time one of the users (payer or payee) makes one or more changes to the rule, the rule is passed back and forth between the users until all of the users approve the rule without any new changes. In some embodiments, each time a plan is passed back and forth for approval, a summary of the recent changes by each user is provided for the convenience of the users.

In some embodiments, the rule creation process is able to be bifurcated wherein first one or more goals (that identify total amounts to be saved, accounts to be saved in and/or identification of what is being saved for, but do not require that the full rule be completed) are able to be created and stored, and subsequently one or more of the goals are able to be selected for completion wherein the remainder of the parameters needed for creating the rule are added (e.g. start, end, condition-trigger pairs, source, or other parameters described herein). Specifically, when a goal is selected for completion the AFM automatically creates a partial rule based on the already entered data of the goal and prompts the user for the additional selections/options/input required to complete the rule. As a result, a user is able to generate, store and view goals without knowing exactly how or when they are going to be completed, and then as soon as they do, the user is able to select the goal and easily convert it to a corresponding rule. In some embodiments, one or more pictures, text and/or videos are able to be associated with one or more of the goals and/or rules such that when accessing the goals/rule a user is presented with the pictures, text and/or videos. For example, a user is able to associate a video of surfing with a goal to visit Hawaii such that when they view that goal they are reminded of why it is important to them and incentivized to convert the goal to a rule (or it already is a rule, to reach the total need to meet the goal of the rule).

The Rule/Plan Prioritization Module

The rule/plan prioritization module enables a user to adjust the order and therefore priority in which each of the rules associated with one or more of the accounts of their user profile are executed. Specifically, based on this order, each of the plans and their sets of rules are able to be evaluated and then executed in order such that the effects of the previous/higher priority rules/plans on the status/value of the associated accounts and target/parameter values of subsequent rules/plans are included in the evaluation and execution of those subsequent rules/plans. Thus, the rule/plan prioritization module enables the users to optionally rearrange the priority/order that the rules are executed. In some embodiments, this priority is assigned by assigning different times and/or dates when each of the rules are to be executed such that rules with earlier times and/or dates are prioritized before those with later times and/or dates. In such embodiments, if two or more rules are scheduled to execute at the same time, the module is able to prompt the user to assign a priority (e.g. time difference) between the two or more rules until all of the rules are ordered.

The Virtual Savings Bin Module

The virtual savings bin module enables a user to create savings bins or mini-accounts that are maintained and tracked by the AFM product. These bins are virtual accounts that freeze and control the money within them on behalf of a plan or goal. While the funds within each virtual savings bin are co-mingled in a giant aggregate account, contents of each of the virtual savings bins are not counted in any other balances. Thus, the bins are operated to prevent the money associated within them from being transferred from the aggregate account unless that bin (not the aggregate account) is selected as the source of the transfer.

In some embodiments, the savings bin module is able to generate virtual folders of money that will be tracked separately from the rest of the user's moneys held within one or more of the accounts associated with their user profile. These savings bins are able to represent an identified subset of the money in one or more of the accounts, wherein the subset is specified by the user when generating the savings bin with the savings bin module. In some embodiments, the subset is able to be money transferred into one of the accounts as a result of one or more of the rules. Alternatively, the subset is able to be money transferred into one of the accounts by one or more rules and/or any other types of deposits from one or more of the accounts such as those types/amounts of the targets as described above (e.g. checks above $100, account transfers during a specified time period, all deposits).

For example, a user is able to set up a savings bin that tracks an amount of money transferred into an associated account based on a rule for saving money each month. As a result, even if the account has a total balance of $100, if $25 of that balance is money transferred based on the rule associated with the savings bin, the savings bin balance will be $25. In particular, this enables a user to easily track how much they have saved for a desired item (e.g. a purse) by creating a purse savings bin associated with a rule that periodically saves money for the purpose. Once set up, the module is able to enable the user to use the savings bin as a funding account or a receiving account just like any other account. Additionally, all moneys in savings bins are able to be available for immediate transfer to any other system users, and/or a user is able to delete savings bins.

The Account Grouping Module

The account grouping module enables users to create account groups that enable the users to use two or more accounts as a single account within the AFM product. In other words, grouping accounts essentially creates a combined account that is presented to the user within the AFM product such that the combined account represents an aggregation of the deposits and debits of all the accounts that are a part of the combined account. In particular, this is able to provide an ease of use, for example, if a user utilizes multiple different accounts for savings and would like to view their savings as a whole across all or a plurality of the accounts instead of individually. Further, once created, a user is able to use the combined account as if it is a regular single account. For example, a user is able to deposit/withdraw money into/out of the combined account as if it was a single account, utilize the rule generation module to generate rules utilizing the combined account as a source or destination account, and/or any of the other features described herein with respect to the accounts.

In order to generate a combined account, the user specifies a plurality of the accounts associated with the user profile that are to make up the combined account and then selects funding and withdrawal policies that define how deposited money is distributed into the accounts of the combined account and/or how withdrawn/transferred money is divided between the balances of the accounts of the combined account. In particular, the withdrawal policies are able to address situations where one or more of the associated accounts have insufficient funds to cover a transfer out of the combined account. In some embodiments, the deposit and/or withdrawal division is able to be percentage based where each of the associated accounts receives and/or contributes an amount based on a percentage assigned to the associated account by the user. In some embodiments, the deposit and/or withdrawal division is able to be proportional to the balance of each of the accounts with response to the whole combined account as dynamically determined each time before the funding/draining occurs.

In other words, if an account makes up half of the entire balance of the combined account, it is drained/funded for half of the entire funding/withdrawal amount. Alternatively, the associated accounts are able to be ordered such that the associated accounts are drained and/or funded based on the order as specified by the user. In such embodiments, the switching to the next account within the order is able to be triggered based on one or more switching thresholds being met. For example, each of the associated accounts is able to be associated with a value, a percentage or both such that once the funding or draining of the account has reached the value, the percentage increase/decrease, or a percentage increase/decrease plus or minus the value, the funding or draining switches to the next account within the order. Further, in some embodiments if the end of the order is reached, the remainder of the funding/draining is performed by withdrawing as much as is needed from the last account, regardless of its individual policies, moving back up to the start of the order if needed to drain all that is required to fulfill the transfer from each account in order of priority or once the last account has been drained according to its policies, the module switches back to the start of the order to drain all that is needed from each account in order of priority regardless of their individual policies until the transfer amount has been satisfied. In some embodiments, when defining policies while forming an account group, a user is able to determine whether or not the individual policies for any individual account within the group are "preferred," or able to be overridden in cases such as those described above, or whether the policies are absolute such that they are never to be violated.

Additionally, in some embodiments the policies are able to specify how to handle the case where one or more of the accounts have insufficient funds to meet the amount of their share of a withdrawal (as determined by the withdrawal policy and thresholds for those accounts). For example, the policy is able to specify that if one or more of the accounts in a combined account has insufficient funds: cancel the whole transfer (do not transfer money from any account in the group); cancel those accounts' portions/shares of the transfer and send the withdrawal amount from the remaining accounts of the combined account with sufficient funds; send as much as possible from each of those accounts and then send the remaining withdrawal amount from the remaining accounts of the combined account; set up a linear insufficient funds priority/order to use one account to pick up all insufficient funds, then a second if the first falls short, a third, and so on as the user desires (wherein if there are not enough funds in the last account to cover the difference, all available money will be sent from all actively funding accounts in the group) or distribute the difference equally between the other funding accounts, paying as much from all accounts as possible if there's not enough to fund the whole amount with equal portions. Additionally, in some embodiments if two or more accounts have insufficient funds, or if one or more of the "overflow accounts" has insufficient funds to cover the whole amount of the difference from the account(s) with insufficient funds, as much as possible is able to be transferred from each account and the remaining balance owed is able to continue to be covered equally among any accounts in the account group with remaining funds.

Further, in some embodiments, the policies are able to specify an account buffer amount for one or more of the accounts making up the combined account or the combined account as a whole. Thus, if the user selects an option to "protect a certain balance across this combined account" and enters $100 as the protected balance, the distribution of funding and/or draining in combined account proceeds normally, but only after $100 is reserved proportionally over all accounts before performing any funding and/or draining operations. For example, if the combined account was scheduled to transfer $1000 and the accounts have balances of Account A: $750, Account B: $150, and Account C: $100, with the combined account funding method set to "pay automatically/proportionally," first the protected $100 would be set aside according to the user's "safety buffer" before any calculations are made or transfers sent. The module presumes that Account A has $675 available ($750–$75), Account B has $135 ($150–$15), and Account C has $90 ($100–$10). As a result, the schedules transfer would result in sending $900 in total leaving Account A with $75, Account B with $15, and Account C with $10. In other words, this combined account would always pay as much as possible without dipping into the account buffers. Indeed, in the above case, both the payee and the payer are able to receive a notification that less funds were sent than were scheduled, but that as much was paid as possible according to the policy. In some embodiments, only the payer would be able to see the details of why less funds were sent: that the system was preserving his/her $100 combined account buffer.

Finally, in some embodiments, if a user wishes to use certain accounts in a combined account only to inform conditional rules in certain plans, but does not want to use them for that combined account's funding distribution, the module provides the option to disable those accounts from active funding in that combined account by enabling "reference only" for that account in the smart combined account's settings. This option enables a user to select accounts to be included whenever the system references the combined account's balance or income (as in evaluating a conditional rule), but omit it when the combined account is funding a payment or transfer. It should be noted that all of these options described above are able to be input by a user into the account grouping module and then automatically enforced by the grouping module for the combined accounts.

The Review Module

The review module enables users to review different types of data about the accounts associated with their user profile. Specifically, the review module illustrates incoming and outgoing histories where a user is able to see all transfers that have come in and gone out over time, expand details where a user is able to expand any transaction to see what conditions and settings were triggered in determining transfer amounts, and provide totals where a user is able to see the total cumulative amounts transferred for any plan and how much is still left to pay or save on it. Further, in some embodiments the review module enables the user to hover over any of the rules to see their projected transfer amount according to the current or predicted values of the associated targets/parameter values associated with the rules and the entered priority. In some embodiments, the review module enables a user to choose to "Add an Expected/Adjustment Deposit to the Timeline," wherein when the user chooses this option, he/she selects the account receiving the deposit and enters an expected deposit amount and expected clearing date. Based on this input (which is able to appear in a different color on the timeline), the review module displays data indicating how payment and plan transfer amounts would change with various account balances or incomes on certain dates. Specifically, after an expected deposit is entered on the timeline, all plans and payments coming after it would show both a "projected transfer amount with current account conditions" and an additional "projected transfer amount with adjusted account conditions."

In some embodiments, the review module enables the user to toggle on or off a setting to "include expected/adjustment deposits in the timeline" according to his/her preference, wherein: (1) if toggled off, expected/adjustment deposits disappear from the timeline and "projected transfer amounts with adjusted account conditions" are removed from payment and plan displays; and (2) If toggled on, the expected deposits are included on the timeline once again and both "projected transfer amounts with current account conditions" and "projected transfer amounts with adjusted account conditions" are shown. Also, the review module enables the user to "verify" his/her account plans by evaluating a selected rule associated with the account and bring the user's attention to potential common errors. For example if a user has one account plan rule that pays $100 if his/her balance is less than $2000 and another rule that pays $200 if his/her balance is over $2001, the verification script will ask him/her if he/she intentionally left a gap in the rules between $2000 and $2001 and the user will have the option to automatically resolve the gap by adjusting one or the other of the rules. If the user chooses to automatically resolve the gap by fixing the first rule, that rule will change to pay $100 if the balance is less than $2001.01 (or less than or equal to $2001). If the user chooses to resolve the gap by choosing to fix the second rule, the rule would be resolved in a similar fashion by paying $200 if the user's balance is more than $1999.99 (or more than or equal to $2000). Thus, the review module helps ensure that fully effective rules for each account plan are generated.

The Product Purchase Module

The product purchase module enables a user to select a product/service from a merchant (e.g. a merchant website) and associated the product with a rule that will automatically (or upon approval) input the necessary information and transmit the necessary money to purchase the selected product/service if the conditions of the rule are met. In particular, such a product purchase rule is similar to a rule for saving money as described herein except that one of the targets/parameters is the price of the product/service and the action is the purchase of the product/service in addition to the transfer of money for the purpose of savings. For example, the rule is able to be conditioned on the price of the item/service (e.g. including shipping, taxes and/or other fees) being within a specified range. Thus, if the price is within that range and other conditions are met (e.g. the funds saved by the rule being equal or greater that price, the current date being within a specified range, or other types of conditions described herein), the product purchase module will either automatically purchase the product/service or will ask the user for confirmation for the purchase and then purchase or not based on the response to the confirmation.

Method of Operation

Figure 3:
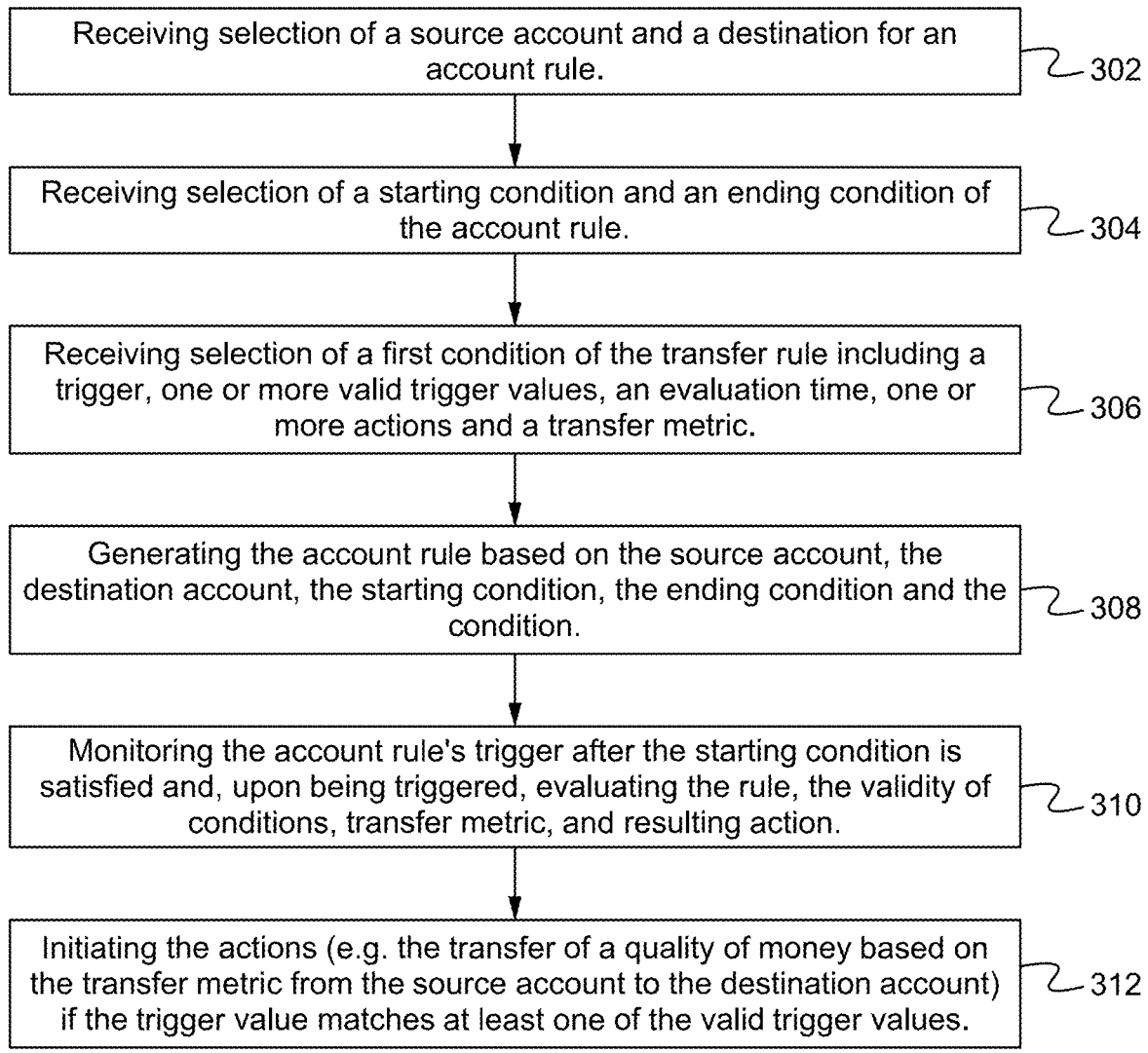
FIG. 3 illustrates a method of dynamic financial management of one or more of monetary accounts according to some embodiments.

FIG. 3 illustrates a method of dynamic financial management of one or more of monetary accounts according to some embodiments. As shown in FIG. 3, the AFM product inputs selection of a source account and a destination account for an account rule/plan by a user. The AFM product then inputs selection of a starting condition and an ending condition of the account rule by the user at the step 304. The AFM product inputs selection of a condition of the transfer rule including a trigger, one or more valid trigger values, an evaluation time, one or more actions and a transfer metric or equation by the user at the step 306. Alternatively, the AFM product is able to input a plurality of conditions and their associated values from the user for the account rule/plan. In some embodiments, one or more of the input selections are able to be omitted and instead the AFM product is able to provide predetermined default values. Based on the source account, the destination account, the starting condition, the ending condition and the condition, the AFM product generates and stores the account rule/plan at the step 308. The AFM product monitors the trigger of the account rule once the starting condition is satisfied, and upon being triggered to evaluate (based on the evaluation time(s) indicated by the interval/frequency), evaluating the rule by determining the validity of the conditions of the rule and determining an action and a transfer amount (based on the associated transfer amount metric) of the valid one of the conditions at the step 310. In some embodiments, a primary condition is satisfied by default at each of the evaluation times such that the evaluating of the rule comprises determining if any exception conditions are satisfied thereby overriding the primary condition. Finally, the AFM product initiates the action associated with the condition (e.g. transfer of a quantity of money based on the transfer metric from the source account to the destination account) if the trigger value (or monitored variable) matches at least one of the valid trigger values such that the condition is met. In some embodiments, if the rule includes a plurality of conditions associated with the same action, the action is only initiated if all of the conditions are met. In some embodiments, if the rule includes a plurality of conditions associated with different actions, the different actions are each initiated if their associated conditions are all met. In some embodiments, the AFM product then pauses or terminates the account rule when the ending condition has been met. Alternatively, the ending condition is able to be omitted and/or indicate indefinite operation of the rule/plan. As a result, the method provides the advantage of enabling a user to easily automatically manage their financial accounts according to a plurality of selected scenarios.

In some embodiments, the method further comprises receiving selection by the user of a confirmation preference for the rule (e.g. whether a confirmation notification is required before an action should take place), wherein the AFM product then refrains from the initiating of the action until the confirmation preference has been met for the rule. In some embodiments, the method further comprises presenting a notification of the calculated amount of money to be transferred based on the rule or rules of the plan such that the user is able to evaluate whether the rule is going to do what they want it to accomplish or whether they would like to cancel or amend the transfer for any personal reason. In some embodiments, the method further comprises presenting to the user a total amount of money that has been transferred based on the rule such that the user is able to evaluate whether the rule is doing what they want the rule to accomplish. In other words, the user is able to be presented with "historical" data indicating how much, when and where money has been transferred because of the rule or rules in a given time period in order to determine the effects of the rule or rules in that time period. In some embodiments, the method further comprises receiving selection by the user of a product/service from a third party website having a projected cost, creating a savings bin for the product and automatically purchasing the product/service from the third party website if an amount of money within the virtual savings bin equals the projected cost. In some embodiments, the method further comprises receiving selection by the user of a spending limit for the rule associated with the product, wherein the AFM refrains from purchasing the product/service or shopping cart of products, services, taxes, and/or shipping fees if the total amount of money transferred based on the rule equals the spending limit. In some embodiments, the source and/or destination accounts are combined accounts that represent a plurality of accounts that are funded and drained according to funding and draining policies. Additionally, although the method of FIG. 3 includes steps 302-310, one or more of the steps are able to be omitted, rearranged and/or additional steps are able to be added including one or more of the features described herein.

AFM Implementation Examples

Figure 4A:
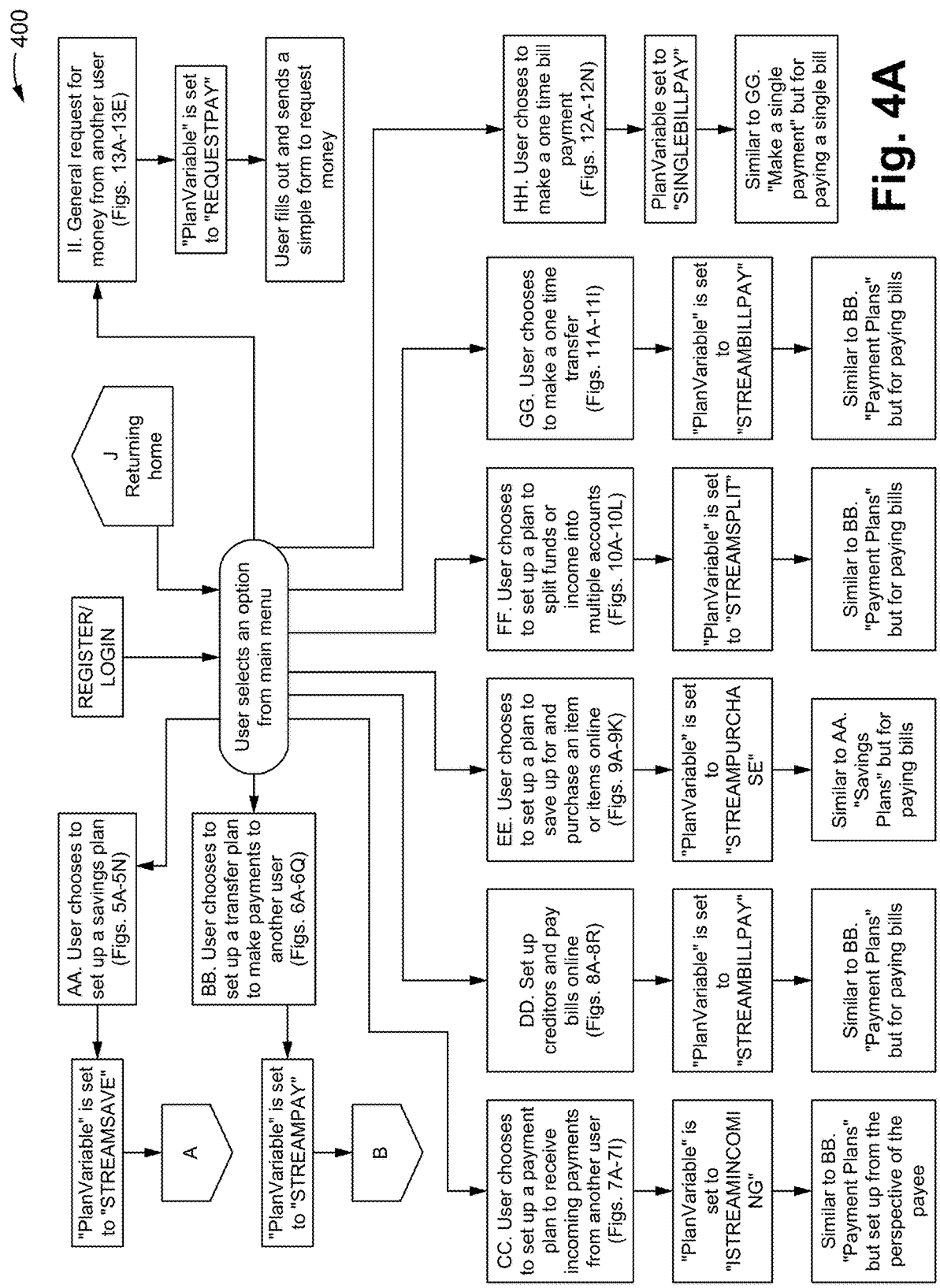
FIGS. 4A-4N illustrate an exemplary flow chart of implementing the AFM product according to some embodiments.
Figure 4B:
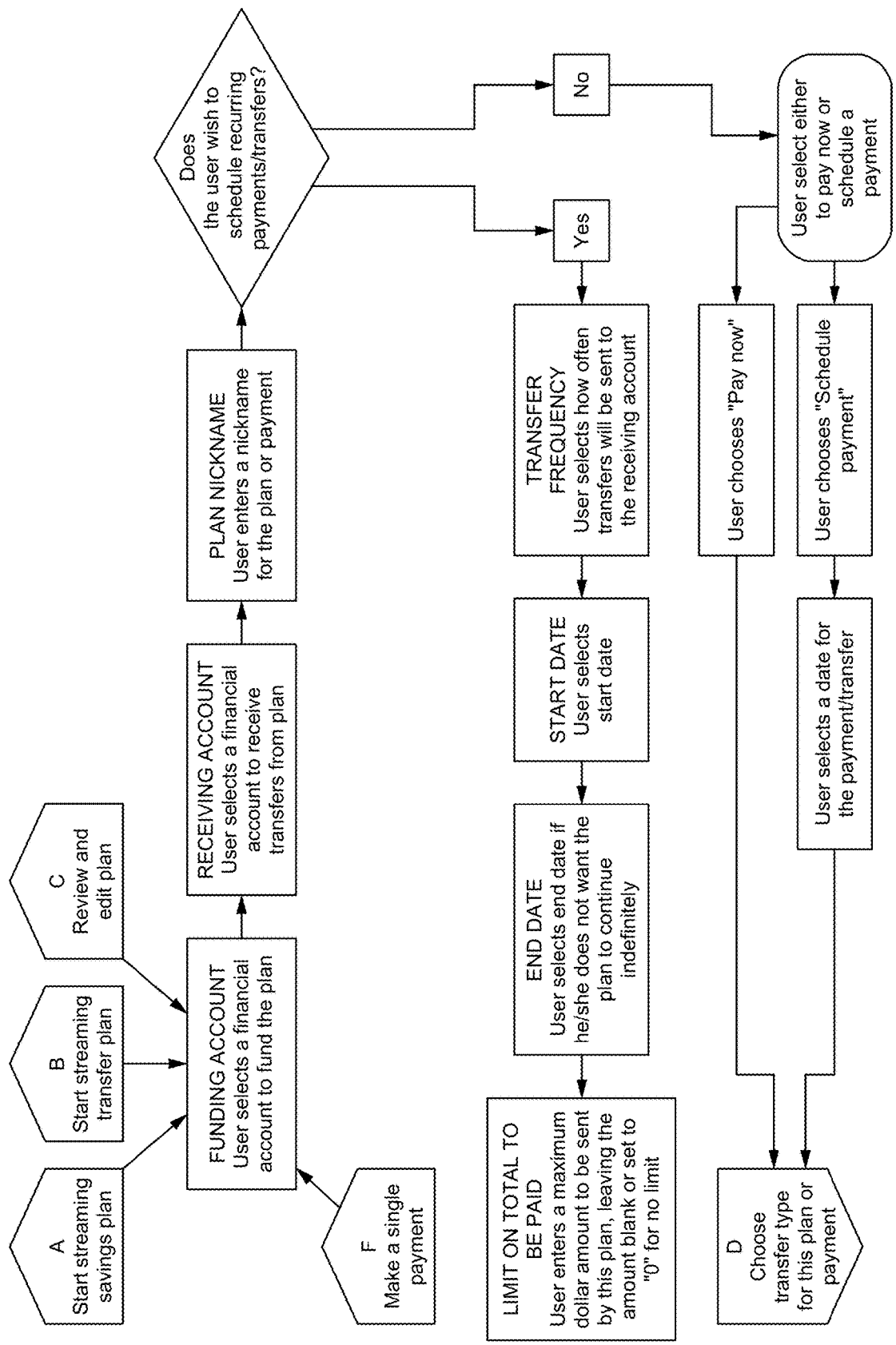
Figure 4C:
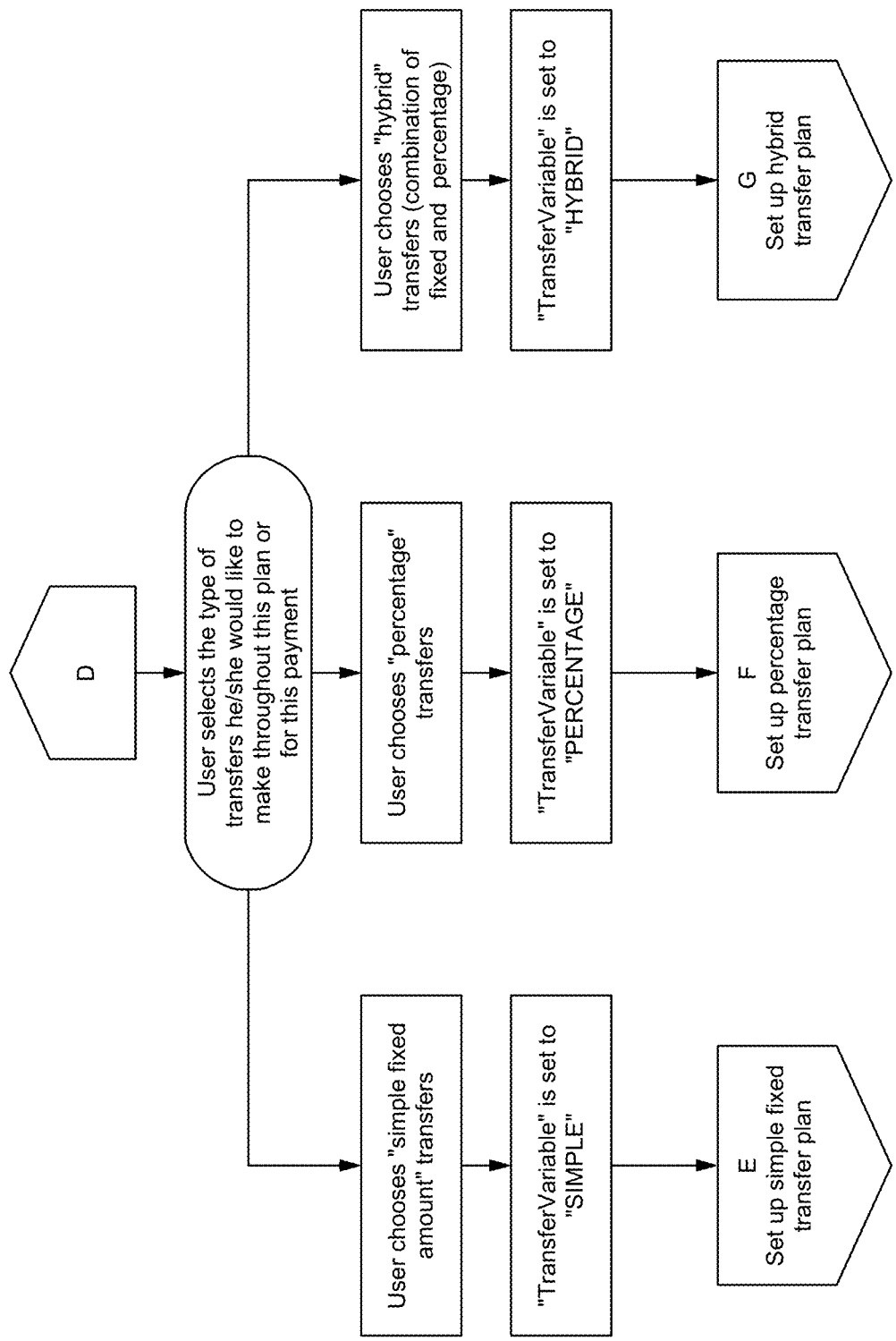
Figure 4D:
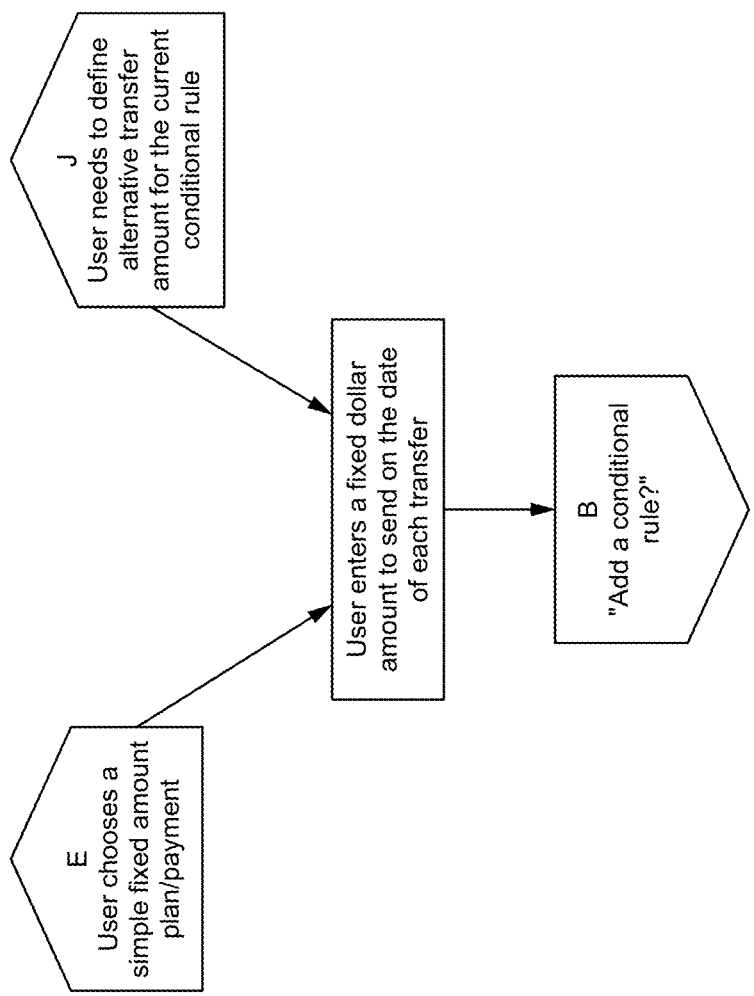
Figure 4E:
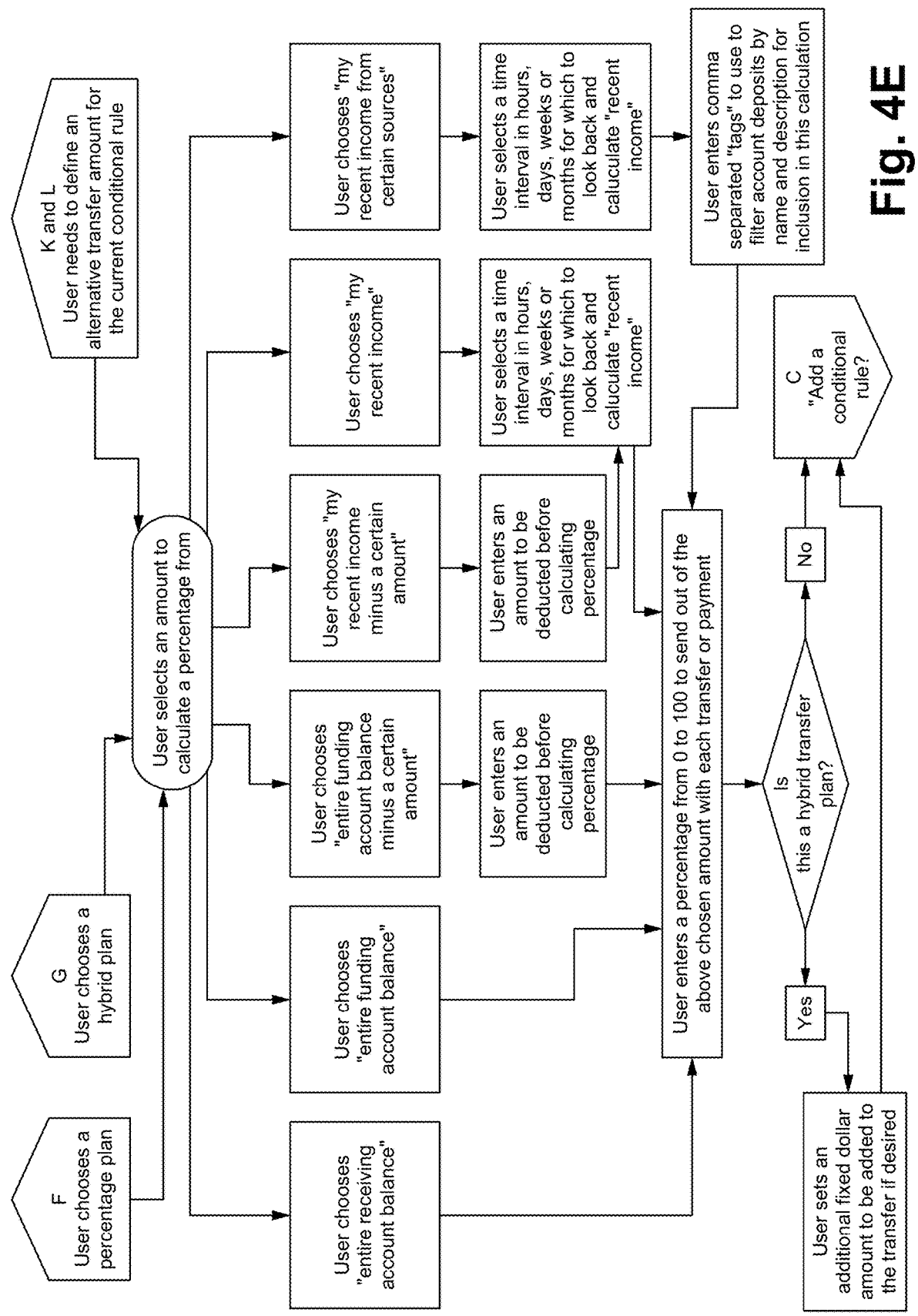
Figure 4F:
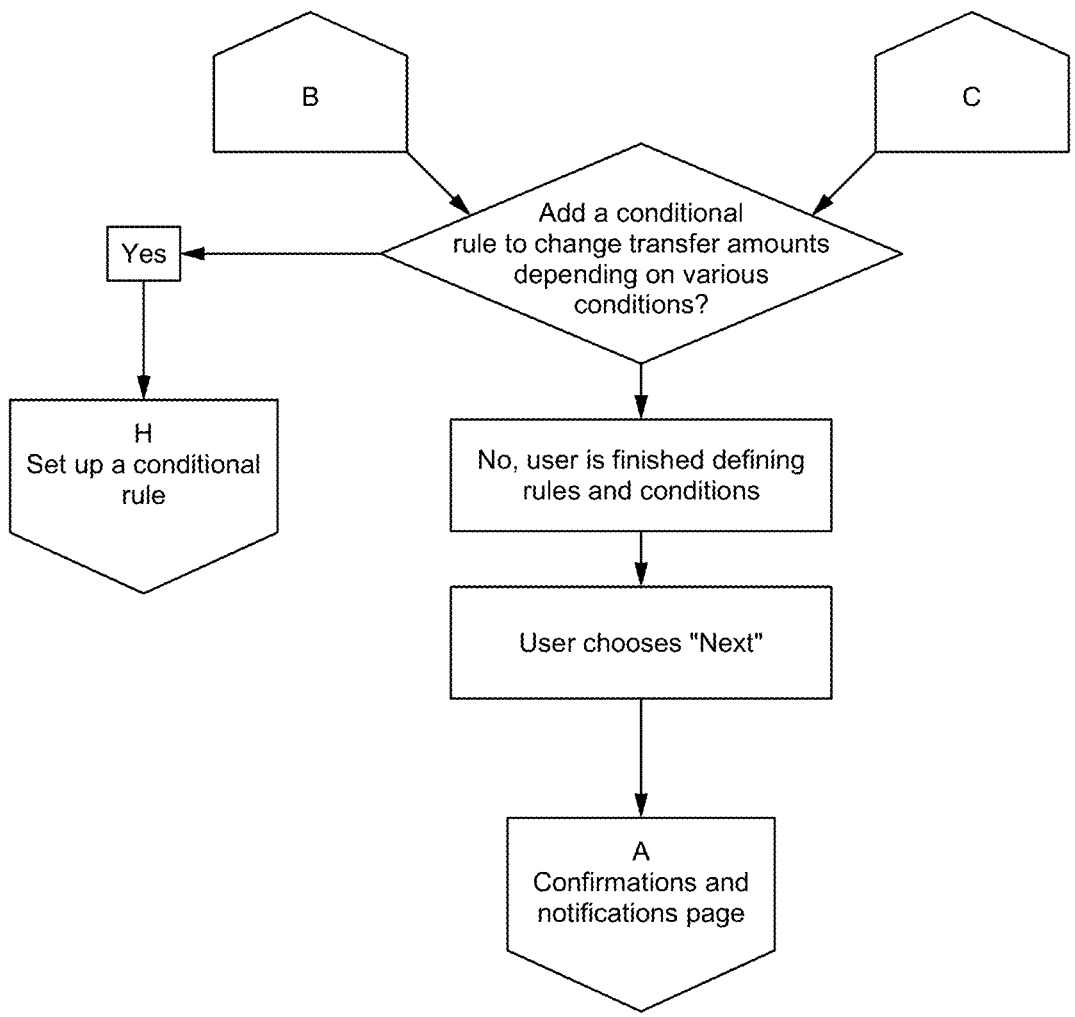
Figure 4G:
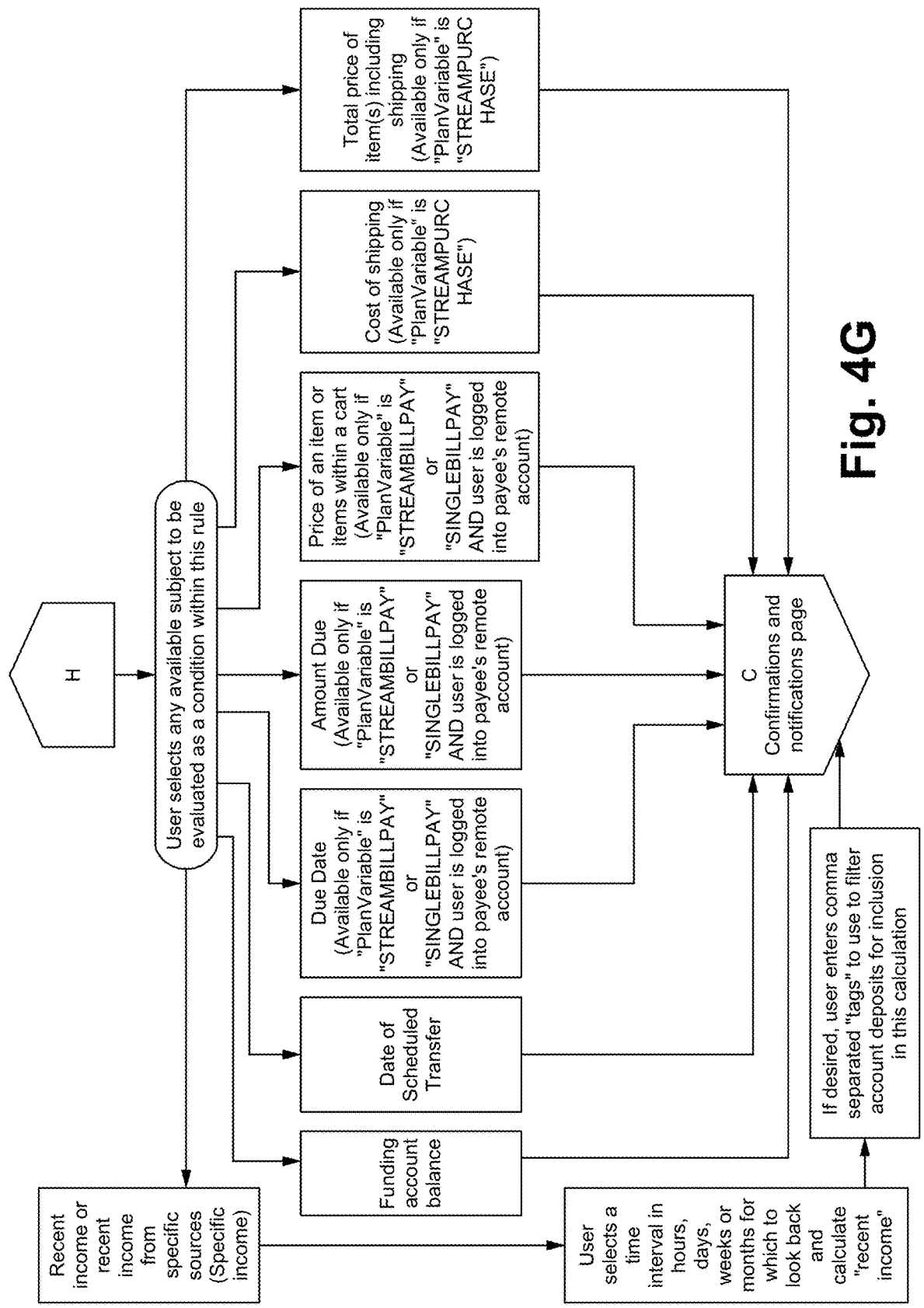
Figure 4H:
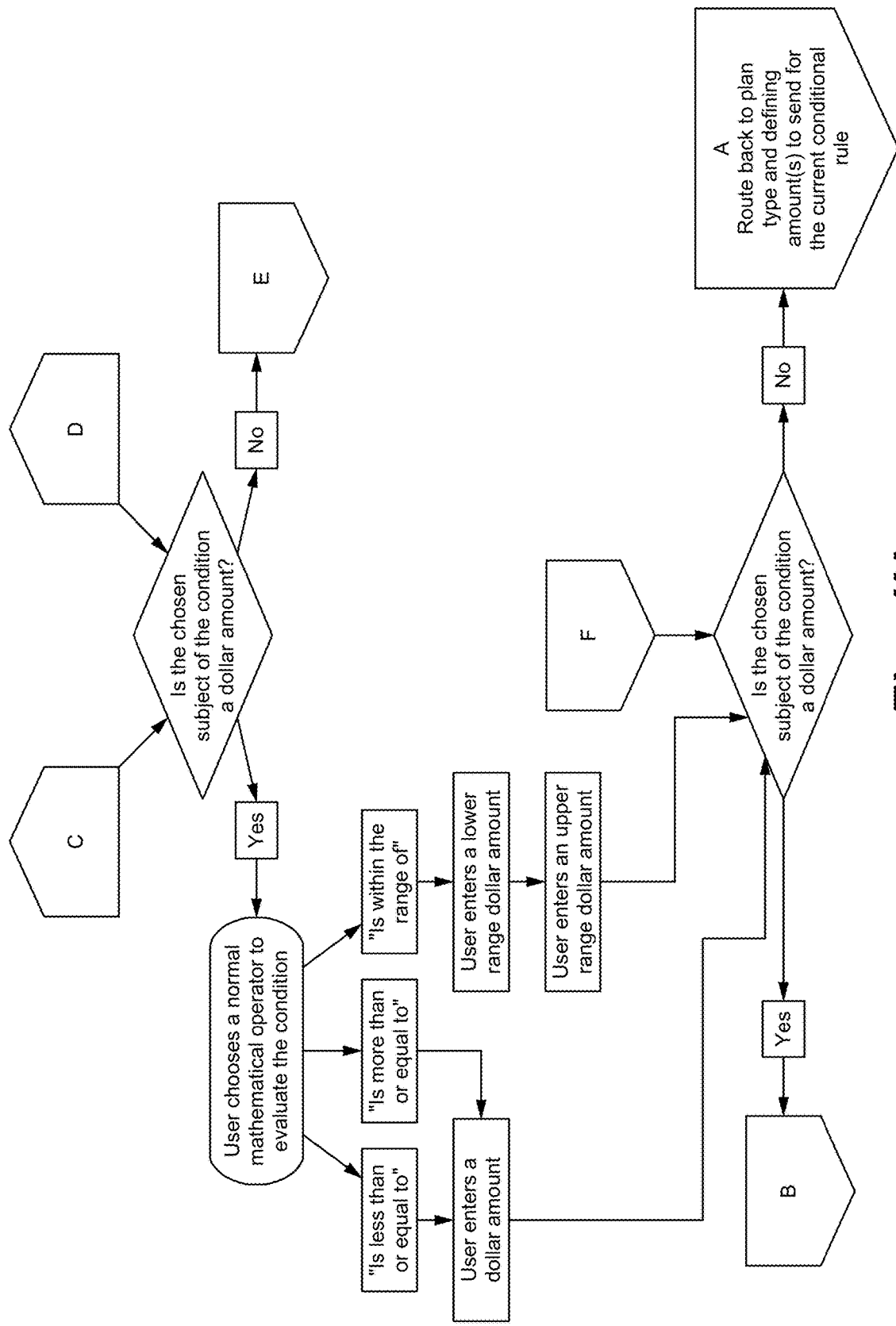
Figure 4I:
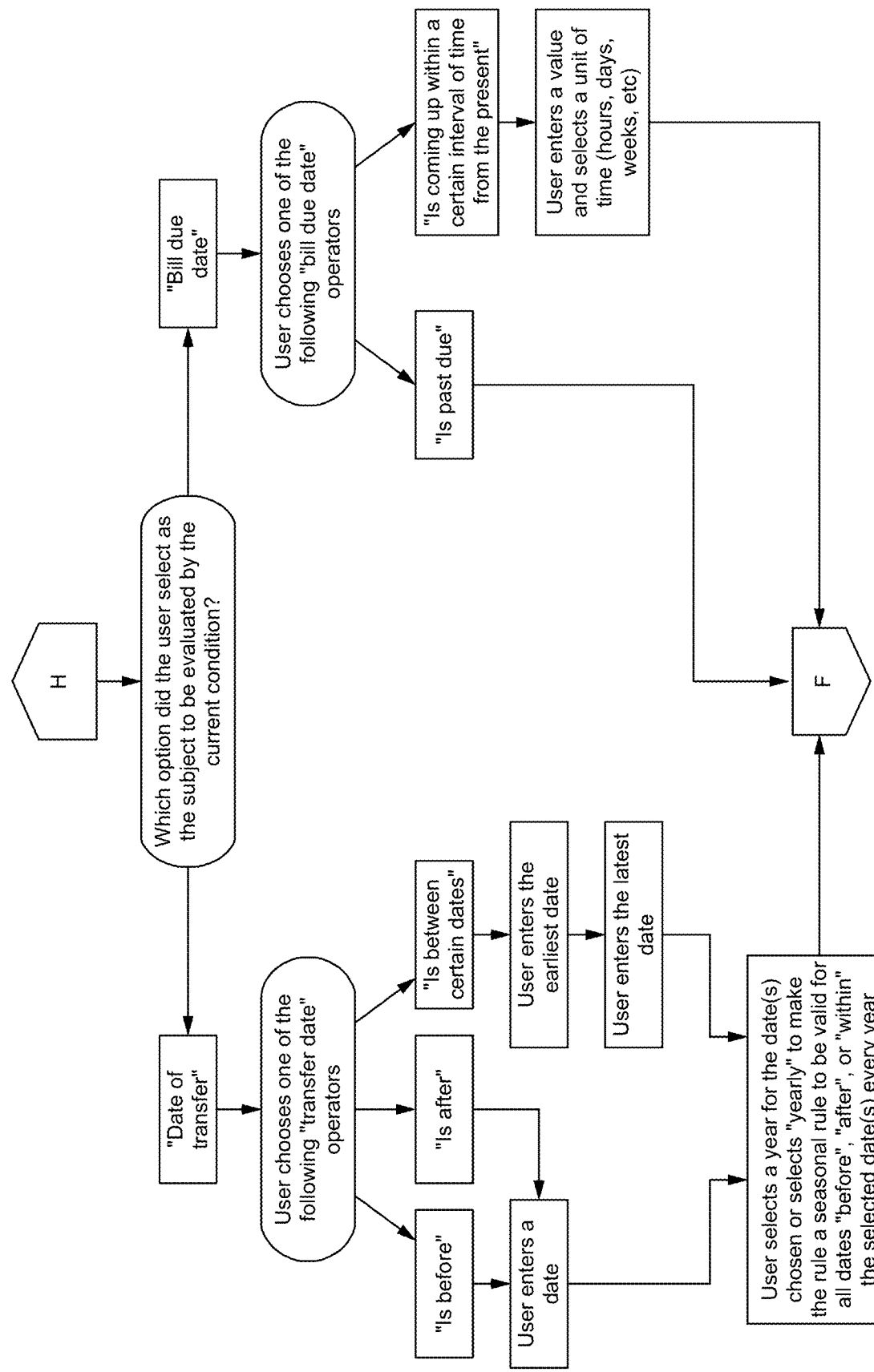
Figure 4J:
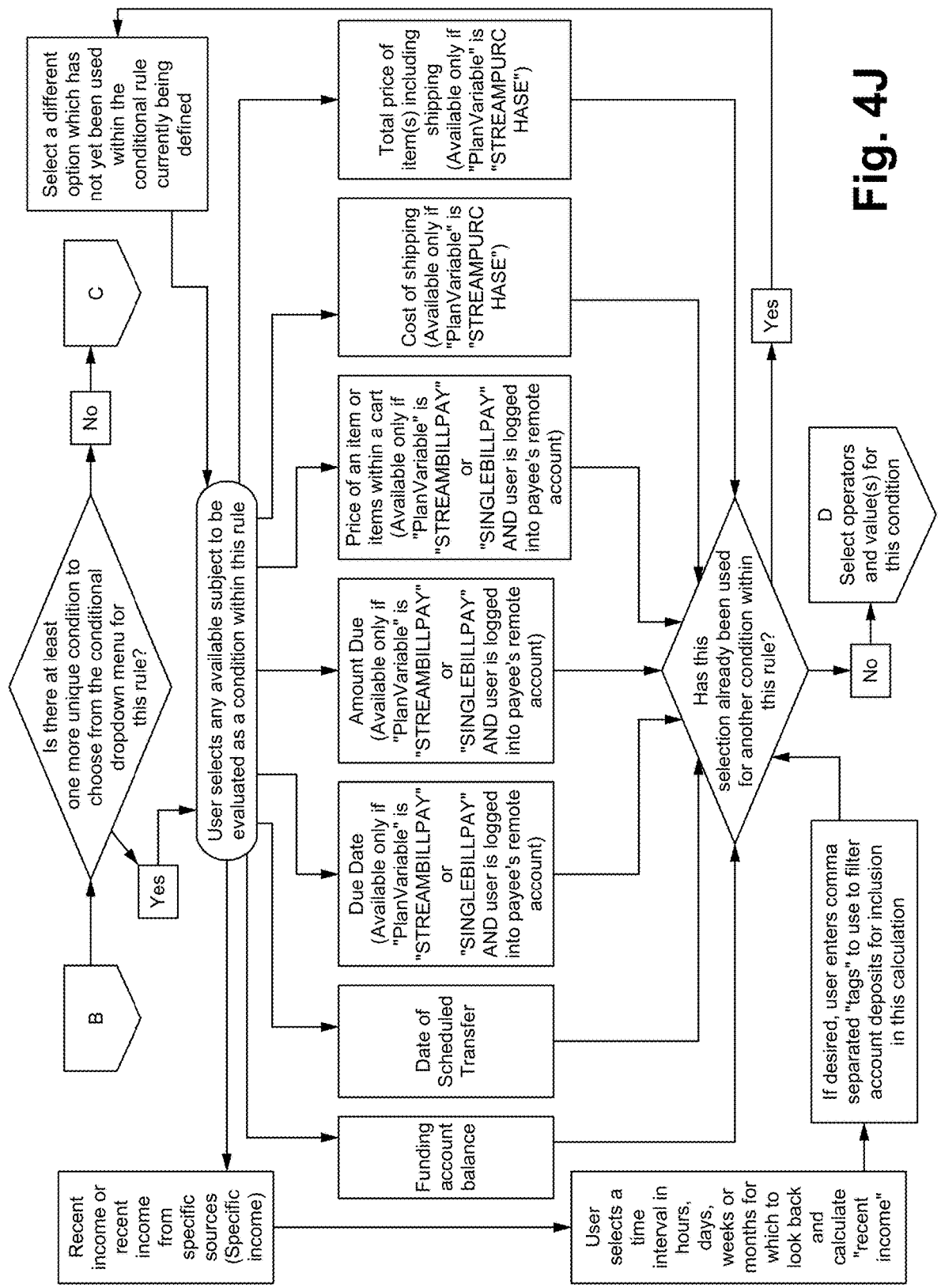
Figure 4K:
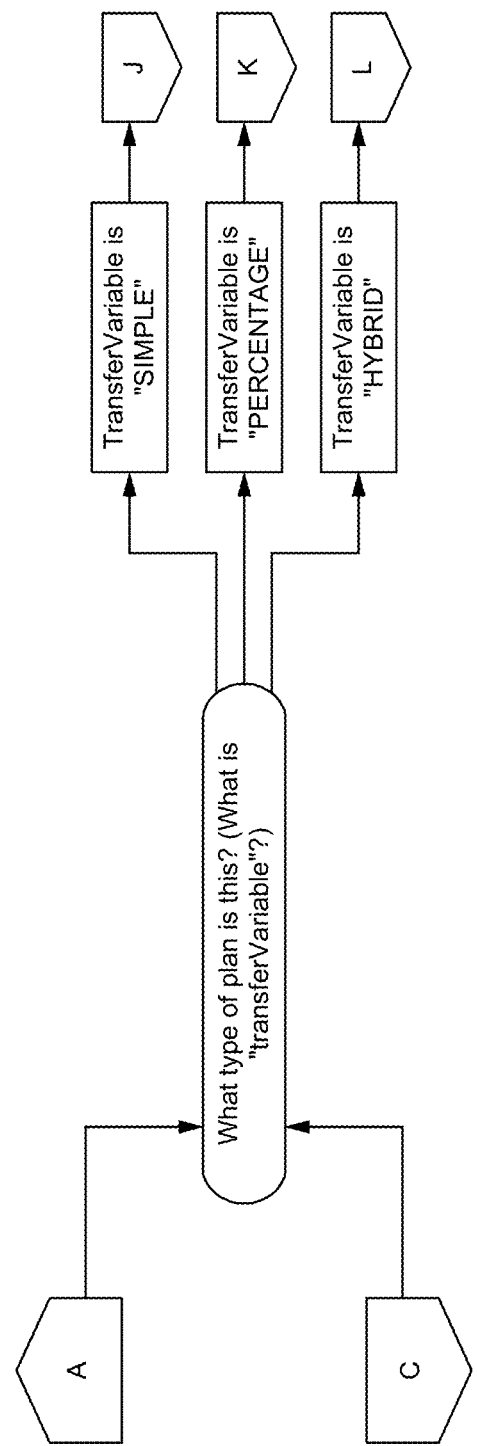
Figure 4L:
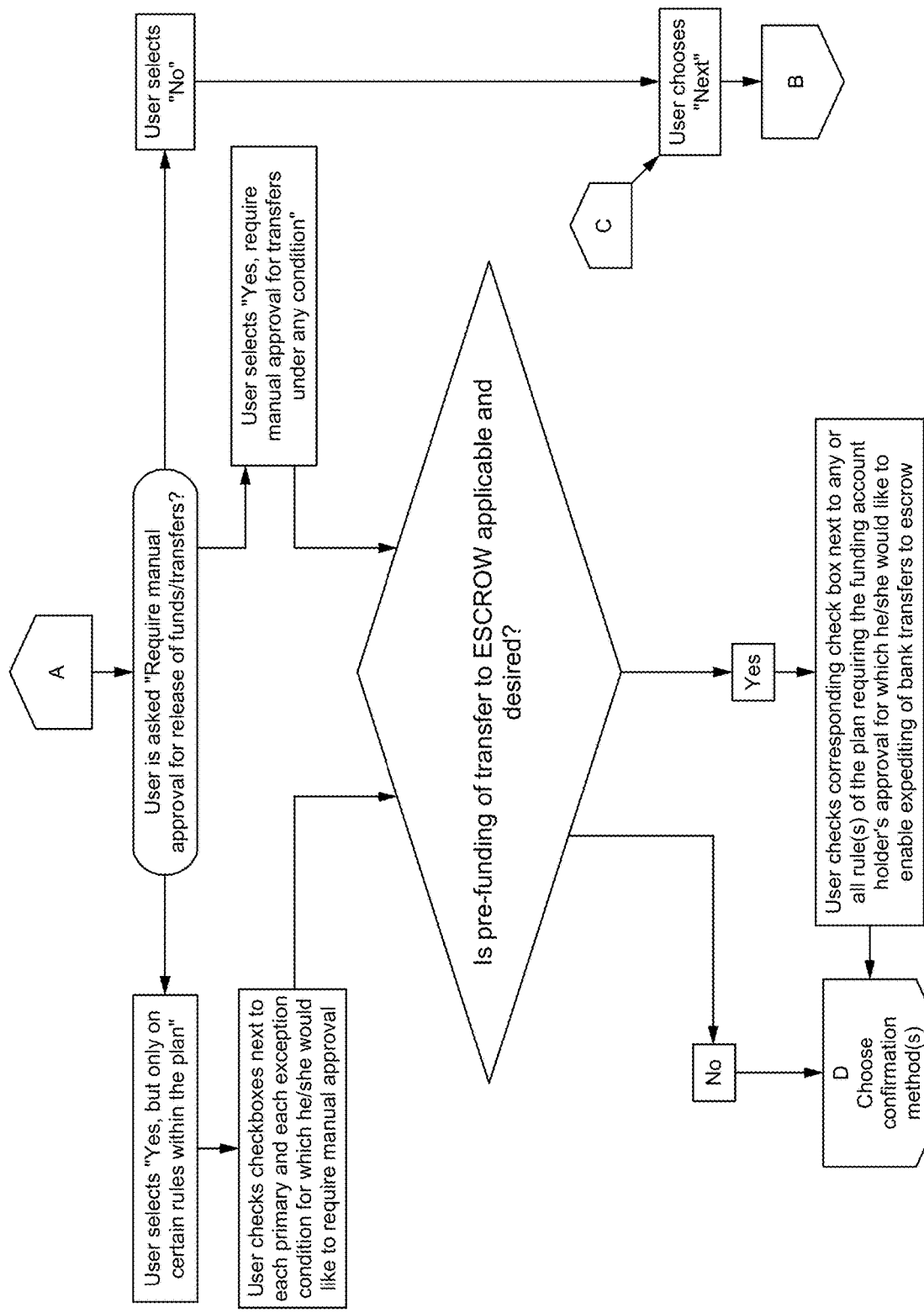
Figure 4M:
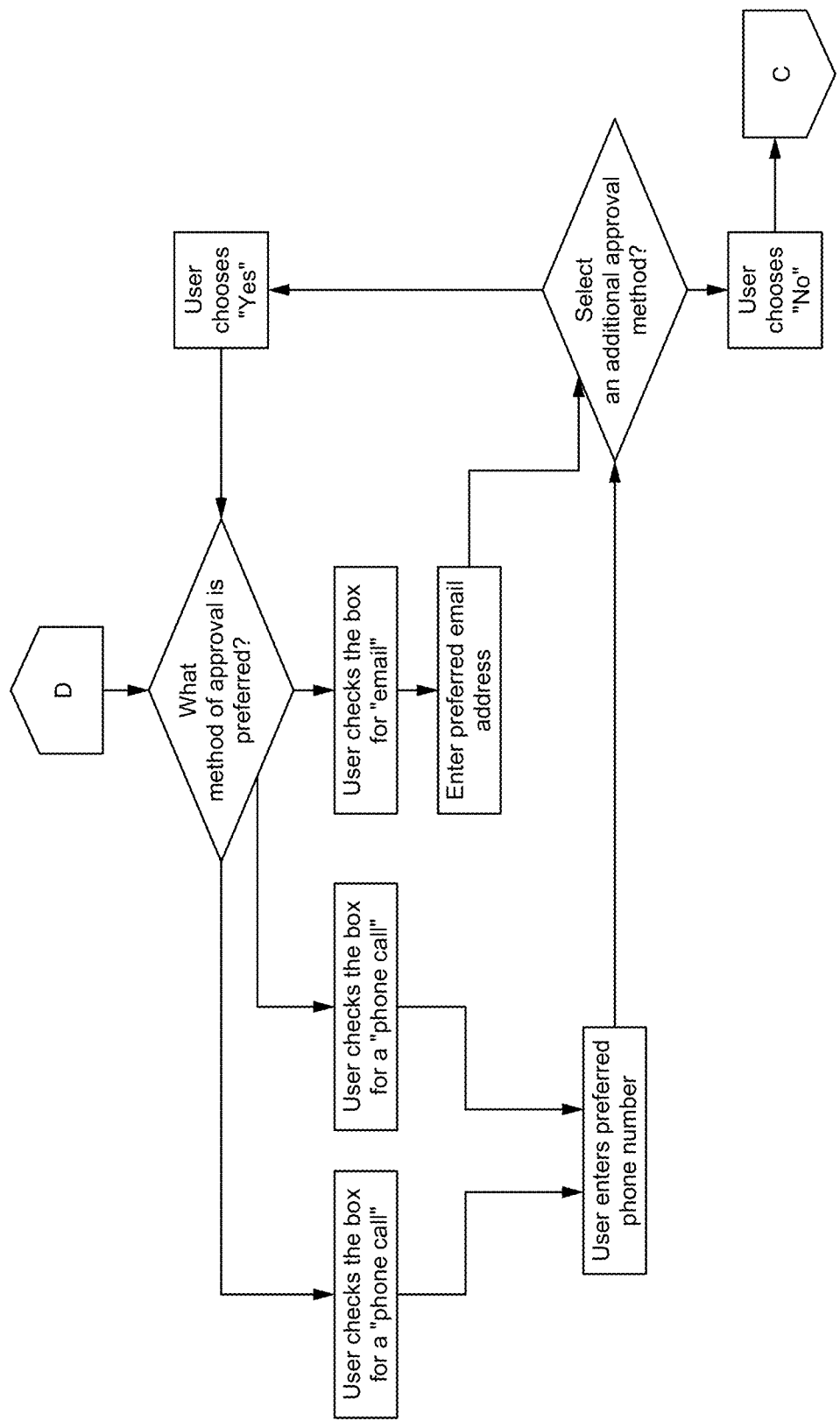
Figure 4N:
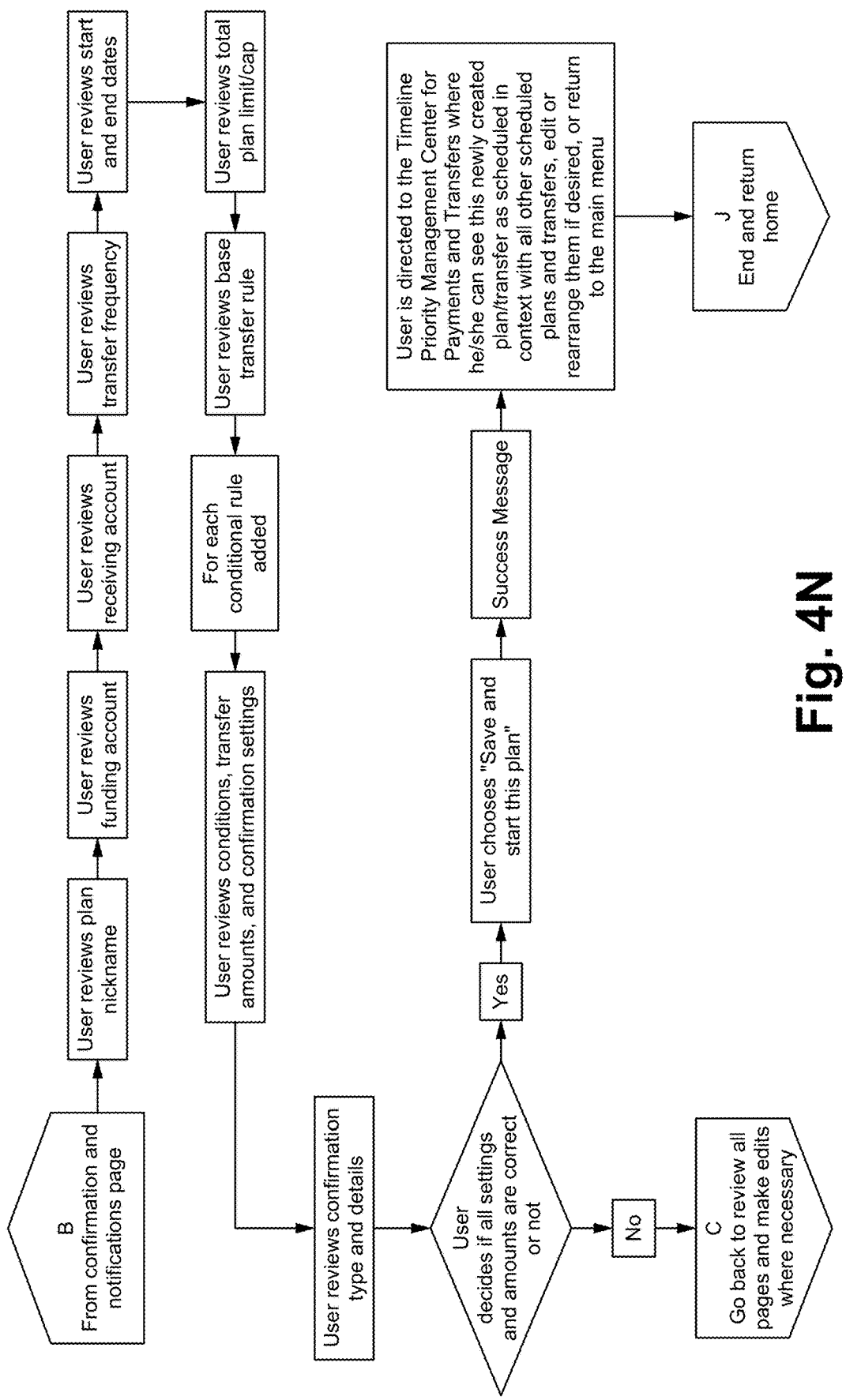
Figure 9C:
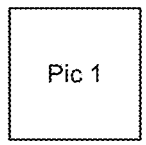

FIGS. 4A to 4N illustrate an exemplary flow chart 400 of implementing the AFM product according to some embodiments. Additionally, for each path (AA-II) through the flow chart 400, FIGS. 5-13 illustrate exemplary screenshots or images of a user interface of the AFM product implementing the flow chart 400. For example, FIGS. 5A-5N correspond to path AA, FIGS. 6A-6Q correspond to path BB and so on such that FIGS. 13A-13E correspond to path II. Alternatively, one or more screens or images of the user interface are able to be omitted and/or changed while retaining the same functionality of the AFM product.

As shown in FIGS. 4A to 4N, once a user has registered and logged in from his/her device 104, he/she arrives at the main menu of the AFM product. From here the user is able to select from various options (e.g. paths AA-II). For example, the main menu options are able to be: create a rule for saving; create a rule to pay another user; create a rule to be paid by another user; create a rule to pay a bill (e.g. recurring); create a rule to save for and automatically purchase an item/service; create a rule to split funds or income into multiple accounts (e.g. creating a combined account); create a one-time payment rule between accounts; create a one-time bill payment rule; and create a money request for an incoming payment proposal from another user. Alternatively, more or less options are able to be provided. Each of the rules are able to be a part of one or more plans associated with a user such that each plan is able to comprise one or more of the rules created by the user. Additionally, one or more of the paths or steps through one or more paths shown in FIGS. 4A-4N are able to be omitted. For example, in some embodiments escrow options are able to be omitted, wherein the paths skip any escrow related steps/options.

Paths AA, BB and CC

The streaming savings and payment plans (AA, BB and CC) are mostly functionally the same except that they each have differently worded user prompts and different account options depending on where the involved money is coming from and going to. For example, a savings plan assumes funding would come from and go to one's own accounts and would not include options to enter another user's account information. Just as one can set up a plan to pay another user, it is also possible for a user to set up a plan to be paid. If setting up a plan to be paid by another party, the user would simply set the other user's username as the funding account (source account). If setting up a plan to pay another user, that payee's username would instead be set as the receiving account (destination account). Users begin by setting up funding and receiving account options, scheduling options, and transfer types and amounts. Users then have the opportunity to create conditional rules to determine how money will flow in various custom defined circumstances. In some embodiments, all participants must have an account and a username to use this service. For example, if a user is setting up a plan which involves another party who does not yet have an account, that party is able to receive an invitation and must sign up in order to accept or create any transfers or payments. Alternatively, one or more participants are able to not have accounts and instead have their account information input and/or setup one-time guest accounts with necessary information.

The process for setting up a streaming transfer plan (for savings or payment) as provided by the AFM system/product is able to begin with a user selecting a funding account (money will be withdrawn from this account), a receiving account (money will be deposited into this account), a frequency or trigger event for payments ((such as once per month or once every 10 days (e.g. time/schedule based trigger); or when a deposit is cleared into a selected account (e.g. event based); or when a particular type of deposit is cleared into a selected account (e.g. direct deposit, cash or an electronic money transfer)), a start date (date of the first payment or time when the monitoring for triggers begins) and an end date (date the plan will pause or finish). Alternatively, the user is able to opt not to enter an end date if he/she wishes the plan to continue until either he/she stops it or until the goal of the plan has been reached. The user is then able to enter the maximum amount to be saved or paid. In particular, this field is useful for defining a finite saving goal or setting up a payment plan with a finite amount owed. If a streaming transfer plan is created to pay back a $2000 loan, for example, the user is able to enter "$2000" as the maximum amount to be paid and the plan will automatically terminate when that amount has been paid in full. If the user enters "0" or leaves the "maximum amount" field empty, the plan would have no limit and would remain active indefinitely, or until stopped by the user. The AFM also provides the option to enter an annual interest rate on a plan's "remaining amount." Interest would be calculated and added periodically as determined by the user.

The user is also able to set up a "base transfer" type and amount. The base transfer is defined as the basic, default amount that is sent with each transfer as long as the plan is active and no conditional rules (exceptions) or settings intervene. The base transfer is able to be the primary, default transfer directive for the plan. The user is able to first select a transfer type to be used throughout all parts of the plan before entering the base transfer amount, wherein the transfer types are fixed amount, percentage or hybrid (fixed and percentage). The fixed amount transfers are a simple fixed dollar amount would be sent on each transfer date or trigger event, wherein the user is able to enter a fixed dollar amount. The percentage transfers are a percentage of the funding account income or account balance that would be sent on each transfer date or trigger event, wherein the user is able to select a variable from which to calculate a percentage, for example, the entire funding account balance, the entire funding account balance minus a certain dollar amount, the recent income, the recent income minus a certain dollar amount, the recent income from certain sources (e.g. checks, cash, bank transfers, electronic transfers), the recent income from certain sources minus a certain dollar amount or combinations thereof. The user is able to enter the percentage amount and/or an amount to subtract before calculating a percentage and/or the user is able to define an amount of time (e.g. week, month) to go back and calculate "recent income." Further, the user is able to specify which sources of income should be included (e.g. checks, auto deposits, cash, electronic transfers). In some embodiments, the user is able to enter multiple separated "tags" to use to search for certain funding account deposit sources to mark these deposits/sources for inclusion or exclusion in this income calculation. The percentage amount is able to be dynamically calculated by the AFM product on the date or trigger of each transfer to determine the amount. For example, if the rule is triggered by the clearing of a deposit into a selected account, the percentage amount is able to be calculated and transferred upon the triggering event (i.e. the clearing of the deposit into the selected account).

The hybrid transfers are a percentage plus fixed amount that allows a user to send a fixed dollar amount in addition to a percentage amount on each transfer date or trigger event. If hybrid transfers is selected the user is able to enter the fixed amount, the percentage and what the percentage is based on as described above. In this way, the user creates a base condition based on which the amount of money is transferred. In some embodiments, user approval is required before one or more trigger and/or date based transfers are executed.

The user is then able to optionally set up an additional condition that act as an exception or addition to the base condition. Indeed, this process is able to be substantially similar to setting up the base condition, except the action (e.g. transferring money between the selected accounts) is the same and thus does not need to be re-selected. Instead, for the new condition the trigger or condition type, how the trigger value is to be valued (e.g. trigger evaluation metric or equation) and the amount of money to transfer (e.g. fixed, percentage hybrid) needs to be selected. For example, the user is able to specify an exception to a rule that overrides the rules during selected dates, selected account/source balances and/or upon specified trigger events and performs a different action (e.g. transfers a different amount, from a different source and/or to a different destination) or non-action (e.g. performs nothing). In some embodiments, the user will only have to define a new range to evaluate either account balance, income within a certain period of time, or amount of the currently evaluated deposit and/or a date range condition (or any combination of these conditions) and an alternative amount of money to send whether it is a fixed amount a percentage of one of the above variables, or a combination of both.

An example of a rule/plan having both a base condition and an additional condition is: "Starting today at noon send $500 once a week to my savings account (base condition) unless on that day I have a balance of more than $5000 in my account, in which case send $750 instead (additional condition)." To set up a rule like this, after setting up the base condition the user is able to choose "Add a conditional rule" or in some embodiments, choose from the options "pay more when . . . ," "pay less when . . . ," and "pay nothing when . . . " to reveal expanded options to define specific range requirements for an exception to the rule (e.g. including an alternative amount to transfer). In some embodiments, the user is able to select a condition type and then select from a drop-down menu of relevant conditional operators 8. The condition types are able to include (but are not limited to): (1) Funding account balance, (2) Receiving account balance, (3) Recent funding account income (interval to be entered by user), (4) Recent receiving account income (this option available only if access to this data is granted by the receiving account holder), (5) Recent funding account income from certain sources, (6) Recent receiving account income from certain sources, and (7) Date of scheduled transfer, and (8) amount of this/current deposit.

In some embodiments, for (2), (4), and (6), receiving account options are only available if access to this data is granted by the receiving account holder. In some embodiments, for (3), (4), (5), and (6), the user is able to next define an amount of time to go back and calculate "recent income." In some embodiments, for (5), (6) and (8), to specify which income should be included, the user is able to enter multiple separated "tags" to use to search for certain funding account deposits and/or deposit types to mark for inclusion or exclusion in this income calculation). For monetary values the conditional operators are able to include (but are not limited to): (1) is less than, (2) is less than or equal to, (3) is more than, (4) is more than or equal to, (5) is between or equal to and (6) is equal to, for monetary values. For dates of scheduled transfers the conditional operators are able to include (but are not limited to): (1) is before, (2) is on or before, (3) is after, (4) is on or after, (5) is on or between and (6) is on. Thus, the user is able to enter any relevant value(s), dollar amount(s), or date(s) to finish defining the additional condition. In some embodiments, by optionally selecting to "add another condition" and then repeating this process, the user is able to add as many or as few conditions to the rule as desired. When all the conditions have been created the user is able to choose "Next" to reach the confirmation/notification page.

At the confirmation and/or notification page, the user is able to require the funding account holder to give his/her manual confirmation before the release of funds for all or any individual parts of the transfer plan. This feature is for the benefit of the payer to maintain one more level of control on outgoing moneys. Specifically, the user is able to first select a confirmation preference as confirmation always required, sometimes required or never required. In "always required" the payer is able to notified by a text message, email, phone call or other medium when the system 100 tries to make a transfer under any condition. In this case, no money is able to moved by this plan without the payer's confirmation. In order to setup this, if the user is the payer, the user is able to then select his/her preferred confirmation method (text, email, phone) and corresponding details, or if the user is the payee, the user is able to instead enter his/her preferred notification method and corresponding details to for updates whenever he/she receives a cleared transfer. In "sometimes required" a user is able to require confirmation on only certain parts of the plan, in which case he/she is able to select check boxes next to these individual parts to require confirmation on them. In some embodiments, the user is given the option to "require approval on transfer amounts greater than . . . " and upon entering a maximum amount for automated transfers, is able to ensure that all transfers over a certain threshold amount will require approval, otherwise they would go out automatically. In order to setup this option, if the user is the payer, the user is able to then select his/her preferred confirmation method (text, email, phone) and corresponding details, and if the user is the payee, the user is able to instead enter his/her preferred notification method and corresponding details to for updates whenever he/she receives a cleared transfer. Finally, in "never required" if the user doesn't want to enable confirmation on any parts of the plan he/she selects "No confirmation required. Send all transfers automatically as scheduled" and no confirmations are sent or required for the transfer to take place.

The user is then presented with the plan/rule review page. From the review page the user is able to see all details in one place as entered on the previous pages. Additionally, the user is able to go back to edit the details, cancel the plan, or save and submit the plan. When a user submits a plan in some embodiments, the plan is then passed to one or more other users (e.g. the users associated with the other accounts) for approval or further editing. For example, this is able to be the case if a user submits a newly created or newly edited existing plan with "payee editing allowed." Alternatively, the plan is able to be saved and immediately activated if the payer has disabled "payee editing" and submits a plan, the plan involves no other parties, as in a savings plan, or the user approves a plan received from another user "as is" and resubmits it without making any changes. In some embodiments, when payee editing is allowed, a plan is able to only be activated when all parties have approved it. Also, when this mutual editing is allowed, a dated history of changes is able to be emailed to both parties and available online as new edits are submitted. This allows all users to easily see what details are being negotiated. If any user edits any detail on an active plan with payee editing allowed, the plan is able to be paused until both parties approve of the changes.

After submitting a plan, if the user is a payee, he/she will see a success message and go directly back to the main menu. Otherwise, if it is a savings plan or if it is a payment plan and the user is the payer, he/she will see a success message. In some embodiments, the user is then routed to a Timeline Priority Management Center for Payments and Transfers page to see the newly submitted plan in a timeline context with all other scheduled plans and payments. This page allows users to quickly reschedule transfers and plans to change the sequence or priority in which they will be executed. Specifically, the user is able to hover over any payment or transfer plan to see it's "projected transfer amount" according to his/her current financial snapshot and the evaluation of the conditions, settings, and transfer amounts of all active plans preceding it in the timeline. Changing the sequence by rescheduling plans and payments is able to drastically change projected transfer amounts throughout the timeline so this page is very helpful in providing contextual insight into how these events will interact. From the Timeline Priority Management Center for Payments and Transfers page the user is able to either expand and edit plans and payments or return to the main menu Finally, when a user receives a newly created or edited existing plan proposal from another user who wants to pay or be paid, he/she will first login, registering if necessary. Once the user is able to access the proposed plan, he/she are able to have the opportunity to review the plan from the beginning, going through all the pages as if he/she were setting it up for the first time except that all fields will already have values as last input or changed. The only major difference in the process between users is that only the owner of the funding account is able to edit the manual confirmation contact details, and only the payee will have the option to set payee notification preferences. As long as the payee has permission, both the payer and payee are able to edit which parts of the plan will require manual confirmation to release transfers. In some embodiments, where payee editing is not allowed, the payee simply sets his or her own preferences for receiving funds and notifications of payments, and is able to give the incoming payment plan a nickname.

Path DD

The automatic bill pay plan enables a customized auto bill pay feature where bill pay is able to be stopped and/or altered based on characteristics of the bill, account balances and/or other factors. For example, instead of a standard auto bill pay where an amount is deducted automatically, the user is able to setup a condition that stops payment if the billed amount is wrong or out of the ordinary (e.g. over a threshold amount or different than an expected amount) and/or if the funding account balance is insufficient (or below a threshold amount) thereby ensuring the user is not unwittingly overcharged by the auto-pay and/or pays despite there being insufficient funds in the account (according to the user's definition of "insufficient funds"). In some embodiments, the first time a user selects to setup a Bill Pay rule he/she are able to setup his/her own preferred name, phone number, and the address payees will see when receiving payments. Further, the user is able enter a nickname for the plan, select a funding account from which the payment is to be debited, select a payee type (company or individual), and enter payee information. Specifically, the user is able to enter the payee's name, wherein names of any previous recipients or recognized corporations matching the user's entry are able to appear in a selectable drop-down menu as the user types. If the user selects a previous recipient or recognized corporation from the known recipient list, all address and contact data on record for that recipient will be pre-populated into the fields below. If the system does not recognize the user's payee entry, the payee name field is able to remain as manually entered and no other fields are pre-populated. If the payee is not a previous or registered recipient, the user is able to enter the payee's address, city, state, zip code, and an account number if applicable.

If the payee is a registered partner company with a cooperating API to allow secure data exchange from its server, the user is able to be asked for his/her login and password information to access the remote account. This will allow the AFM system to retrieve live data on amounts owed and bill due dates. If the user is able to link to his/her remote account on the partner company's server and retrieve billing information, the user is then be able to set up automatic bill payments according to actual payment due dates and amounts owed. As a result, the user is able to use live bill pay for the current bill only by choosing "Automatically pay the amount owed" and then selecting "Pay now," "Pay when the bill is due," or "Pay on a certain date." The user is then able to select a date to pay the bill. If the user would like to use live recurring bill pay, they are able to choose "Pay these bills automatically." The user is then able to enter a start date, an end date if desired, and an interval (such as once a week, or once a month) for future payments. In some embodiments, the user is also able to choose "Pay whenever a new amount is due" instead of manually defining a start date and interval. Additionally, whether or not a user is able to retrieve live billing data, the user is able to have the option of "Schedule or send a single fixed amount payment now," wherein the user is able to enter a payment amount and date and choose "Send one time payment," and the option of "Set up recurring payments of fixed amounts," wherein the user is able to enter a payment amount and set a start date, an end date if desired, and an interval (such as once a week, or once a month) for future payments. If a user is linked to his/her remote account and live bill due dates are available, he/she are able to choose "Pay when a new bill is due" instead of manually defining a start date and interval.

After the default or base payment condition is defined, like in paths AA, BB and CC, the user has the option to add one or more additional conditions in the same manner as in paths AA, BB and CC. In this case, the Bill pay plan condition types include but are not limited to: (i) Funding account balance, (ii) Recent Income (iii) Recent income from certain sources (iv) Date of scheduled transfer, (v) Amount due, (vi) Bill due date and (vii) Current deposit amount. In some embodiments, for options (ii) and (iii) above, the user is able to next define an amount of time to go back and calculate "recent income." In some embodiments, like above, for (iii) the user is able to specify which income should be included by entering multiple separated "tags" to use to search for certain funding account deposits to mark for inclusion in this income calculation). In some embodiments, options (v) and (vi) are available only if the user has successfully connected his/her account to a partner company's cooperating API). Conditional operators for the options above may include but are not limited to (for all dollar amounts) (i) is less than, (ii) is less than or equal to, (iii) is more than, (iv) is more than or equal to, (v) is between or equal to, (for dates of scheduled transfers) (i) is before, (ii) is on or before, (iii) is after, (iv) is on or after, (v) is on or between, (vi) is on, and (for bill due date) (i) is past due, and (ii) is coming up within a certain interval (user enters an interval). The user is then able to enter a dollar amount, or two amounts in the case of defining a range, along with a new action to take for each of the new conditions. For example, the new actions are able to be one or more of, Pay bill automatically, Pay a fixed amount (where the user enters the fixed amount to pay) and Do not pay. When the user is finished setting up the conditions they are able to select "Next" to reach the review/edit page.

At the review/edit page the user is able to review all details of the single bill payment rule or bill payment rule and either return to the previous pages to edit/change details, cancel the bill payment plan entirely, if sending a one-time payment choose "Approve and send payment now," (wherein the user is able to then receive a success message and return to the main menu) or if sending a recurring fixed or automatic payment choose "Approve and start payments," (wherein the user is able to be then taken to the Timeline Priority Management Center for Payments and Transfers page to see the newly submitted plan in a timeline context with all other scheduled plans and payments). In particular, like above, this page allows users to quickly reschedule transfers and plans to change the sequence or priority in which they are executed. Again, the user is able to hover over any payment or transfer plan to see it's "projected transfer amount" according to his/her current financial snapshot and the evaluation of the conditions, settings, and transfer amounts of all active plans preceding it in the timeline. From the Timeline Priority Management Center for Payments and Transfers page the user can either expand and edit plans and payments or return to the main menu.

Path EE

The automatic save and purchase plan enables a user to not only set up an automatic savings rule/plan, but also to automatically monitor the price of a desired item/service and purchase the item/service when the amount saved equals the current price. In other words, the save and purchase plan of path EE is like a dynamic layaway plan. Once partner e-stores (e.g. websites) integrate with the AFM system 100, the system is able to provide "Create a Save & Purchase Plan for this item/cart" buttons or other features that are available to users when interacting with the e-store website as a selectable option for creating a save and purchase plan for one or more items/services (e.g. one or more items in a virtual shopping cart) on the website. Specifically, the AFM system 100 is able to access needed price data, shipping date, payment data, returns data and/or other data necessary for automatically monitoring the price (and/or including shipping costs, fees or other costs) and subsequently purchasing the desired items. First a user is able to access the website of an e-store including the AFM purchase feature and select one or more items and/or services to purchase from the website. Then the user is able to select the "Create a Save & Purchase Plan for this item/cart" buttons or link on the website, which enables the user to enter the purchasing and/or shipping information (e.g. shipping address, shipping method). Alternatively, the purchasing information is able to be omitted. The user is then able to confirm the total price of one or more of the selected items (e.g. the contents of the virtual shopping cart) including shipping and the shipping address. Upon confirmation, the user is presented with a link or button that directs the user to the AFM product for setting up an purchase/save rule for the selected items/services.

The user is able to be directed to the system login or to create a new account. If the user has not registered yet, the order information accessed by the AFM product from the partner e-store is able to be temporarily saved in association with the user's new account so that they are able to continue once they have both registered and logged in. Alternatively, if the user is already registered, the order information is able to be temporarily saved until the user is logged in so that they are able to continue. Once logged in, the user is able to confirm that they would like to start a save and purchase plan for the selected items/services, wherein the items/services, the prices, shipping data (e.g. method, address, cost) are presented to the user for review before the confirmation. At this point, the user chooses a funding account and is able to enter a name for a virtual savings bin that is created by the AFM product for starting the plan. The savings bin tracks money in a user's account separate from all other funds (e.g. keeps in a separate virtual bin). Thus, even if the money is co-mingled with other money in one or more accounts, the AFM product is able to track how much of the money is "within" the virtual savings bin. In some embodiments, each Save & Purchase plan automatically generates it's own dedicated savings bin which is deleted at the time of purchase. Alternatively, the savings bin is able to be omitted. Any remaining funds in a savings bin associated with a completed Save & Purchase plan are able to be moved into the user's main system account balance by default unless otherwise specified by the user.

The user is then able to set up the savings rule for the purchase and/or the savings bin.

This process is able to be substantially similar to the saving plan path AA, except that the action is not merely the transfer of money into a savings account, but rather transfer of the money as payment for an automatic purchase action upon the condition-trigger pairs of the plan being satisfied. Thus, the user is able to enter a nickname for the plan, a transfer frequency or trigger event (e.g. the clearing of a deposit into a selected account), a start, an end, a transfer type, one or more conditions, and a transfer amount for each of the conditions. The user is then also able to enter a maximum amount that they are willing to pay for the items/services. Specifically, the user is able to enter the maximum amount he/she is willing to save for these items in total. This field is useful for long term plans for which item or shipping prices may fluctuate over time. If an item currently costs $110 with free shipping, the user may enter $115 here just in case the price goes up a little in the future. In this case, the plan will save no more than $115 for this item. If the user enters "0" or leaves the maximum amount field empty, the plan is able to have no limit and is able to remain active indefinitely, until stopped by the user or until the goal of the plan is reached.

Further, the user is able to specify a different action for the additional condition-trigger pair of if the price exceeds the maximum amount specified. For example, the user is able to specify to keep saving until the amount saved reaches the maximum amount, pause the plan and send a notification to the user to either resume the plan, edit the plan or terminate the plan or just cancel the plan (without notification to the user). In the pausing action, the notification to the user is able to present the user with the options of confirming or setting a new maximum amount and then continue saving until that amount is reached; setting a new maximum amount, stopping savings when that amount is reached, notifying the user and asking what action to take next; doing nothing and leaving the plan paused; or canceling the plan. In the canceling the plan action, the user is presented with options of what to do with the money in the virtual savings bin. Specifically, the user is able to choose between leaving it in this plan's savings bin, returning it to the funding account or moving it to the user's online system account balance.

Finally, the user is presented with the option to require his/her manual confirmation before moving funds for all or any individual parts of the save and purchase plan. This selection of a confirmation preference is substantially similar to the confirmation preference selection for path AA. Further, in some embodiments, the user then selects an answer to the question "When your plan has saved enough money to buy this item, purchase it automatically?" Choices include: No, send me a notification and let me decide what to do at that time, Yes, just buy the item and send it to me at the address I provided when I set up the plan, or Yes, but send the item to me at a different address (wherein the user then sets up an alternative address). Accordingly, the user is then able to review the generated rule and/or savings bin at the review page and look at data from the Timeline Priority Management Center for Payments and Transfers page in the same manner as described above for path AA until the process is completed.

Path FF

This path illustrates how to split money from an account or combined account into multiple accounts. The process is substantially similar to setting one of the other types transfer plan/rule, except that this plan simply allows for two or more receiving/destination accounts. In this setup, for each receiving account, a user is able to be prompted to enter base transfer amounts, add conditional rules, and configure confirmation settings in the same manner as described above. In some embodiments, any number of conditional rules is able to be added for each individual receiving account. Plans to split income will include the option to be executed every time a deposit clears in a selected account and enable the user to specify deposit types that are counted for this purpose as described above. In particular, executing transfers at the time the deposits clear provides the benefit of allowing for funds to be distributed before they are able to be spent. Further, manual confirmation is able to be enabled on all or any parts of the multi-account plan. This type of multi-account transfer is able to be used to divide income from businesses with two or more partners, direct income into multiple specific savings accounts, or send allowances to multiple children, for example.

Path GG

This path is for generating a one-time payment/transfer between accounts. Specifically, a user is able to select a funding account and select or enter another user or third party's name as the recipient of the payment. The user then is able to select the payment date (e.g. today, Mar. 3, 2020), a transfer type, a base transfer amount and/or one or more additional conditions similar to the steps of path AA (e.g. streaming savings). In some embodiments, the user is also able to input an option note that is delivered to the payee/recipient with the payment. Next, like the path AA, the user sets the confirmation and/or notification preferences and then reviews the details of the one-time payment at the review page and/or the Timeline Priority Management Center for Payments and Transfers page. At that point, the user is able to confirm the payment and submit it for actual payment on the specified payment date.

Path HH

This path is for generating a one-time bill payment. Setting up one time bill payments is able to be substantially similar to process of setting up recurring bill payments of path DD, except that when scheduling the payment there is no interval or frequency option, but only a choice to either "pay immediately" or set a date in the future to schedule a payment. The first time a user sets up a bill payment he/she will set up his/her own preferred name, phone number, and the address payees will see when receiving payments. Further, the user is able enter a nickname for the plan, select a funding account from which the payment is to be debited, select a payee type (company or individual), and enter payee information. Specifically, the user is able to enter the payee's name, wherein names of any previous recipients or recognized corporations matching the user's entry are able to appear in a selectable drop-down menu as the user types. If the user selects a previous recipient or recognized corporation from the known recipient list, all address and contact data on record for that recipient will be pre-populated into the fields below. If the system does not recognize the user's payee entry, the payee name field is able to remain as manually entered and no other fields are pre-populated. If the payee is not a previous or registered recipient, the user is able to enter the payee's address, city, state, zip code, and an account number if applicable.

If the payee is a registered partner company with a cooperating API to allow secure data exchange from its server, the user is able to be asked for his/her login and password information to access the remote account. This will allow the AFM system to retrieve live data on amounts owed and bill due dates. If the user is able to link to his/her remote account on the partner company's server and retrieve billing information, the user is then be able to set up the payment according to actual payment due dates and amounts owed. As a result, the user is able to use live bill pay for the current bill only by choosing "Automatically pay the amount owed" and then selecting "Pay now," "Pay when the bill is due," or "Pay on a certain date." The user is then able to select a date to pay the bill. Additionally, whether or not a user is able to retrieve live billing data, the user is able to have the option of "Schedule or send a single fixed amount payment now," wherein the user is able to enter a payment amount and date and choose "Send one time payment." After the default or base payment condition is defined, like in paths AA, BB and CC, the user has the option to add one or more additional conditions in the same manner as in paths AA, BB and CC. In this case, the one time Bill pay plan condition types include but are not limited to: (i) Funding account balance, (ii) Recent Income (iii) Recent income from certain sources (iv) Date of scheduled transfer, (v) Amount due, (vi) Bill due date and (vii) Current deposit amount. In some embodiments, for options (ii) and (iii) above, the user is able to next define an amount of time to go back and calculate "recent income." In some embodiments, like above, for (iii) the user is able to specify which income should be included by entering multiple separated "tags" to use to search for certain funding account deposits to mark for inclusion in this income calculation). In some embodiments, options (v) and (vi) are available only if the user has successfully connected his/her account to a partner company's cooperating API). Conditional operators for the options above may include but are not limited to (for all dollar amounts) (i) is less than, (ii) is less than or equal to, (iii) is more than, (iv) is more than or equal to, (v) is between or equal to, (for dates of scheduled transfers) (i) is before, (ii) is on or before, (iii) is after, (iv) is on or after, (v) is on or between, (vi) is on, and (for bill due date) (i) is past due, and (ii) is coming up within a certain interval (user enters an interval). The user is then able to enter a dollar amount, or two amounts in the case of defining a range, along with a new action to take for each of the new conditions. For example, the new actions are able to be one or more of, Pay bill automatically, Pay a fixed amount (where the user enters the fixed amount to pay) and Do not pay. When the user is finished setting up the conditions the are able to select "Next" to reach the review/edit page.

At the review/edit page the user is able to review all details of the single bill payment rule or bill payment rule and either return to the previous pages to edit/change details, cancel the bill payment plan entirely or if sending a one-time payment choose "Approve and send payment now," (wherein the user is able to then receive a success message and return to the main menu). In particular, like above, this page allows users to quickly reschedule transfers and plans to change the sequence or priority in which they are executed. Again, the user is able to hover over any payment or transfer plan to see it's "projected transfer amount" according to his/her current financial snapshot and the evaluation of the conditions, settings, and transfer amounts of all active plans preceding it in the timeline. From the Timeline Priority Management Center for Payments and Transfers page the user can either expand and edit plans and payments or return to the main menu.

Path II

This path is for creating a payment request from another user. Specifically, this path is able to be used by a user who would like to receive payments, but not have to set up all the details of the plan. The user is instead able to: select "Request money from another user" from the main menu; enter the payer's email address or username; optionally select the account into which he/she would like to receive transfers (otherwise it is able to default to a general balance account); optionally provide a nickname for the plan for his/her internal purposes and add a message with a subject line to the payer. The user is then able to review all of the above information, edit any incorrect information and either confirm or cancel the request such that if confirmed it is sent to the payer.

When the payer gets the transfer plan request, they are able to setup all remaining details including dates, intervals, amounts, rules, confirmation settings, as in creating an ordinary payment plan with the exception that some of the fields will be pre-populated with the basic information provided by the payee. When the payer receives a general request from another user who wants to be paid, the payer will first either login, or register if necessary and then login.

Then once the payer is logged in and able to access his/her account, they are able to see a request from the payee and be able to choose "Finish setting up this payment plan." In some embodiments, the payee's preferred receiving account and total amount to be paid will be the only things prepopulated. The rest of the process is able to be substantially the same as the payment plan of path CC (or BB).

Advantages

Thus, the AFM system 100 described herein has numerous advantages. Specifically, the system provides the advantage of allowing users to move money according to various scheduled rules, thus allowing users at large to fully control their moneys, incomes, and payments based on highly customizable rules. Further, the AFM interface provides the advantage of a streamlined process that breaks down each of the features of the product into a few easy steps. Indeed, each of the modules of the AFM product provide unique features such as combined accounts, personalized rule generation, and other features described herein that together provide the advantage of enabling users to setup dynamic financial management rules that adjust to different scenarios in the same way a person would instead of static auto payments. Further, the AFM provides the advantage of the ability to create and maintain active payment and savings plans which operate contingent on the individual's personal financial circumstances. The AFM allows users to create financial management plans that wait until a user's specified conditions exist before executing transfers of funds. It further allows the users to transfer more aggressively when conditions are particularly favorable, for example, paying off debts as soon as possible when there are enough funds to cover basic necessities. The AFM allows users to create unlimited active plans for any imaginable goal, regardless of their employment status or net worth. For example, in a society where many people have multiple jobs and thus a more chaotic finance situation to manage, the AFT enables users to create income tax withholding plans for only certain income streams (i.e. taxable streams that have not already had tax withholding applied or are exempt). This is in particular a major boon to the "gig" economy where there is no automated tax withholding solution that fits to user's bank accounts.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of dynamic financial management of one or more of monetary accounts, the method comprising:
providing a digital financial management product having an income source identifying artificial intelligence and a graphical user interface including an destination account input feature and an source valuation parameter input feature, wherein the destination account input feature enables selection by a user of one or more of the monetary accounts as destination accounts for an account rule and the source valuation parameter input feature enables selection by the user of one or more source valuation parameters and one or more source accounts for the account rule, wherein the source accounts each have a quantity of funds and the source valuation parameters are characteristics of at least a portion the funds within the source accounts;
generating a source rule with the financial management program based on the source valuation parameters and the source accounts that when executed uses the valuation parameters to dynamically determine a size of the portion of the funds within the source accounts having the characteristics; and
with the income source identifying artificial intelligence:
applying a transaction characteristics model to user transactions related to the monetary accounts to identify one or more potential income sources from the user transactions, wherein the transaction characteristics model is based on transaction characteristics selected from a group including transaction source, transaction amount, destination account, transaction type, transaction frequency, transaction time, transaction day and transaction date;
for each of the potential income sources, inputting an indication of whether the potential income source is confirmed as an actual income source;
for each of the potential income sources that were not confirmed, adjusting the transaction characteristics model based on the transaction characteristics of the potential income source that was not confirmed; and
for each of the potential income sources that were confirmed, generating a digital token for the potential income source, associating the digital token with the potential income source and labeling future transactions that are tagged with the token as being from the potential income source.

2. The method of claim 1, wherein generating the source rule comprises the financial management server presenting a list of a plurality of the monetary accounts to the user, the user selecting the one or more of the monetary accounts as the source accounts; and the financial management server automatically generating a query for the source rule that cause the source rule to identify the one or more of the monetary accounts as the source accounts if executed at that time.

3. The method of claim 2, wherein generating the source rule comprises receiving selection by the user of a data set that identifies a subset of the monetary accounts, wherein the source rule uses the query to search the data set upon execution.

4. The method of claim 1, wherein applying the transaction characteristics model includes identifying transaction patterns of transactions of at least one of the monetary accounts that is associated with the user based on the transaction characteristics of the transactions.

5. The method of claim 4, further comprising providing, with the financial management program, an income token prompt message to the user that identifies the at least one of the monetary accounts as a possible income source based on the transaction patterns meeting a pattern criteria.

6. The method of claim 1, wherein the account rule is associated with a rule following function, further comprising providing digital notifications of when the account rule is executed to one or more other users when the other users select the rule following function of the account rule.

7. The method of claim 1, wherein the account rule is associated with a rule cloning function, further comprising when other users select the rule cloning function, automatically generating a duplicate of the account rule for the other users with the financial management program.

8. The method of claim 1, wherein the account rule is associated with a rule contribution function, further comprising when other users select the rule contribution function, automatically generating a contribution rule having the same destination with the financial management program for the other users such that the other users are able to contribute to the account rule.

9. The method of claim 8, wherein at least one of an evaluation trigger and a primary condition of the contribution rule is dependent on at least one of:
an amount of funds in the destination of the account rule;

an execution of the account rule; and
values of an evaluation trigger and a primary condition of the account rule.

10. A dynamic financial management server for the management of one or more of monetary accounts, the server comprising:
a processor; and
a non-transitory computer-readable medium storing a financial management product and communicatively coupled with the servers over one or more networks, wherein the financial management product is operable to:
receive an account rule including account rule data selected by a user via a user interface, the account rule data comprising:
a designation of one of the monetary accounts as a destination account for the account rule; and
a source rule including one or more source valuation parameters, wherein the source valuation parameters are characteristics of at least a portion of funds within a source account, wherein when executed the source rule uses the valuation parameters to dynamically determine a size of the portion of the funds within the source account having the characteristics; and
with an income source identifying artificial intelligence:
apply a transaction characteristics model to user transactions related to the monetary accounts to identify one or more potential income sources from the user transactions, wherein the transaction characteristics model is based on transaction characteristics selected from a group including transaction source, transaction amount, destination account, transaction type, transaction frequency, transaction time, transaction day and transaction date;
for each of the potential income sources, input an indication of whether the potential income source is confirmed as an actual income source;
for each of the potential income sources that were not confirmed, adjust the transaction characteristics model based on the transaction characteristics of the potential income source that was not confirmed; and
for each of the potential income sources that were confirmed, generate a digital token for the potential income source, associate the digital token with the potential income source and label future transactions that are tagged with the token as being from the potential income source.

11. The dynamic financial management server of claim 10, wherein generating the source rule comprises:
presenting a list of a plurality of the monetary accounts to the user, the user selecting the one or more of the monetary accounts as the source accounts; and
automatically generating a query for the source rule that cause the source rule to identify the one or more of the monetary accounts as the source accounts if executed at that time.

12. The dynamic financial management server of claim 11, wherein generating the source rule comprises receiving selection by the user of a data set that identifies a subset of the monetary accounts, wherein the source rule uses the query to search the data set upon execution.

13. The dynamic financial management server of claim 10, wherein applying the transaction characteristics model includes identifying transaction patterns of transactions of at least one of the monetary accounts that is associated with the user based on the transaction characteristics of the transactions.

14. The dynamic financial management server of claim 13, wherein the financial management product is operable to provide an income token prompt message to the user that identifies the at least one of the monetary accounts as a possible income source based on the transaction patterns meeting a pattern criteria.

15. The dynamic financial management server of claim 10, wherein the account rule is associated with a rule following function, wherein the financial management product is operable to provide digital notifications of when the account rule is executed to one or more other users when the other users select the rule following function of the account rule.

16. The dynamic financial management server of claim 10, wherein the account rule is associated with a rule cloning function, wherein the financial management product is operable to, when other users select the rule cloning function, automatically generate a duplicate of the account rule for the other users.

17. The dynamic financial management server of claim 10, wherein the account rule is associated with a rule contribution function, wherein the financial management product is operable to, when other users select the rule contribution function, automatically generate a contribution rule having the same destination for the other users such that the other users are able to contribute to the account rule.

18. The dynamic financial management server of claim 17, wherein at least one of an evaluation trigger and a primary condition of the contribution rule is dependent on at least one of:
an amount of funds in the destination of the account rule;
an execution of the account rule; and
values of an evaluation trigger and a primary condition of the account rule.

19. A dynamic financial management product stored on a non-transitory computer-readable medium for providing dynamic financial management of one or more monetary accounts by performing a method comprising:
receiving, via a user interface of the product, selection by a user of one of the monetary accounts as a destination account for an account rule;
receiving, via a user interface of the product, input by the user of one or more source valuation parameters and one or more source accounts for the account rule, wherein the source accounts each have a quantity of funds and the source valuation parameters are characteristics of at least a portion the funds within the source accounts;
generating a source rule based on the source valuation parameters and the source accounts that when executed uses the valuation parameters to dynamically determine a size of the portion of the funds within the source accounts having the characteristics; and
with an income source identifying artificial intelligence:
applying a transaction characteristics model to user transactions related to the monetary accounts to identify one or more potential income sources from the user transactions, wherein the transaction characteristics model is based on transaction characteristics selected from a group including transaction source, transaction amount, destination account, transaction type, transaction frequency, transaction time, transaction day and transaction date;

for each of the potential income sources, inputting an indication of whether the potential income source is confirmed as an actual income source;

for each of the potential income sources that were not confirmed, adjusting the transaction characteristics model based on the transaction characteristics of the potential income source that was not confirmed; and for each of the potential income sources that were confirmed, generating a digital token for the potential income source, associating the digital token with the potential income source and labeling future transactions that are tagged with the token as being from the potential income source.

20. The dynamic financial management product of claim 19, wherein generating the source rule comprises the financial management server presenting a list of a plurality of the monetary accounts to the user, the user selecting the one or more of the monetary accounts as the source accounts; and the financial management server automatically generating a query for the source rule that cause the source rule to identify the one or more of the monetary accounts as the source accounts if executed at that time.

21. The dynamic financial management product of claim 20, wherein generating the source rule comprises receiving selection by the user of a data set that identifies a subset of the monetary accounts, wherein the source rule uses the query to search the data set upon execution.

22. The dynamic financial management product of claim 19, wherein applying the transaction characteristics model comprises identifying transaction patterns of transactions of at least one of the monetary accounts that is associated with the user based on the transaction characteristics of the transactions.

23. The dynamic financial management product of claim 22, wherein the method comprises providing an income token prompt message to the user that identifies the at least one of the monetary accounts as a possible income source based on the transaction patterns meeting a pattern criteria.

24. The dynamic financial management product of claim 19, wherein the account rule is associated with a rule following function, wherein the method comprises providing digital notifications of when the account rule is executed to one or more other users when the other users select the rule following function of the account rule.

25. The dynamic financial management product of claim 19, wherein the account rule is associated with a rule cloning function, wherein the method comprises when other users select the rule cloning function, automatically generating a duplicate of the account rule for the other users.

26. The dynamic financial management product of claim 19, wherein the account rule is associated with a rule contribution function, wherein the method comprises when other users select the rule contribution function, automatically generating a contribution rule having the same destination for the other users such that the other users are able to contribute to the account rule.

27. The dynamic financial management product of claim 26, wherein at least one of an evaluation trigger and a primary condition of the contribution rule is dependent on at least one of:
an amount of funds in the destination of the account rule;
an execution of the account rule; and
values of an evaluation trigger and a primary condition of the account rule.

28. A financial management device for the management of one or more of monetary accounts, the financial management device comprising:

a processor; and a non-transitory computer-readable medium storing a dynamic financial management product, wherein when executed by the processor the product performs a method comprising:

receiving, via a user interface of the product, selection by a user of one of the monetary accounts as a destination account for an account rule;

receiving, via a user interface of the product, input by the user of one or more source valuation parameters and a source account for the account rule, wherein the source account has a quantity of funds and the source valuation parameters are characteristics of at least a portion the funds within the source account;

generating a source rule based on the source valuation parameters and the source account that when executed uses the valuation parameters to dynamically determine a size of the portion of the funds within the source account having the characteristics; and with an income source identifying artificial intelligence:
applying a transaction characteristics model to user transactions related to the monetary accounts to identify one or more potential income sources from the user transactions, wherein the transaction characteristics model is based on transaction characteristics selected from a group including transaction source, transaction amount, destination account, transaction type, transaction frequency, transaction time, transaction day and transaction date;

for each of the potential income sources, inputting an indication of whether the potential income source is confirmed as an actual income source;

for each of the potential income sources that were not confirmed, adjusting the transaction characteristics model based on the transaction characteristics of the potential income source that was not confirmed; and for each of the potential income sources that were confirmed, generating a digital token for the potential income source, associating the digital token with the potential income source and labeling future transactions that are tagged with the token as being from the potential income source.

29. The financial management device of claim 28, wherein generating the source rule comprises the financial management server presenting a list of a plurality of the monetary accounts to the user, the user selecting the one or more of the monetary accounts as the source accounts; and the financial management server automatically generating a query for the source rule that cause the source rule to identify the one or more of the monetary accounts as the source accounts if executed at that time.

30. The financial management device of claim 29, wherein generating the source rule comprises receiving selection by the user of a data set that identifies a subset of the monetary accounts, wherein the source rule uses the query to search the data set upon execution.

31. The financial management device of claim 28, wherein applying the transaction characteristics model comprises identifying transaction patterns of transactions of at least one of the monetary accounts that is associated with the user based on the transaction characteristics of the transactions.

32. The financial management device of claim 31, wherein the method comprises providing an income token prompt message to the user that identifies the at least one of the monetary accounts as a possible income source based on the transaction patterns meeting a pattern criteria.

33. The financial management device of claim 28, wherein the account rule is associated with a rule following function, wherein the method comprises providing digital notifications of when the account rule is executed to one or more other users when the other users select the rule following function of the account rule.

34. The financial management device of claim 28, wherein the account rule is associated with a rule cloning function, wherein the method comprises when other users select the rule cloning function, automatically generating a duplicate of the account rule for the other users.

35. The financial management device of claim 28, wherein the account rule is associated with a rule contribution function, wherein the method comprises when other users select the rule contribution function, automatically generating a contribution rule having the same destination for the other users such that the other users are able to contribute to the account rule.

36. The financial management device of claim 35, wherein at least one of an evaluation trigger and a primary condition of the contribution rule is dependent on at least one of:
   an amount of funds in the destination of the account rule;
   an execution of the account rule; and
   values of an evaluation trigger and a primary condition of the account rule.

37. The financial management device of claim 28, wherein the device is one of a mobile device, a smart phone, a smart watch, a laptop computer and a desktop computer.

* * * * *